(12) United States Patent
Okada et al.

(10) Patent No.: US 6,894,727 B2
(45) Date of Patent: May 17, 2005

(54) PICTURE TRANSMISSION APPARATUS, A PICTURE TRANSMISSION METHOD AND A RECORDING MEDIUM, AND A PICTURE TRANSMISSION PROGRAM

(75) Inventors: Susumu Okada, Yokohama (JP); Shinji Nojima, Hadano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 673 days.

(21) Appl. No.: 09/954,142

(22) Filed: Sep. 12, 2001

(65) Prior Publication Data
US 2002/0048324 A1 Apr. 25, 2002

(30) Foreign Application Priority Data

Sep. 12, 2000 (JP) ........................................ 2000-276907
Aug. 6, 2001 (JP) ........................................ 2001-238032

(51) Int. Cl.[7] ................................................ H04N 7/00
(52) U.S. Cl. ...................... 348/497; 348/192; 348/518
(58) Field of Search ................................ 348/497, 192, 348/194, 518, 498, 499; 375/240.27, 240.28, 371, 372; H04N 7/00, 11/00

(56) References Cited

U.S. PATENT DOCUMENTS 5,740,200 A * 4/1998 Kamata ...................... 375/224
5,805,644 A * 9/1998 Tagawa ....................... 375/372

FOREIGN PATENT DOCUMENTS

| JP | 07-131409 | 5/1995 |
| JP | 214936 | 8/1997 |
| JP | 10-257461 | 9/1998 |
| JP | 11-341354 | 10/1999 |

* cited by examiner

Primary Examiner—Sherrie Hsia
(74) Attorney, Agent, or Firm—Pearne & Gordon LLP

(57) ABSTRACT

Providing picture transmission apparatus, a picture transmission method and a recording medium, and a picture transmission program that can transmit the latest picture data in real time depending on the situation of the network bandwidth. The aforementioned picture transmission apparatus comprises a picture extracting section 111 for extracting pictures stored in the video camera 101, a picture converter 112 for converting the pictures to a format for transmission to picture receiving apparatus 120 via the network 102, a picture transmitter 113 for transmitting the converted pictures to picture receiving apparatus 120 via the network 102, a transmission time measuring section 114 for measuring the time required for picture transmission and saving the measurement result, a transmission time predicting section 115 for using a predetermined number of the saved measurement results to predict the time required for picture transmission, and an operation timing controller 116 for determining the start timing of picture conversion in the picture converter 112 based on the predicted transmission time and the time required for picture conversion.

18 Claims, 36 Drawing Sheets

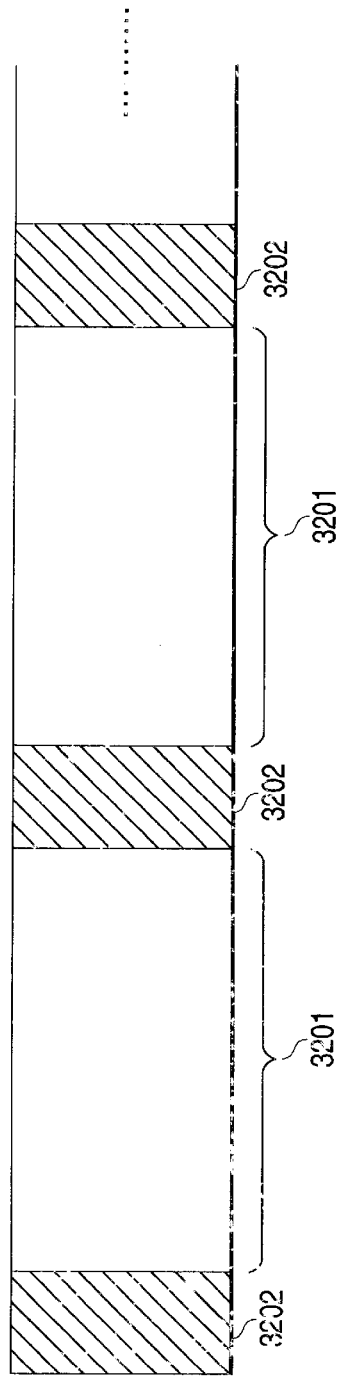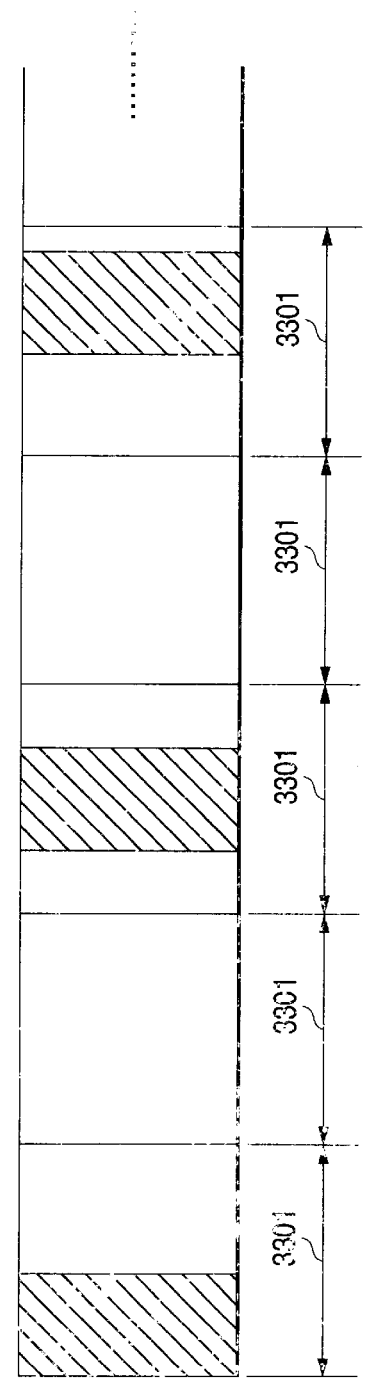

PICTURE TRANSMISSION APPARATUS, A PICTURE TRANSMISSION METHOD AND A RECORDING MEDIUM, AND A PICTURE TRANSMISSION PROGRAM

BACKGROUND OF THE INVENTION

1. Field of the Invention

The present invention relates to picture transmission apparatus for transmitting pictures extracted from a picture source, a picture transmission method, a picture transmission program for causing a computer to act as said picture transmission apparatus, and a recording medium on which the program is recorded, and in particular to picture transmission apparatus for transmitting the latest picture data in real time depending on the situation of the network bandwidth, a picture transmission method and a recording medium, and a picture transmission program.

2. Description of the Related Art

With the development of the network technologies in recent years, a network picture transmission system has been in widespread use for transmitting pictures via a network and playing back the picture received by the receiving party. In general, the volume of picture data is huge. Thus, in order to transmit pictures via a network, a wide network bandwidth for transmitting pictures must be reserved. Some of the recent technologies reduces a delay in the playback of pictures even in a network where a certain bandwidth is not guaranteed.

A technology for reducing a delay in the playback time caused by insufficient playback capability on the picture playback side or insufficient network bandwidth in order to maintain the real-time characteristics is disclosed in the Japanese Patent Laid-Open No. 214936/1997. According to this technology, in case reception and decoding of packets takes time on the client that receives pictures, the client discards the packets whose decoding is not complete and receives the latest packets from the server in order to maintain the real-time characteristic.

The network moving picture delivery system (hereinafter referred to as related art picture transmission apparatus) according to the Japanese Patent Laid-Open No. 214936/1997 will be described referring to FIGS. 31 through 37.

As shown in FIG. 31, related art picture transmission apparatus comprises a server 3101 for transmitting pictures, a client 3102 for receiving data and displaying pictures, and a network 3103 for performing data communications between the server 3101 and the client 3102.

The server 3101 comprises a moving picture data storage processor 3111 for extracting picture data from a recording medium such as a hard disk, a server-mounted packet transmission processor 3112 for splitting picture data into packets and transmitting the packets to the client 3102 via the network 3103, and a refreshing data detector 3113 for detecting the first portion of picture data that can be decoded.

The client 3102 comprises a moving picture display processor 3121 for displaying received pictures, a decoding processor 3122 for decoding received picture data and converting the resulting data to a format that can be displayed on a display device such as a display, a packet request/reception processor 3123 for receiving data transmitted from the server 3101 via a network, a decoding delay detector 3124 for calculating the decoding delay time of packets transmitted from the server 3101 based on the time information stored in packets, and a transmission delay detector 3125 for calculating the transmission delay time of packets transmitted from the server 3101 based on the time information owned by packets.

Next, the structure of data the server 3101 transmits to the client 3102 via the network 3103 will be described referring to FIGS. 32 through 34. FIG. 32 is an explanatory drawing that shows a bit string of encoded data composed of inter-frame-encoded data string and refreshing data. FIG. 33 is an explanatory drawing that shows a bit string of encoded data split into a plurality of packets shown in FIG. 32. FIG. 34 is an explanatory drawing that shows the data structure of encoded data with a header added per packet.

When the server 3101 transmits picture data to the client 3102 via the network 3103, the server 3101 uses an encoding system such as H.261 or MPEG that is based on inter-frame difference to encode picture data. In the picture data to be transmitted to the client 3102, picture frames (hereinafter referred to as refreshing data) that is cyclically intra-frame-encoded are cyclically inserted in the inter-frame-encoded data string 3201, as shown in FIG. 32. Encoded data provided via encoding systems such as H.261 and MPEG is represented as a bit string. The encoded data shown in FIG. 33 is split into packets 3301 of an appropriate size in order to facilitate transfer on the network 3103.

Next, as shown in FIG. 34, a header 3402 is added to each packet 3301 split from the encoded data to create packet data 3401. A group of packet data 3401 thus created is held in the server 3101 as a single piece of picture data. The header 3402 of individual packet data 3401 contains a time index 3411 for indicating the transmission time and the encoding end time of the packet data 3401 in the situation where the most recent encoding of bit streams was normally performed, and an identifier 3412 for determining whether the packet contains intra-frame encoded data.

Next, a mechanism of transmitting pictures by the picture transmission apparatus shown in FIG. 31 while reducing the transmission delay or encoding delay will be described referring to FIGS. 35 and 36. FIG. 35 is a conceptual drawing of transmission used in case the transmission time or decoding end time of a single packet is shorter than the transmission time or decoding end time indicated by the time index 3411. FIG. 36 is a conceptual drawing of transmission used in case the transmission time or decoding end time of a single packet is longer than the transmission time or decoding end time indicated by the time index 3411.

The packet request/reception processor 3123 connects to the server-mounted packet transmission processor 3112 via the network 3103 and specifies the contents name of a desired picture. The packet request/reception processor 3123 requests transfer of data in packets from the server-mounted packet transmission processor 3113. The packets received by the packet request/reception processor 3123 are stored in the receiving buffer (not shown) of the packet request/reception processor 3123. The decoding processor 3122 sequentially reads and decodes the packets. On the client 3102, the decoding delay detector 3124 and transmission delay detector 3125 starts measurement of elapsed time of transmission and decoding at the same time the first packet is received from the server-mounted packet transmission processor 3112.

The transmission delay detector 3125 measures the elapsed time from the time the first packet arrived when it receives a new packet. The decoding delay detector 3124 measures the elapsed time from the time the first packet was read from the receiving buffer of the packet request/ reception processor 3123 when decoding of picture data contained in the packets received from the packet request/reception processor 3123 is complete. Each elapsed time measured by the transmission delay detector 3125 or decoding delay detector 3124 is compared with the time index 3411 recorded in the header 3402 of each packet.

As shown in FIG. 35, when the elapsed time 3502 measured by the decoding delay detector 3124 or transmission delay detector 3125 is shorter than the decoding end time or transmission time 3501 indicated by the time index 3411, the decoding processor 3122 and the packet request/reception processor 3123 suspends processing until the elapsed time 3502 reaches the time indicated by the time index 3411.

As shown in FIG. 36, when the decoding end time or transmission time 3603, 3604 measured by the decoding delay detector 3124 or transmission delay detector 3125 is longer than the time 3601, 3602, and in case the difference 3611, 3612 between the time 3601, 3602 and the measured time 3603, 3604 is smaller than the allowable value (3611), the decoding processor 3122 and the packet request/reception processor 3123 continues processing. On the other hand, in case the difference 3611, 3612 is larger than the allowable value (3612), the decoding processor suspends processing and performs the following delay reduction processing.

The delay reduction method for reducing a delay used in case the difference such as the difference 3612 is larger than the allowable value will be described referring to FIG. 37. In case the difference is larger than the allowable value as in the difference 3612, the client 3102 suspends the processing of the decoding processor 3122, clears the packets 3711, 3712, 3713, 3714 already received by the packet request/reception processor 3123, then requests refreshing data 3202 emerging after the next transmission-pending packet from the server-mounted packet transmission processor 3112. When requesting refreshing data, the client 3102 also notifies the server 3101 of the value of the difference 3702.

On the server 3101, in response to the refreshing data request by the client 3102, the refreshing data detector 3113 detects the packet 3722 that contains refreshing data emerging after the difference 3702 transmitted to the client 3102 from the time index of the next transmission-scheduled packet, then transmits the packet 3722 and the next packet to the client 3102. On the client 3102, receiving the refreshing data 3202 in response to the request, the packet request/reception processor 3123 requests packets that follows the received packet. The decoding processor 3122 suspends decoding processing until the start time recorded in the packet to eliminate the delay, and restarts decoding processing when the start time is reached.

In this way, according to the related art picture transmission apparatus, when the client 3102 requests transmission of pictures from the server 3101, the server 3101 extracts the desired packets in response to the request and transmits the packets to the client 3102. A well as the aforementioned related art example, there exists an example where the server reads packets from a recording medium such as a hard disk while transmitting packets in order to provide packets to be transmitted next so that packets may be immediately transmitted on receiving a packet request by the client.

The aforementioned picture transmission apparatus encodes the picture data extracted by the server 3101 and transmits the resulting picture data to the client 3102. In case encoding takes time or extraction of picture data takes time, the server 3101 cannot transmit encoded data to the client 3102 from when encoding is started to when it is terminated. Thus the allocated network bandwidth is left unused for some time, so that the frame rate (number of frames that can be transmitted per second) of the pictures received by the client 3102 remains low.

Also, in case the encoded data transmission and picture data encoding are respectively performed in parallel, a wait time is generated from the end of the picture data encoding to the start of encoded data transmission. This wait time causes a delay in the playback of pictures in the client 3102.

When sudden jitter (variation) has occurred in the network, the client 3102 requests discarding of too many frames from the server 3101 as a result of measurement of transmission time. This may cause the frames that can be transmitted to the allocated network bandwidth to be discarded in the server 3101.

When the bandwidth of the network varies, the variation is not followed but the frames ready for transmission are discarded in the server 3101 or packets with a great delay maybe transmitted.

In case the server 3101 extracts picture data before performing encoding, the picture data encoding takes time depending on the load of the central processing unit (CPU) so that the encoded data transmission is not allowed while the CPU is performing picture data encoding. Thus there arises the time an allocated network bandwidth is left unused, and the frame rate of the pictures received by the client 3102 remains low.

Also, in case the encoded data transmission and picture data encoding are respectively performed in parallel, a wait time is generated from the end of the picture data encoding to the start of encoded data transmission. This wait time causes a delay in the playback of pictures in the client 3102.

In case the server 3101 extracts picture data then encodes the extracted picture data, encoding must be performed in a short time in order for the server 3101 to transmit encoded data to the client 3102 without delay in case the client 3102 has requested refreshing data. In such a case, the server 3101 cannot perform high-quality encoding, that is, cannot obtain high-quality compressed data.

When the location where picture data is extracted has changed for example from a hard disk to a vide tape, the server 3101 takes time extracting the packets requested by the client 3102 from the video tape. This causes a delay in the picture playback.

Further, when the server 3101 uses the same network to receive picture data from another server and transmits it to the client 3102, the time required for the server 3101 to receive pictures differs from the time required for the server 3101 to transmit pictures. Thus the server 3101 cannot transmit the received pictures to the client 3102, so that the pictures that cannot be transmitted may be discarded in the server 3101.

Especially, in a monitoring system for performing remote monitoring via a network, pictures showing the latest situation are essential to the monitoring side. However, the network used for transmission of picture data may be subject to fluctuations in the transmission speed. When a camera is directed to a desired direction or zooming-in/out is performed via remote operation from the monitoring side, the picture playback apparatus on the monitoring side does not display desired pictures in the meantime. When in particular the transmission speed drops due to the network fluctuations in addition to this problem, the pictures displayed on the picture playback apparatus on the monitoring side lacks real-time characteristics. In a monitoring system, a delay of a mere one or two seconds is fatal. There has been a need for picture transmission apparatus that can provide the latest and high-accuracy pictures independent of the network situation.

The invention has been proposed in view of the related art problems and providing picture transmission apparatus that can reduce a delay in the picture playback depending on the situation of the network bandwidth when for transmitting pictures via the network, that is, picture transmission apparatus that can transmit the latest picture data in real time, a picture transmission method and a recording medium, and a picture transmission program.

SUMMARY OF THE INVENTION

In order to solve the aforementioned problems, picture transmission apparatus according to the invention is characterized in that said picture transmission apparatus comprises picture conversion means for converting a picture composed of a plurality of frames to a format for transmission to another apparatus to generate a converted picture on a per frame basis, picture transmission means for transmitting the converted picture generated by said picture conversion means on a per frame basis to predetermined picture receiving apparatus connected via a network, transmission time measuring means for measuring the transmission time of a converted picture transmitted from said picture transmission means on a per frame basis, transmission time predicting means for predicting the transmission time required for said picture transmission means to transmit the converted pictures in the transmission-candidate frames and generating a predicted transmission time based on the transmission time of past frames measured by said transmission time measuring means, and operation timing control means for controlling the timing for said picture conversion means to start conversion of conversion-candidate frames based on the predicted transmission time of said transmission-candidate frames generated by said transmission time predicting means.

Thus, the wait time from the end of picture conversion to the start of picture transmission is eliminated. This minimizes the time required from the end of picture conversion to the start of picture transmission. As a result, the time from reception of a picture transmission request from picture receiving apparatus as a client to completion of picture transmission can be minimized. In this way, a delay in the picture playback in picture receiving apparatus is minimized. That is, since the latest converted pictures can be transmitted in real time, picture receiving apparatus can play back the latest pictures. It is possible to reduce the network usage time to enable efficient use of the network as well as to raise the frame rate (number of frames that can be transmitted per second) of the pictures received by the picture receiving apparatus.

Picture transmission apparatus according to the invention is characterized in that said transmission time measuring means comprises jitter determining means for determining the occurrence of jitter in said network during transmission of said past frames based on the length of each measured transmission time, and that said transmission time predicting means predicts said predicted transmission time based on the transmission time other than the transmission time where occurrence of jitter is determined by said jitter determining means.

In this way, the transmission time predicting means calculates a predicted transmission time without considering the transmission time where jitter occurred so that it is possible to correctly predict the time required for picture transmission. Thus, it is possible to set an optimum start timing of picture conversion thereby minimizing the time required from the start of picture conversion to the end of picture transmission.

Picture transmission apparatus according to the invention is characterized in that said transmission time measuring means comprises bandwidth variation determining means for determining variations in said network during transmission of said past frames based on the length of each measured transmission time, and that said transmission time predicting means predicts said predicted transmission time based on the transmission time assumed after the determination that the network bandwidth has varied by said bandwidth variation determining means.

Thus, it is possible to set an optimum start timing of picture conversion even in case the network bandwidth has varied, thereby minimizing the time required from the start of picture conversion to the end of picture transmission.

Picture transmission apparatus according to the invention comprises conversion time measuring means for measuring the conversion time of a picture converted by said picture conversion means on a per frame basis and conversion time predicting means for predicting the conversion time required for said picture conversion means to convert the pictures in the conversion-candidate frames based on the transmission time of past frames measured by said conversion time measuring means to generate a predicted conversion time, characterized in that said operation timing control means controls the timing for said picture conversion means to start conversion of said conversion-candidate frames based on the predicted transmission time of said transmission-candidate frames generated by said transmission time predicting means and the predicted conversion time of said conversion-candidate frames generated by said conversion time predicting means.

Picture transmission apparatus according to the invention comprises CPU load measuring means for measuring the load of a central processing unit (CPU) assumed when a picture of each frame is converted, based on the conversion time of the past frames measured by said conversion time measuring means, characterized in that said conversion time predicting means predicts the predicted conversion time of said conversion-candidate frames based on the conversion time of the past frames measured by said conversion time measuring means and the load measured by said CPU load measuring means.

In this way, the start timing of picture conversion is controlled considering the time required for picture conversion as well as the time required for picture transmission. Thus, it is possible to minimize the time required from the start of picture conversion to the end of picture transmission by starting picture transmission simultaneously with the end of picture conversion, even in case the time required for picture conversion has varies due to fluctuations in the CPU load.

Picture transmission apparatus according to the invention comprises conversion calculation volume change means for instructing said picture conversion means to change the calculation volume required for conversion of said conversion-candidate frames based on the comparison between the predicted transmission time of said transmission-candidate frames generated by said transmission time predicting means and the predicted conversion time of said conversion-candidate frames generated by said conversion time predicting means, characterized in that said conversion calculation volume change means instructs said picture conversion means to reduce the difference between the predicted transmission time of said transmission-candidate frames and the predicted conversion time of said conversion-candidate frames.

Via this instruction, the picture conversion means starts picture conversion simultaneously with picture transmission and controls the operation volume required for picture conversion so that picture conversion may end simultaneously with picture transmission. In particular, in case the operation volume of picture conversion is increased, picture conversion can take a longer time, which will generate high-quality pictures. As a result, it is possible to transmit a high-quality compressed picture suitable for the picture transmission time to picture receiving apparatus.

Picture transmission apparatus according to the invention comprises conversion system change means for instructing said picture conversion means to change the conversion system for said conversion-candidate frames based on the comparison between the predicted transmission time of said transmission-candidate frames generated by said transmission time predicting means and the predicted conversion time of said conversion-candidate frames generated by said conversion time predicting means and conversion system notification means for notifying said predetermined picture receiving apparatus of the conversion system instructed by said conversion system change means, characterized in that said conversion system change means instructs said picture conversion means to reduce the difference between the predicted transmission time of said transmission-candidate frames and the predicted conversion time of said conversion-candidate frames.

Thus, unless the predicted conversion time of the conversion-candidate frames exceeds the predicted transmission time of the transmission-candidate frames, it is possible to convert conversion-candidate frames via a conversion system that generates high-quality compressed pictures. It is thus possible to transmit compressed pictures of a quality suitable for the picture transmission time while maintaining the frame rate.

Picture transmission apparatus according to the invention is characterized in that said picture transmission apparatus comprises picture readout means for reading converted pictures on a per frame basis from converted picture storage for storing converted pictures converted to a format that can be displayed on picture receiving apparatus connected via a network, picture transmission means for transmitting the converted pictures read by said picture readout means on a per frame basis toward predetermined picture receiving apparatus connected via said network, transmission time measuring means for measuring the transmission time of converted pictures transmitted from said picture transmission means on a per frame basis, transmission time predicting means for predicting the transmission time required for said picture transmission means to transmit the transmission-candidate frames and generating a predicted transmission time based on the transmission time of past frames measured by said transmission time measuring means, picture readout location investigating means for investigating the location where the converted pictures read by said picture readout means is stored, readout time measuring means for measuring the readout time of converted pictures read by said converted picture storage on a per readout time frame, readout time predicting means for predicting the readout time required for said picture readout means to read the converted pictures in the readout-candidate frames and generating a predicted readout time based on the readout time of past frames measured by said readout time measuring means and the investigation result by said picture readout location investigating means, and operation timing control means for controlling the timing for said readout time predicting means to start readout of said conversion-candidate frames based on the predicted transmission time of said transmission-candidate frames generated by said transmission time predicting means and the predicted readout time of said readout-candidate frames generated by said readout time predicting means.

Thus, even in case the time required for picture readout varies due to a change in the readout location (converted picture storage) where converted pictures are provided to the picture readout means, it is possible to reduce the network usage time by controlling the start timing of picture readout so that picture transmission starts at the same time picture readout is over, thereby making possible the efficient use of the network and raising the frame rate. As a result, it is possible to minimize the time from reception of a picture transmission request from picture receiving apparatus as a client to completion of picture transmission. In this way, it is possible to minimize a delay in the picture playback in picture receiving apparatus. That is, it is possible to transmit the latest converted pictures in real time thus picture receiving apparatus can play back the latest converted pictures.

Picture transmission apparatus according to the invention is characterized in that said picture transmission apparatus comprises picture extracting means for receiving pictures via a network from picture transmission apparatus for storing said pictures connected to said picture transmission apparatus via said network, reception time measuring means for measuring reception time of pictures received by said picture extracting means on a per frame basis, reception time predicting means for predicting the reception time required for said picture extracting means to receive reception-candidate frames and generating a predicted reception time based on the transmission time of past frames measured by said reception time measuring means, and processing operation control means for controlling the timing for said picture extracting means to start reception of said reception-candidate frames, the timing for said picture conversion means to start conversion of said conversion-candidate frames and the timing for said picture transmission means to start transmission of said conversion-candidate frames based on the predicted transmission time of said transmission-candidate frames generated by said transmission time predicting means and the predicted reception time of said transmission-candidate frames generated by said reception time predicting means.

Thus, even when the picture transmission means and the picture extracting means use the same network, respective start timings of picture conversion and picture reception or picture transmission and picture conversion are controlled by predicting the time required for picture reception and picture transmission. Thus it is possible to reduce the network usage time to enable efficient use of the network as well as to raise the frame rate.

Picture transmission apparatus according to the invention is characterized in that said transmission time predicting means adjusts the number of samples and generates said predicted transmission time by calculating a standard deviation of the transmission of said past frames.

Picture transmission apparatus according to the invention is characterized in that said transmission time predicting means removes samples in chronological order until said calculated standard deviation lowers a predetermined value.

Thus, it is possible to predict a transmission time by using a sample group with a small standard deviation, that is, with small dispersion. Accordingly, it is possible to predict a transmission time that is close to a real one even in case the transmission speed gradually increases or gradually decreases.

Picture transmission apparatus according to the invention is characterized in that said transmission time predicting means removes samples starting with a sample whose difference from the average value is the largest until said calculated standard deviation lowers a predetermined value.

Thus, it is possible to remove samples assumed when jitter occurred. Therefore it is possible to predict a transmission time by using a sample group with a small standard deviation, that is, with small variations. Accordingly, it is possible to predict a transmission time that is close to a real one even in case jitter has occurred.

A picture transmission method according to the invention is characterized in that said picture transmission method comprises a picture conversion step of converting a picture composed of a plurality of frames to a format for transmission to another apparatus to generate a converted picture on a per frame basis, a picture transmission step of transmitting the converted picture generated in said picture conversion step on a per frame basis to predetermined picture receiving apparatus connected via a network, a transmission time measuring step of measuring the transmission time of a converted picture transmitted in said picture transmission step on a per frame basis, a transmission time predicting step of predicting the transmission time required for said picture transmission step to transmit the converted pictures in the transmission-candidate frames and generating a predicted transmission time based on the transmission time of past frames measured by said transmission time measuring step, and an operation timing control step of controlling the timing for said picture conversion step to start conversion of conversion-candidate frames based on the predicted transmission time of said transmission-candidate frames generated in said transmission time predicting means.

A computer-readable recording medium according to the invention records thereon a picture transmission program for causing a computer to act as picture transmission apparatus according to the invention.

A picture transmission program according to the invention causes a computer to act as picture transmission apparatus according the invention.

BRIEF DESCRIPTION OF THE DRAWINGS

FIG. 32 is an explanatory drawing that shows a bit string composed of an inter-frame-encoded data string and refreshing data.

FIG. 33 is an explanatory drawing that shows a bit string split into a plurality of packets shown in FIG. 32.

DESCRIPTION OF THE PREFERRED EMBODIMENTS

Picture transmission apparatus according to the invention extracts a desired picture stored on a recording medium such as a video camera, a hard disk and a video tape or in a picture recording section such as a server connected via a network, converts the extracted picture to a format for transmission to picture receiving apparatus, then transmits the converted picture to picture receiving apparatus via a network. In the following description, a system composed of a picture recording section, picture transmission apparatus, a network and picture receiving apparatus will be referred to as a network picture transmission system.

Embodiments of picture transmission apparatus according to the invention will be detailed referring to FIGS. 1 through 30 and FIG. 38, in the order of first embodiment, second embodiment, third embodiment, fourth embodiment, fifth embodiment, sixth embodiment, seventh embodiment, eighth embodiment, ninth embodiment, tenth embodiment, and eleventh embodiment. While description of each embodiment details picture transmission apparatus and a picture transmission method according to the invention, description of a recording medium according to the invention is included in the description of the following picture transmission method, because said recording medium records a program for executing the picture transmission method.

First embodiment of a picture transmission apparatus from the present invention is described below, which predicts the time required for the current picture transmission from the time required for the past picture transmission to control the timing to start picture conversion performed before picture transmission. A block diagram showing a network picture transmission system that includes picture transmission apparatus according to this embodiment is shown in FIG. 1.

Figure 1:
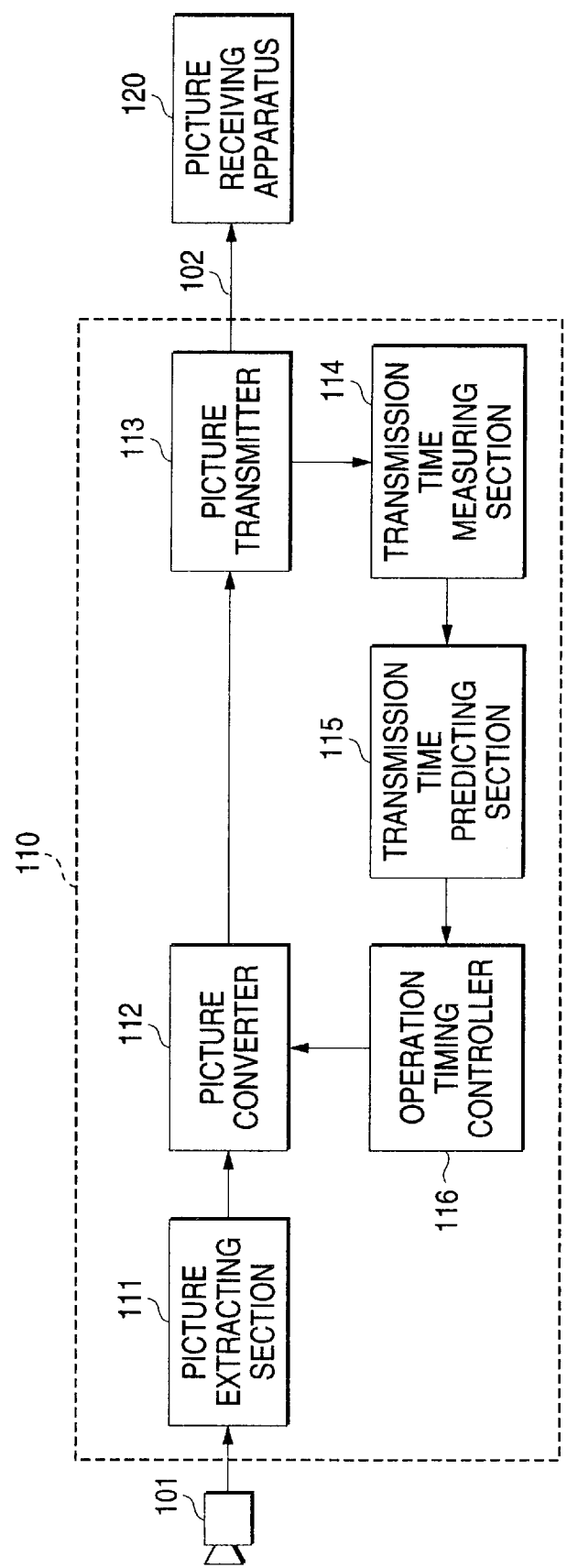
FIG. 1 is a block diagram that shows a network picture transmission system that includes picture transmission apparatus according to the first embodiment.

In FIG. 1, a network picture transmission system comprises a video camera 101, picture transmission apparatus according to this embodiment 110, a network 102, and picture receiving apparatus 120.

The video camera 101 records and stores pictures. The picture transmission apparatus 110 that converts pictures received from the video camera 101 comprises a picture extracting section 111 corresponding to picture extracting means according to the invention, a picture converter 112 corresponding to picture conversion means, a picture transmitter 113 corresponding to picture transmission means, a transmission time measuring section 114 corresponding to transmission time measuring means, a transmission time predicting section 115 corresponding to transmission time predicting means, and an operation timing controller 116 corresponding to operation timing control means.

The picture extracting section 111 extracts pictures stored in the video camera 101. The picture converter 112 converts pictures extracted by the picture extracting section 111 to a format for transmission to picture receiving apparatus 120 via the network 102. In particular, the picture converter 112 performs picture conversion such as compression using a picture compression system such as H.261 or MPEG and resolution conversion. The picture transmitter 113 transmits pictures converted by the picture converter 112 to picture receiving apparatus 120 via the network 102. This processing is hereinafter referred to as picture transmission.

The transmission time measuring section 114 measures the time required for picture transmission and saves the measurement result. The transmission time predicting section 115 uses a predetermined number of measurement results in the measurement result saved in the transmission time measuring section 114 to predict the time required for picture transmission. The operation timing controller 116 determines the start timing of picture conversion in the picture converter 112 based on the time required for picture transmission and the time required for picture conversion. The method the operation timing controller 116 uses to determine the start timing of picture conversion will be detailed later.

The network 102 transmits pictures converted in the picture transmission apparatus 110 to the picture receiving apparatus. The picture receiving apparatus 120 receives pictures transmitted from the picture transmission apparatus 110 via the network 102 and displays the received pictures or stores them in an internal hard disk (not shown).

The picture transmission method used by the picture transmission apparatus 110 according to the invention will be described referring to FIGS. 2 through 4. First, the picture extracting section 111 extracts pictures on a per frame unit from the video camera 110. Next, the picture converter 112 performs picture conversion with a timing the operation timing controller 116 that will be described next determines, and transmits the resulting pictures to the picture transmitter 113. The picture transmitter 113 transmits converted pictures to the network 102 toward the predetermined picture receiving apparatus 120. The transmission time measuring section 114 measures the time required by the picture transmitter 113 to perform picture transmission and saves the measurement result.

In order for the operation timing controller 116 to control the start timing of picture conversion in the picture converter 112, the transmission time predicting section 115 has to predict the transmission time first. Thus, the transmission time predicting section 115 calculates the predicted time (predicted transmission time) required for picture transmission in accordance with the method mentioned later. After that, the operation timing controller 116 determines the start timing of picture conversion of pictures to be converted anew in accordance with the method mentioned later.

Figure 2:
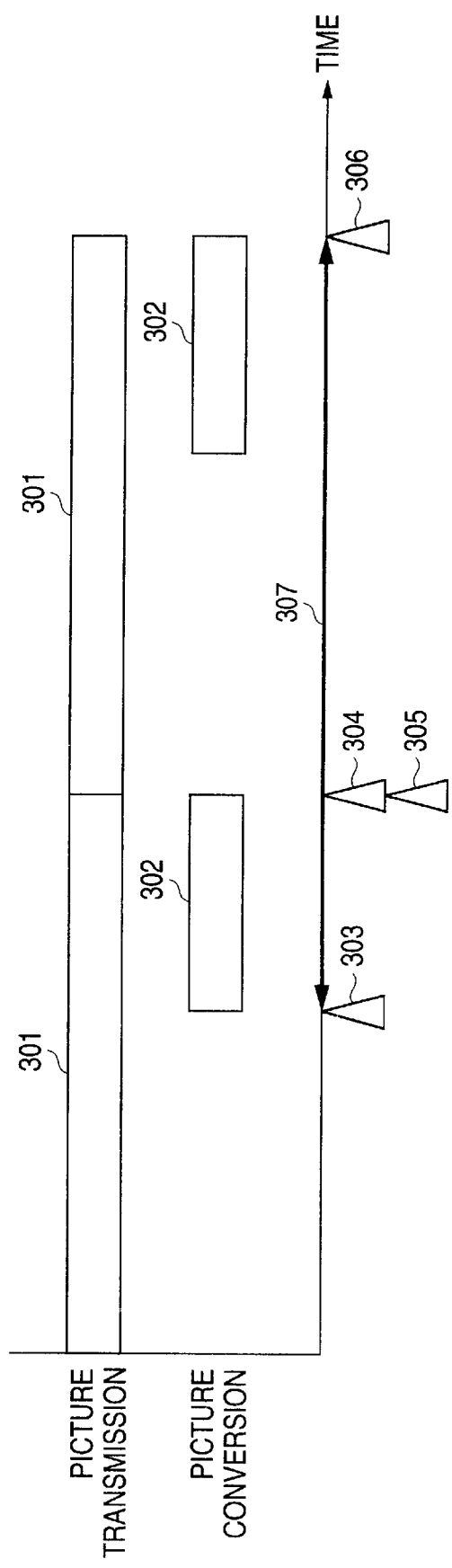
FIG. 2 is an explanatory drawing that shows the start timing of picture transmission and picture conversion in the first embodiment.

In FIG. 2, a sign 301 represents the operation time of picture transmission (transmission time). A sign 302 represents the operation time of picture conversion (conversion time). A sign 303 represents the start time of picture conversion. A sign 304 represents the end time of picture conversion. A sign 305 represents the start time of picture transmission. A sign 306 represents the end time of picture transmission. A sign 307 represents the time required from the start of picture conversion to the end of picture transmission.

As shown in FIG. 2, in order to transmit the latest pictures to the picture receiving apparatus 120, it is necessary to start picture transmission immediately after the end of picture conversion. The operation timing controller 116 controls the start timing of picture conversion in the picture converter 112 in order to transmit the latest pictures without delay. For this control to be effective, it is necessary to grasp in advance the time 301 required for picture transmission and the time 302 required for picture conversion.

The time 302 required for picture conversion does not vary as long as pictures of the same data volume are transmitted from the picture extracting section 111. Thus it suffices to use previously obtained data. However, the time 301 required for picture transmission is not constant because the network bandwidth available to picture transmission fluctuates when the network 102 is used for picture transmission as well as communications of other data. Assuming the network 102 is a dedicated line for picture transmission and the picture transmission apparatus 110 transmits pictures of the same data volume, the time required from the start of picture transmission to the end of picture transmission may not be constant depending on the status of transmission of other pictures carried over the dedicated line. Thus, prediction of the time 301 required for picture transmission is made in the transmission time predicting section 115.

Figure 3:
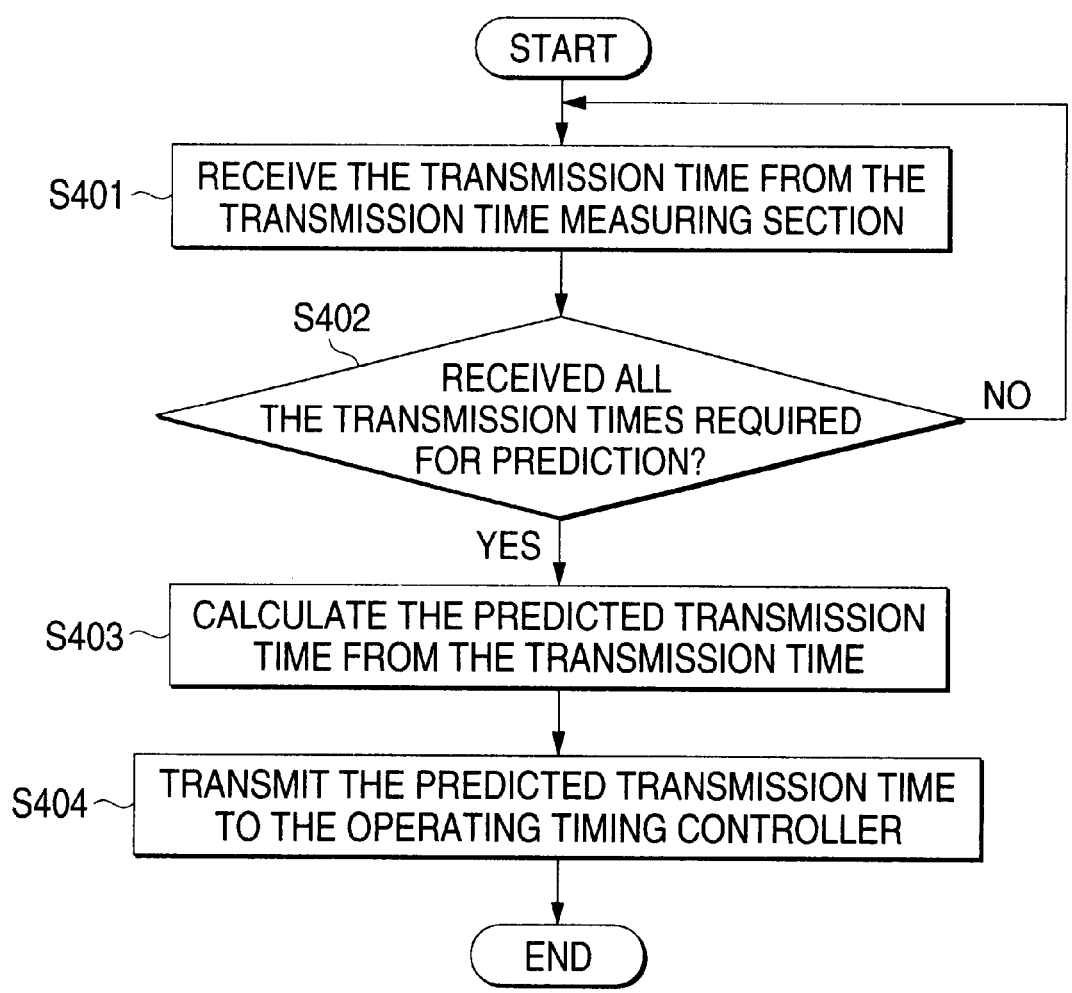
FIG. 3 is a flowchart that explains the method for predicting the transmission time required for picture transmission (transmission time) in the first embodiment.
Figure 4:
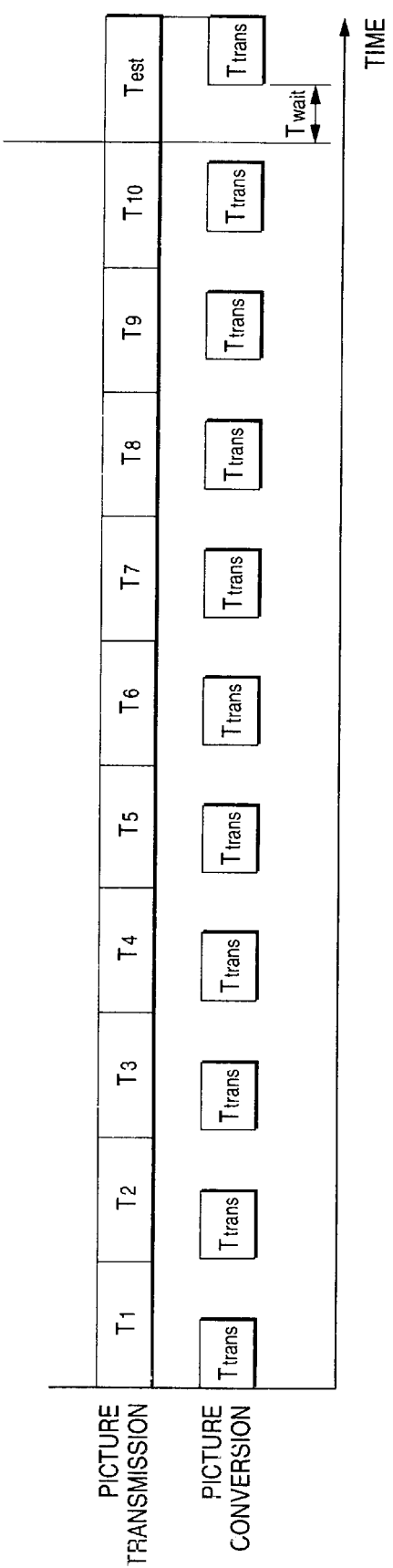
FIG. 4 is an explanatory drawing that shows the start timing of picture conversion determined in the first embodiment.

The method for predicting the transmission time used by the transmission time predicting section 115 will be detailed referring to the flowchart of FIG. 3.

In step S401, the transmission time predicting section 115 receives the transmission time measured by the transmission time measuring section 114 as a sample value. In step S402, the transmission time predicting section 115 checks whether all transmission times required for prediction of the transmission time have been received, and in case not received, execution returns to step S401. In case all transmission times required for prediction of the transmission time have been received, execution proceeds to step S403.

In step S403, the transmission time predicting section 115 calculates the predicted time required for picture transmission (predicted transmission time) from the transmission time. For example, as shown in the expression (1) below, the transmission time predicting section 115 obtains the average of transmission times $T_1$ to $T_N$ of N frames previously transmitted and assumes this as the predicted transmission time $T_{est}$ required for transmission of a single frame. In step S404, the transmission time predicting section 115 transmits the predicted transmission time $T_{est}$ thus calculated to the operation timing controller 116 to complete processing concerning prediction of the transmission time. The method for calculating the predicted transmission time as shown in expression (1) is an example and the predicted transmission time may be obtained via another calculation method.

$$T_{est} = \sum_{n=1}^{N} T_n / N \quad (1)$$

Next, the operation timing controller 116 determines the timing to start picture conversion in the picture converter 112 based on the predicted transmission time $T_{est}$ and the time $T_{trans}$ required for picture conversion. Here, assuming the wait time from the start of transmission to the start of picture conversion as $T_{wait}$, the wait time $T_{wait}$ is obtained via the following expression (2):

$$T_{wait} = T_{est} - T_{trans} \quad (2)$$

The operation timing controller 116 controls the start timing of picture conversion in the picture converter 112 based on the wait time $T_{wait}$ thus obtained so that picture conversion may start when the wait time $T_{wait}$ has elapsed after the start of picture transmission. Accordingly, the picture converter 112 starts picture conversion when the wait time $T_{wait}$ has elapsed after the start of picture transmission.

An example is shown below. Assume that the transmission time predicting section 115 calculates the predicted transmission time from the transmission times of the past 10 frames and that the transmission times $T_1$ to $T_{10}$ are $T_1$=90 [ms], $T_2$=100 [ms], $T_3$=90 [ms], $T_4$=100 [ms], $T_5$=110 [ms], $T_6$=100 [ms], $T_7$=120 [ms], $T_8$=110 [ms], $T_9$=100 [ms], and $T_{10}$=110 [ms]. Then, the predicted transmission time $T_{est}$ is obtained via the following expression (3):

$$T_{est}=(90+100+90+100+110+100+120+110+100+110)/10=103 \text{ [ms]} \quad (3)$$

Here, assuming that the time required for picture conversion $T_{trans}$ as $T_{trans}$=50 [ms], the wait time up to the start of picture conversion $T_{wait}$ is obtained via the following expression (4):

$$T_{wait}=103-50=53 \text{ [ms]} \quad (4)$$

Thus, the picture converter 112 starts picture transmission of the candidate frame when 53 [ms] has elapsed after the end of picture transmission of the preceding frame.

As mentioned earlier, in the picture transmission apparatus 110 and a picture transmission method according to this embodiment, the time required for picture transmission is predicted based on the result of measurement of the time required from the start of picture transmission to the network 102 to the end of picture transmission, and the picture conversion and picture transmission are separately operated and the picture conversion timing is controlled so that picture transmission may be started simultaneously with the end of picture conversion.

Thus, the wait time from the end of picture conversion to the start of picture transmission is eliminated so that the time required from the end of picture conversion to the start of picture transmission is minimized. As a result, it is possible to minimize the time from reception of a picture transmission request coming from the picture receiving apparatus 120 as a client to the completion of picture transmission. In this way, it is possible to minimize a delay in the picture playback in the picture receiving apparatus 120. That is, the latest pictures are transmitted from the picture transmission apparatus 110 in real time so that the picture receiving apparatus 120 can play back the latest pictures.

It is also possible to reduce the network usage time to enable efficient use of the network as well as to raise the frame rate (number of frames that can be transmitted per second) of the pictures received by the picture receiving apparatus 120.

Figure 5:
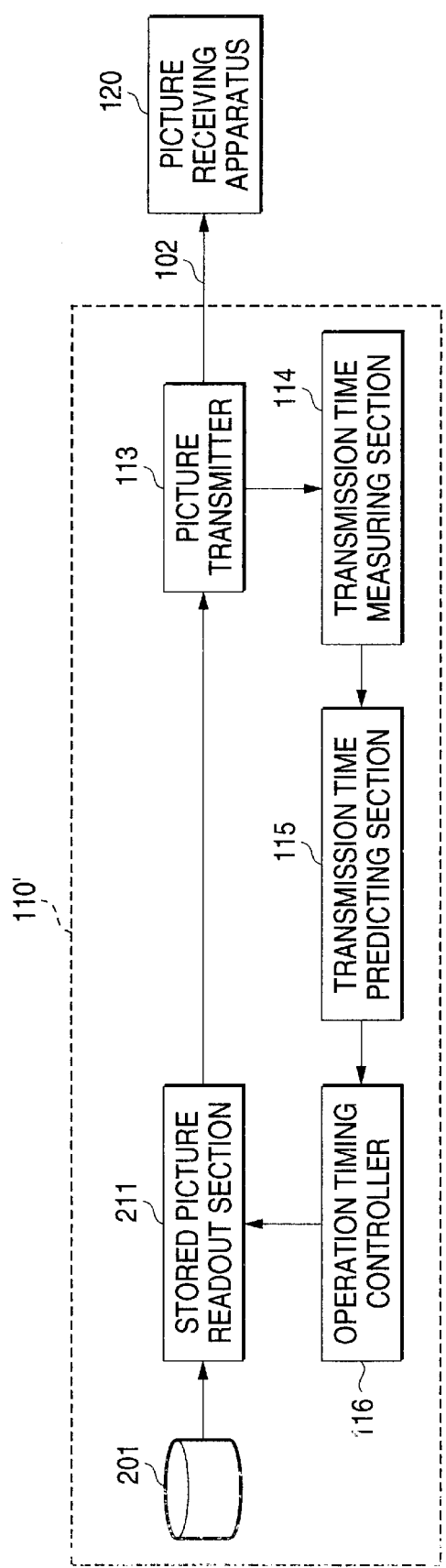
FIG. 5 is a block diagram that shows another configuration of a network picture transmission system that includes picture transmission apparatus according to the first embodiment.

As shown in FIG. 5, the picture transmission apparatus 110 according to this embodiment may be replaced with the picture transmission apparatus 110' comprising a recording medium 201 for storing converted picture data such as a hard disk and a video tape, a stored picture readout section 211 for reading picture from the recording medium 201, a picture transmitter 113, a transmission time measuring section 114, a transmission time predicting section 115, and an operation timing controller 116 wherein the operation timing controller 116 controls the timing to read picture data from the stored picture readout section 211.

Figure 6:
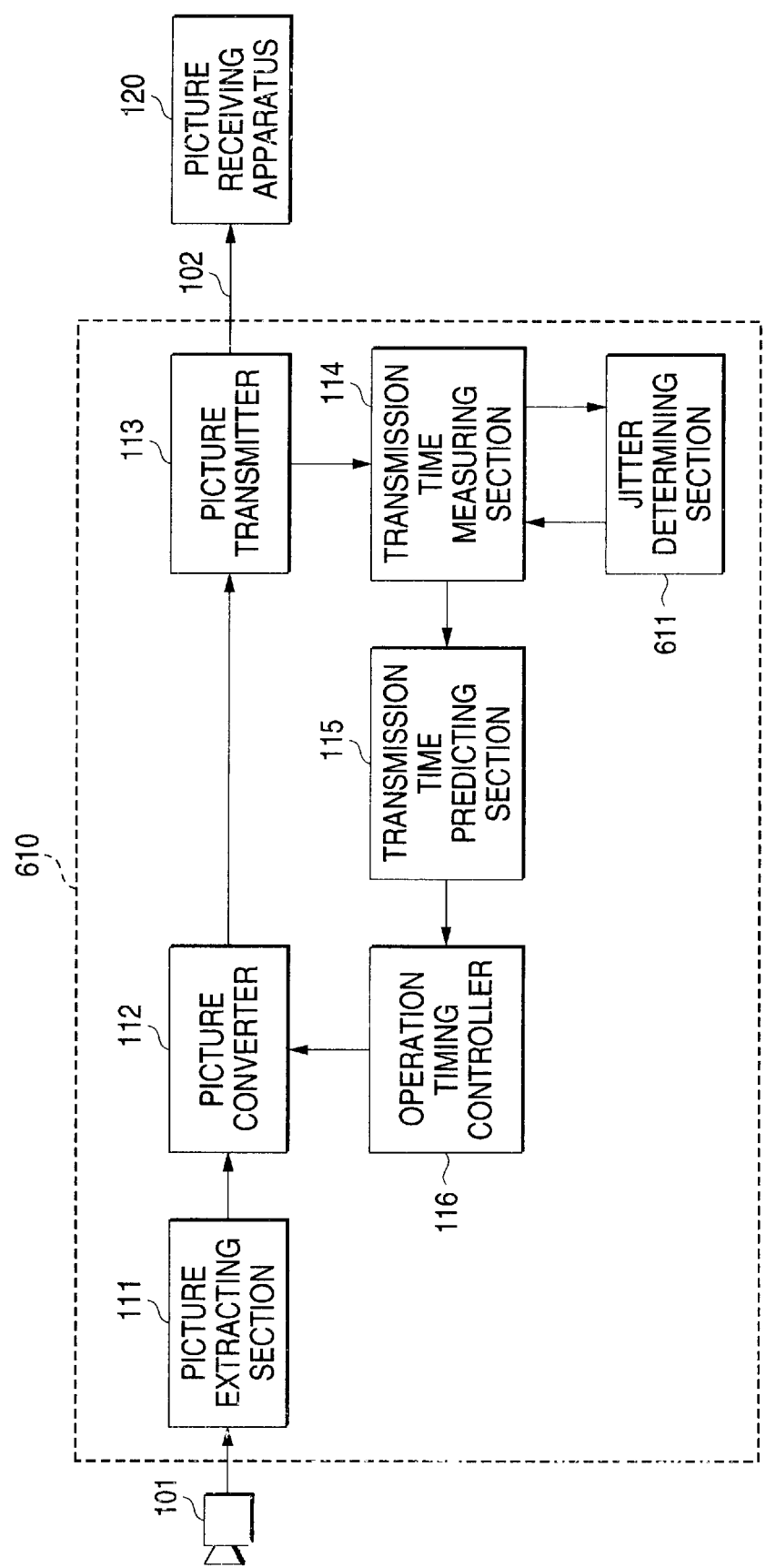
FIG. 6 is a block diagram that shows a network picture transmission system that includes picture transmission apparatus according to the second embodiment.

While picture transmission apparatus 110 according to the first embodiment predicts the time required for picture transmission from the measurement result by the transmission time measuring section 114 to control the start timing of picture conversion, in the picture transmission apparatus according to the second embodiment, the transmission time predicting section 115 eliminates the influence of jitter to predict a more precise time required for picture transmission even in case sudden jitter (variation) has occurred in the network. A block diagram showing a network picture transmission system that includes picture transmission apparatus according to this embodiment is shown in FIG. 6. In FIG. 6, similar portions as in FIG. 1 are given the same signs and corresponding description is omitted.

In FIG. 6, the network picture transmission system according to this embodiment comprises a video camera 101, picture transmission apparatus 610 according to this embodiment of the invention, a network 102, and picture receiving apparatus 120. The picture transmission apparatus 610 of this embodiment comprises a jitter determining section 611 for determining the occurrence of sudden jitter in a network corresponding to jitter determining means according to the invention, on top of the components of the picture transmission apparatus 110 of the first embodiment. The transmission time measuring section 114 according to this embodiment transmits the measurement result of the time required for picture transmission to the jitter determining section 611.

The jitter determining section 611 compares the time required for picture transmission (transmission time) coming from the transmission time measuring section 114 with a threshold value and determines whether the transmission time corresponds to the time required for picture transmission assumed in case jitter has occurred. When the jitter determining section 611 determines that the transmission time coming from the transmission time measuring section 114 is shorter than the threshold value and the transmission time is in the normal time when jitter is absent, the jitter determining section 611 forwards the transmit time to the transmission time predicting section 115. When the jitter determining section 611 determines that the transmission time coming from the transmission time measuring section 114 is longer than the threshold value and the transmission time is involved in picture transmission while jitter is present, the jitter determining section 611 skips forwarding the transmit time to the transmission time predicting section 115.

In the first embodiment, in case the transmission time of N frames is required to predict the transmission time in the transmission time predicting section 115, the transmission time predicting section 115 reads the transmission time of the past N frames from the transmission time measuring section 114. However, the transmission time predicting section 115 according to this embodiment predicts the time required for picture transmission from the transmission time of the remaining frames where jitter is absent, because the transmission time of the frames where jitter is involved is not transmitted from the jitter determining section 611.

Figure 7:
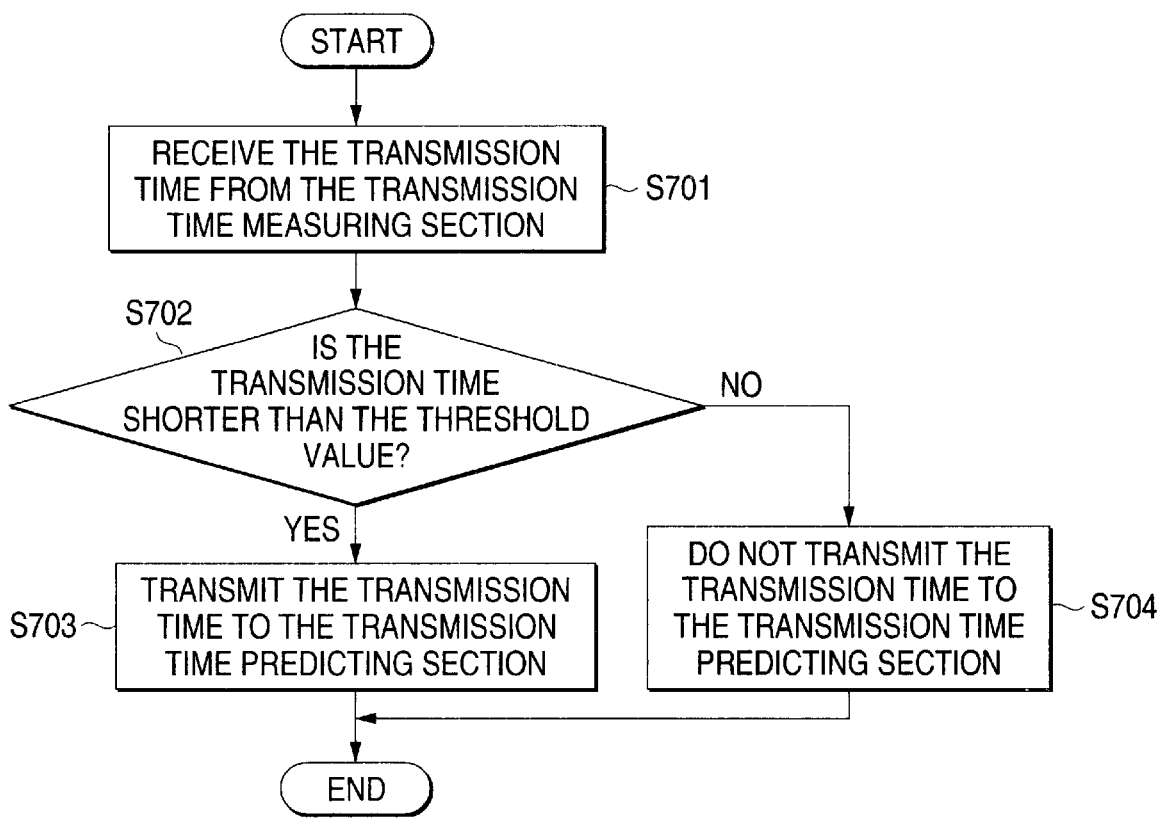
FIG. 7 is a flowchart that explains the method for picture transmission of the second embodiment that focuses on jitter determination.
Figure 8:
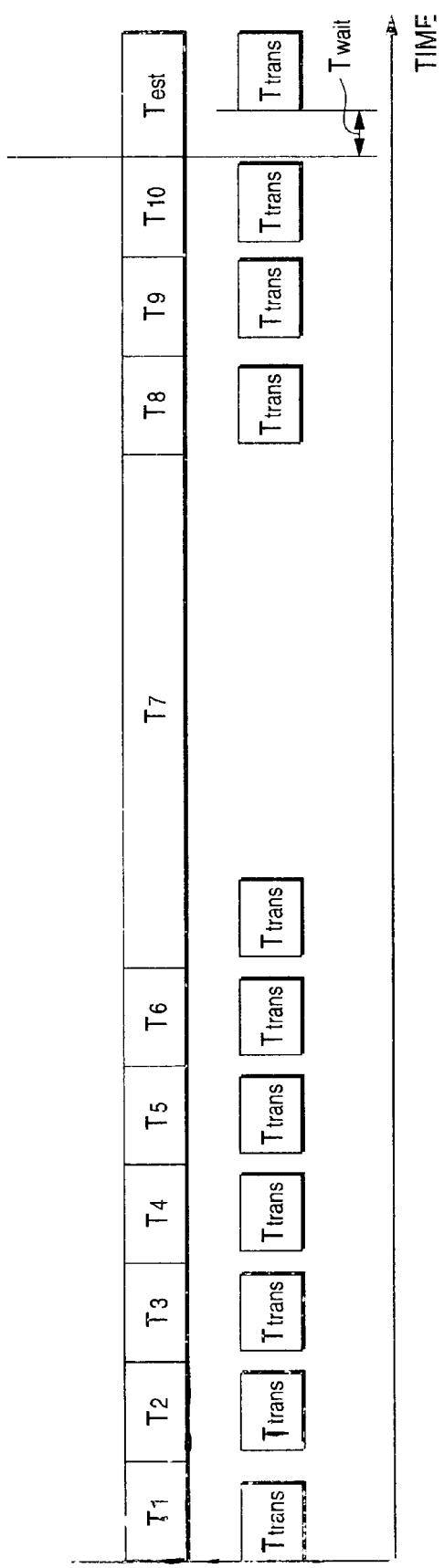
FIG. 8 is an explanatory drawing that shows the start timing of picture conversion determined in the second embodiment.

A picture transmission method according to this embodiment focusing on the operation of the jitter determining section 611 will be described referring to the flowchart of FIG. 7.

In step S701, the jitter determining section 611 receives the transmission time measured by the transmission time measuring section 114 as a sample value. In step S702, the jitter determining section 611 compares each transmission time with a threshold value. In case the transmission time is shorter than the threshold value, execution proceeds to step S703. In case the transmission time is longer than the threshold value, execution proceeds to step S704. The threshold value used in step S702 may be defined by the user in advance or determined by the picture transmission apparatus 110, in accordance with the criteria such as "twice the transmission time measured by the transmission time measuring section 114 when jitter is absent."

In step S703, the jitter determining section 611 assumes that the transmission time is used for calculating the predicted transmission time in the transmission time predicting section 115, transmits the transmission time to the transmission time predicting section 115 to terminate the processing. In step S704, assuming that the transmission time is data influenced by sudden jitter, the jitter determining section 611 skips forwarding the transmission time to the transmission time predicting section 115 to terminate the processing.

A transmission time predicting section 115 according to this embodiment predicts the time required for picture transmission only from the transmission time received from the jitter determining section 611. For example, as shown in the following expression (5), the transmission time predicting section 115 divides the total of transmission times $T_n$ received from the jitter determining section 611 by the number of transmission times N and assumes the result as the predicted transmission time $T_{est}$ required for transmitting a single frame. The method for calculating the predicted transmission time shown in the expression (5) is an example and the predicted transmission time may be obtained via another calculation method.

$$T_{est} = \sum_{n=1}^{N} T_n / N \tag{5}$$

Next, same as the first embodiment, the operation timing controller 116 uses the expression (2) to obtain the wait time $T_{wait}$ up to the start of picture conversion from the predicted transmission time $T_{est}$ and the time $T_{trans}$ required for picture conversion transmission time calculated in the predicting section 115. The operation timing controller 116 that has obtained the wait time $T_{wait}$, controls the start timing of picture conversion in the picture converter 112 so that picture conversion may start when the wait time $T_{wait}$ has elapsed after the start of picture transmission. Thus, the picture converter 112 starts picture conversion when the wait time $T_{wait}$ has elapsed after the start of picture transmission.

An example is shown below. Assume that the transmission time predicting section 115 calculates the predicted transmission time from the normal transmission times of the past 10 frames without jitter and that the transmission times $T_1$ to $T_{10}$ are $T_1$=90 [ms], $T_2$=100 [ms], $T_3$=90 [ms], $T_4$=100 [ms], $T_5$=110 [ms], $T_6$=100 [ms], $T_7$=750 [ms], $T_8$=110 [ms], $T_9$=100 [ms], and $T_{10}$=110 [ms].

Assuming that the threshold value used by the jitter determining section 611 to determine the occurrence of sudden jitter is 400 [ms], the jitter determining section 611 determines that $T_7$ is data measured when sudden jitter is present. The jitter determining section 611 transmits the nine transmission times other than $T_7$ (=750 [ms]) to the transmission time predicting section 115. In this case, the predicted transmission time $T_{est}$ calculated by transmission time predicting section 115 is obtained via the following expression (6):

$$T_{est}=(90+100+90+100+110+100+110+100+110)/9 \approx 101 \text{ [ms]} \quad (6)$$

wherein the calculation result of the expression (6) is rounded off to the first decimal place.

Assuming the time $T_{trans}$ required for conversion as $T_{trans}$=50 [ms], the wait time up to the start of conversion is obtained via the following expression (7):

$$T_{wait}=101-50=51 \text{ [ms]} \quad (7)$$

Thus, the picture converter 112 starts picture conversion of the candidate frame when 51 [ms] has elapsed after the end of picture transmission of the preceding frame.

As mentioned earlier, according to picture transmission apparatus 610 and a picture transmission method of this embodiment, the jitter determining section 611 determines that jitter has occurred based on the length of the transmission time of the pictures that have been transmitted in case sudden jitter has occurred in the network. The transmission time predicting section 115 calculates the predicted transmission time without considering the transmission time with jitter, so that it is possible to predict a more precise time required for picture transmission.

Thus it is possible to set the optimum start timing of picture conversion even in case jitter has occurred, thus minimizing the time required from the start of picture conversion to the end of picture transmission. As a result, it is possible to minimize the time from reception of a picture transmission request coming from the picture receiving apparatus 120 as a client to the completion of picture transmission. In this way, it is possible to minimize a delay in the picture playback in the picture receiving apparatus 120. That is, the latest pictures are transmitted from the picture transmission apparatus 610 in real time so that the picture receiving apparatus 120 can play back the latest pictures.

It is also possible to reduce the usage time of the network 102 to enable efficient use of the network 102 as well as to raise the frame rate of the pictures received by the picture receiving apparatus 120.

Figure 9:
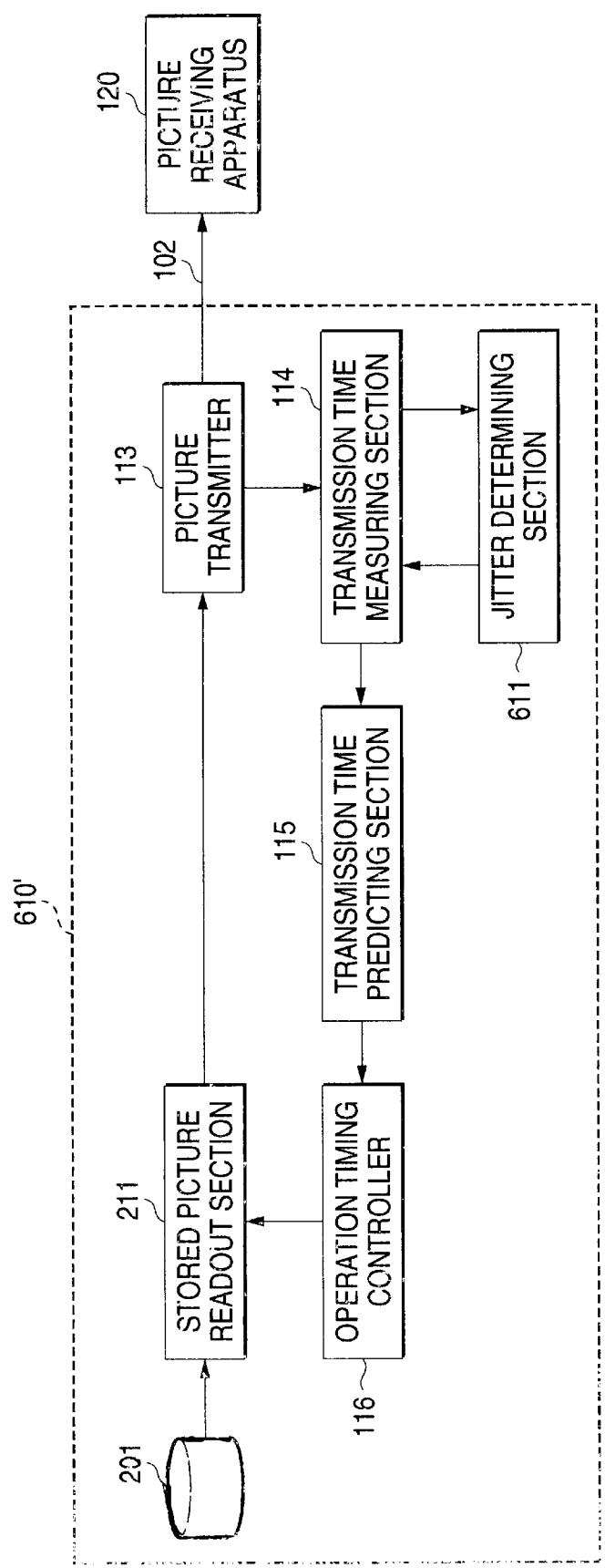
FIG. 9 is a block diagram that shows another configuration of a network picture transmission system that includes picture transmission apparatus according to the second embodiment.

As shown in FIG. 9, the picture transmission apparatus 610 according to this embodiment may be replaced with the picture transmission apparatus 610' comprising a recording medium 201 for storing converted picture data such as a hard disk and a video tape, a stored picture readout section 211 for reading picture from the recording medium 201, a picture transmitter 113, a transmission time measuring section 114, a jitter determining section 611, a transmission time predicting section 115, and an operation timing controller 116 wherein the operation timing controller 116 controls the timing to read picture data from the stored picture readout section 211.

Figure 10:
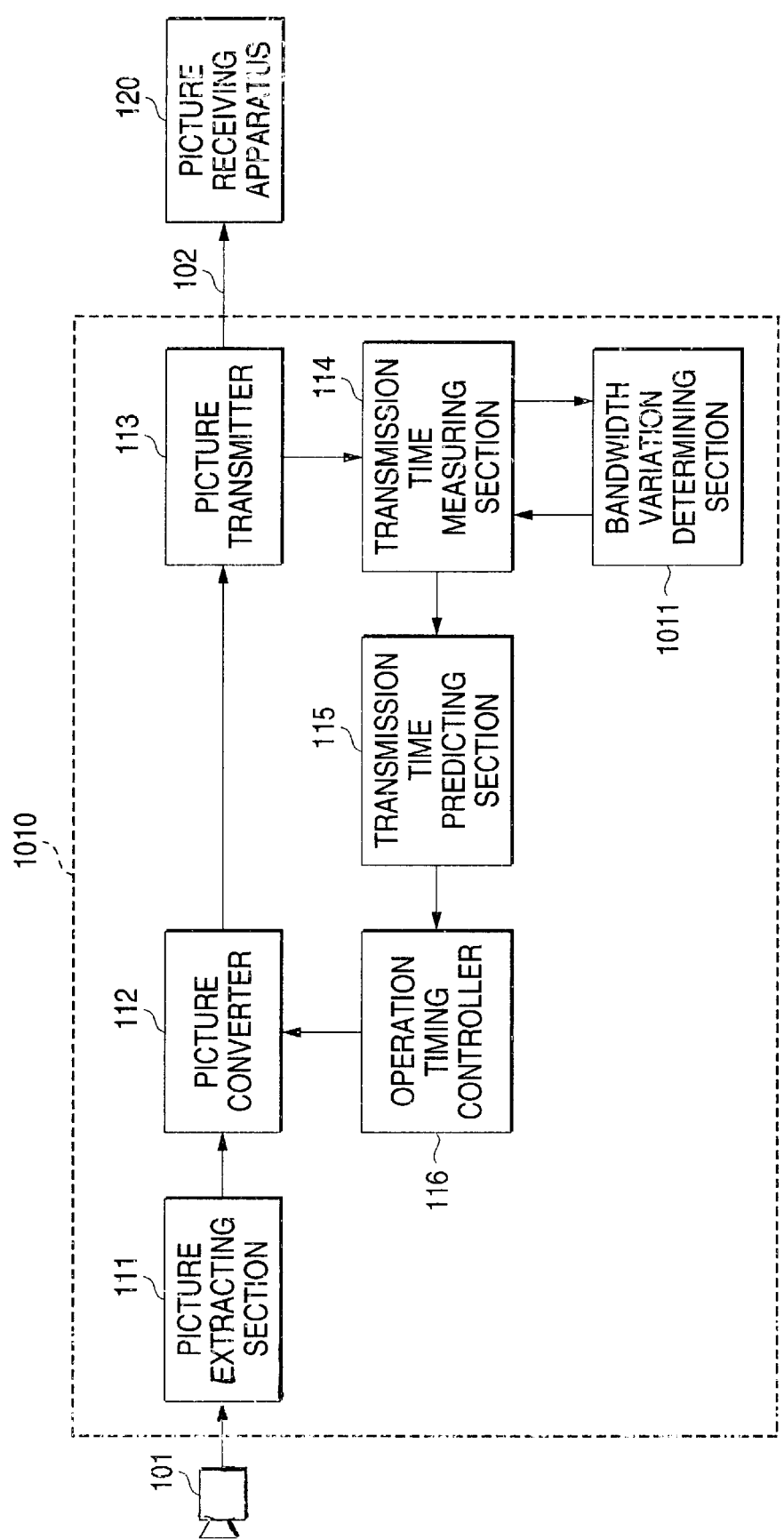
FIG. 10 is a block diagram that shows a network picture transmission system that includes picture transmission apparatus according to the third embodiment.

While picture transmission apparatus 110 according to the first embodiment predicts the time required for picture transmission from the measurement result by the transmission time measuring section 114, calculating the predicted transmission time from the measurement result before any variation in the available network bandwidth results in a difference between the predicted transmission time and the actual transmission time. The picture transmission apparatus according to the third embodiment follows this variation in the network bandwidth to predict a more precise time required for picture transmission. A block diagram showing a network picture transmission system that includes picture transmission apparatus according to this embodiment is shown in FIG. 10. In FIG. 10, similar portions as in FIG. 1 (first embodiment) are given the same signs and corresponding description is omitted.

In FIG. 10, the network picture transmission system according to this embodiment comprises a video camera 101, picture transmission apparatus 1010 according to this embodiment of the invention, a network 102, and picture receiving apparatus 120. The picture transmission apparatus 1010 of this embodiment comprises a bandwidth variation determining section 1011 corresponding to bandwidth variation determining means for determining variations in the network bandwidth from the measurement result of the transmission time, on top of the components of the picture transmission apparatus 110 of the first embodiment. The transmission time measuring section 114 according to this embodiment transmits the measurement result of the time required for picture transmission to the bandwidth variation determining section 1011.

The bandwidth variation determining section 1011 references the transmission time before the variation in the network bandwidth from among the transmission times measured by the transmission time measuring section 114 and determines the variation in the network bandwidth. When the bandwidth variation determining section 1011 determines that a variation was present in the network bandwidth, this determination is reported to the transmission time predicting section 115, which calculates the predicted transmission time from the transmission time after the variation in the network bandwidth.

The bandwidth variation determining section 1011 has criteria for determining that a variation was present in the network bandwidth. The bandwidth variation determining section 1011 determines that a variation was present in the network bandwidth when the criteria are satisfied a predetermined times running. The number of times the criteria are satisfied is represented as a determination value M. When the determination value M has lowered or equaled to a threshold value a predetermined times running, the bandwidth variation determining section 1011 determines that a variation was present in the network bandwidth. The criteria and the threshold of the determination value M maybe defined by the user or determined by the picture transmission apparatus 110, in accordance with the criteria such as "transmission time of the current frame takes twice the transmission time of the preceding frame (criteria) and five times running (threshold)." The bandwidth variation determining section 1011 reports the determination that a variation was present in the network bandwidth to the transmission time predicting section 115.

Figure 11:
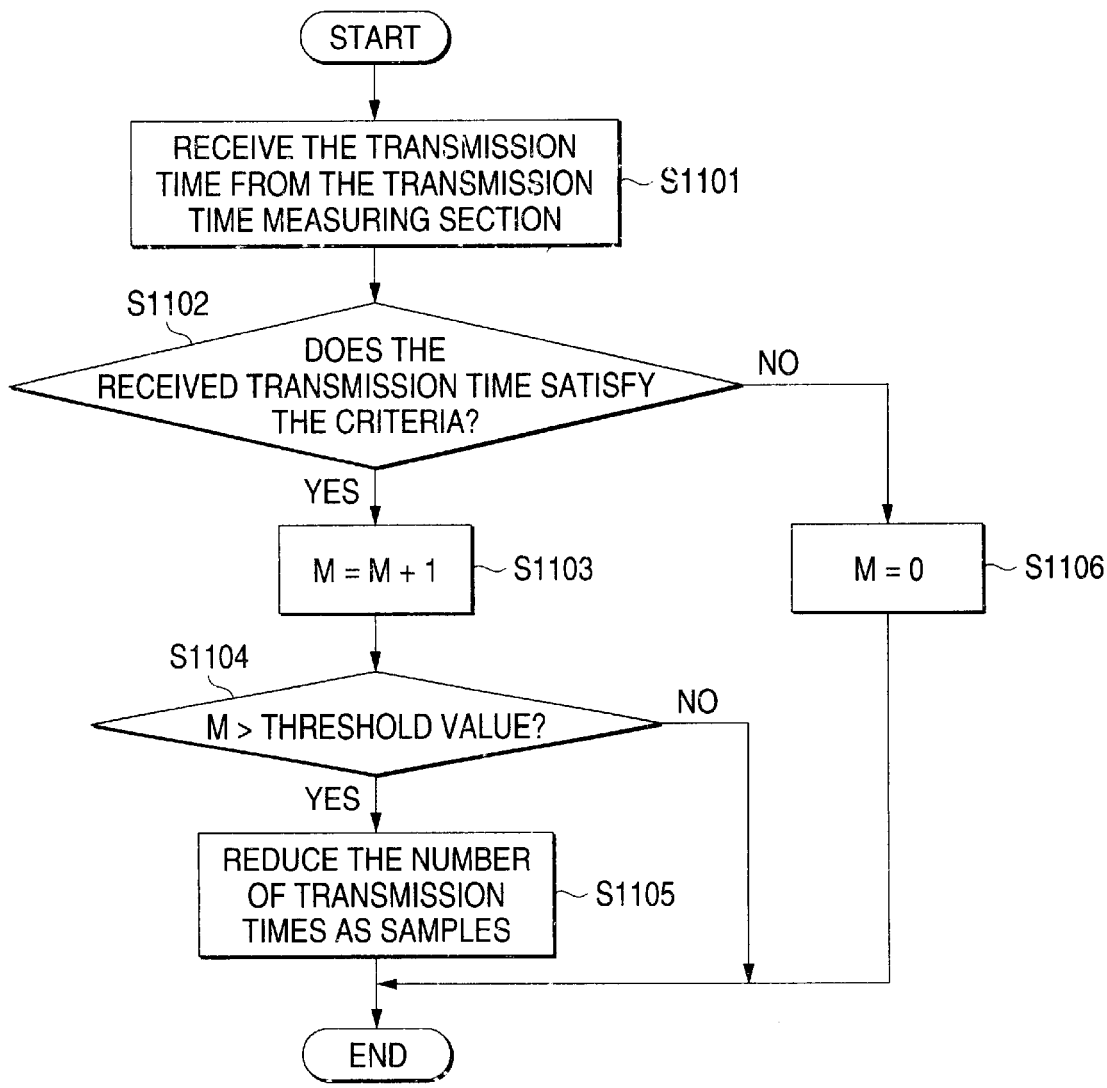
FIG. 11 is a flowchart that explains the method for picture transmission of the second embodiment that focuses on variations in the bandwidth.

A picture transmission method according to this embodiment focusing on the operation of the bandwidth variation determining section 1011 will be described referring to the flowchart of FIG. 11.

In step S1101, the bandwidth variation determining section 1011 receives the transmission time saved in the transmission time measuring section 114 as a sample value. In step S1102, the bandwidth variation determining section 1011 compares the received transmission time with the past transmission times, and in case the criteria are not satisfied from the result of the comparison, execution proceeds to step S1106. In case the criteria are satisfied, execution proceeds to step S1103. In step S1106, the bandwidth variation determining section 1011 determines that a variation was not present in the network bandwidth and terminates the processing assuming the determination value M as 0.

In step S1103, the bandwidth variation determining section 1011 adds 1 to the determination value M. In step S1104, the bandwidth variation determining section 1011 compares the determination value M with the threshold value. When the determination value M is smaller than or equal to the threshold value, the bandwidth variation determining section 1011 terminates the processing. When the determination value M is larger than the threshold value, execution proceeds to step S1105. In step S1105, based on the determination that a variation was present in the network bandwidth and the transmission time predicting section 115 reduces the number of the transmission times as samples measured by the transmission time measuring section 114 that are used for prediction of the transmission time. The transmission time transmitted to the transmission time predicting section 115 is one after the variation in the network bandwidth. In this way, the transmission time predicting section 115 determines the number of transmission times as samples based on the determination result of the bandwidth variation determining section 1011 and predicts the time required for picture transmission.

A transmission time predicting section 115 according to this embodiment predicts the time required for picture transmission only from the transmission time specified by the bandwidth variation determining section 1011. For example, as shown in the following expression (8), the transmission time predicting section 115 divides the total of transmission times $T_n$ specified by the bandwidth variation determining section 1011 by the number of transmission times N and assumes the result as the predicted transmission time $T_{est}$ required for transmitting a single frame. The method for calculating the predicted transmission time shown in the expression (8) is an example and the predicted transmission time may be obtained via another calculation method.

$$T_{est} = \sum_{n=1}^{N} T_n / N \qquad (8)$$

Next, same as the first embodiment, the operation timing controller 116 uses the expression (2) to obtain the wait time $T_{wait}$ up to the start of picture conversion from the predicted transmission time $T_{est}$ and the time $T_{tran}$ required for picture conversion calculated in the transmission time predicting section 115. The operation timing controller 116 that has obtained the wait time $T_{wait}$, controls the start timing of picture conversion in the picture converter 112 so that picture conversion may start when the wait time $T_{wait}$ has elapsed after the start of picture transmission. Thus, the picture converter 112 starts picture conversion when the wait time $T_{wait}$ has elapsed after the start of picture transmission.

An example is shown below. Assume that the transmission times $T_1$ to $T_{10}$ are $T_1$=90 [ms], $T_2$=100 [ms], $T_3$=90 [ms], $T_4$=100 [ms], $T_5$=110 [ms], $T_6$=100 [ms], $T_7$=320 [ms], $T_8$=350 [ms], $T_9$=360 [ms], and $T_{10}$=340 [ms]. Also assume that in this embodiment the bandwidth variation determining section 1011 has a criterion, "A variation in the network bandwidth is assumed when the transmission time is equal to or more than twice the transmission time of the preceding frame or equal to or less than half the transmission time of the preceding frame."

When the transmission time $T_6$ is compared with $T_7$, the transmission time $T_7$ is more than twice the transmission time $T_7$. The transmission time $T_6$ is used as criteria data for variations in the network bandwidth and 1 is added to the determination value M. Hereafter, the bandwidth variation determining section 1011 selects the transmission time $T_6$ as a control for comparison of transmission time in the processing of step S1003 shown in FIG. 11. When determining that a variation was present in case the determination is equal to or more than 3, the determination value M is more than 3 for the transmission time $T_{est}$ of the candidate frame so that the bandwidth variation determining section 1011 determines that a variation was present in the network bandwidth.

The transmission time predicting section 115 does not use the transmission times $T_1$ to $T_6$ before the transmission time $T_7$ when calculating the transmission time $T_{est}$ of the candidate frame. Thus, the predicted transmission time $T_{est}$ calculated by the transmission time predicting section 115 is obtained via the following expression (9):

$$T_{est}=(320+350+360+340)/4 \approx 343 \text{ [ms]} \qquad (9)$$

Assuming the time $T_{trans}$ required for conversion as $T_{trans}$=50 [ms], the wait time up to the start of conversion is obtained via the following expression (10):

$$T_{wait}=343-50=293 \text{ [ms]} \qquad (10)$$

Thus, the picture converter 112 starts picture conversion of the candidate frame when 293 [ms] has elapsed after the end of picture transmission of the preceding frame.

As mentioned earlier, according to picture transmission apparatus 1010 and a picture transmission method of this embodiment, the bandwidth variation determining section 1011 determines that a variation was present in the network bandwidth from the transmission time measured by the transmission time measuring section 114 when the variation as present in the network bandwidth. The transmission time predicting section 115 references only the transmission time after the variation in the network bandwidth from the measurement result of the time required from the start of picture transmission to the network 102 to the end of transmission. Thus the transmission time predicting section 115 can set the optimum start timing of picture conversion even in case a variation was present in the network bandwidth, thereby minimizing the time required from the start of picture conversion to the end of picture transmission. As a result, the time from reception of a picture transmission request from picture receiving apparatus 120 as a client to completion of picture transmission can be minimized. In this way, a delay in the picture play back in picture receiving apparatus 120 is minimized. That is, the latest converted pictures are transmitted from the picture transmission apparatus 1010 in real time, so that picture receiving apparatus 120 can play back the latest pictures.

It is possible to reduce the usage time of the network 102 to enable efficient use of the network as well as to raise the frame rate of the pictures received by the picture receiving apparatus 120.

Figure 13:
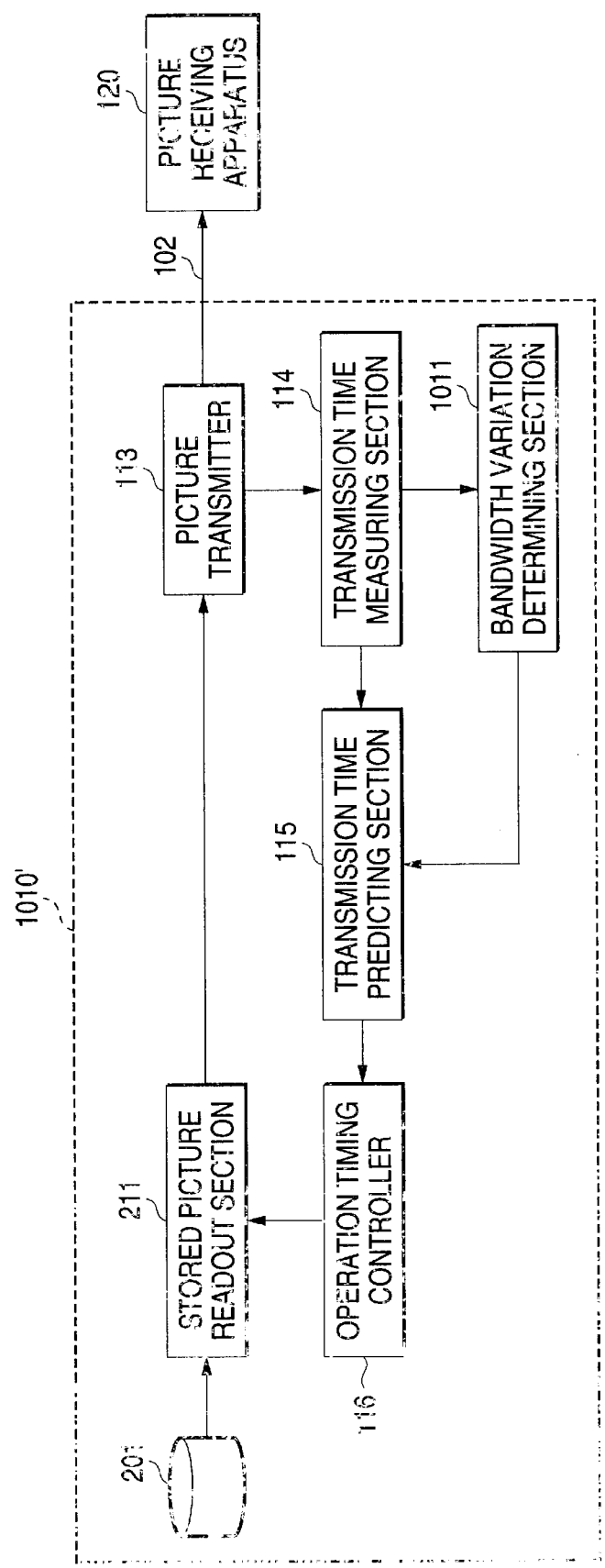
FIG. 13 is a block diagram that shows another configuration of a network picture transmission system that includes picture transmission apparatus according to the first embodiment.

As shown in FIG. 13, the picture transmission apparatus 1010 according to this embodiment may be replaced with the picture transmission apparatus 1010' comprising a recording medium 201 for storing converted picture data such as a hard disk and a video tape, a stored picture readout section 211 for reading picture from the recording medium 201, a picture transmitter 113, a transmission time measuring section 114, a bandwidth variation determining section 1011, a transmission time predicting section 115, and an operation timing controller 116 wherein the operation timing controller 116 controls the timing to read picture data from the stored picture readout section 211.

Figure 14:
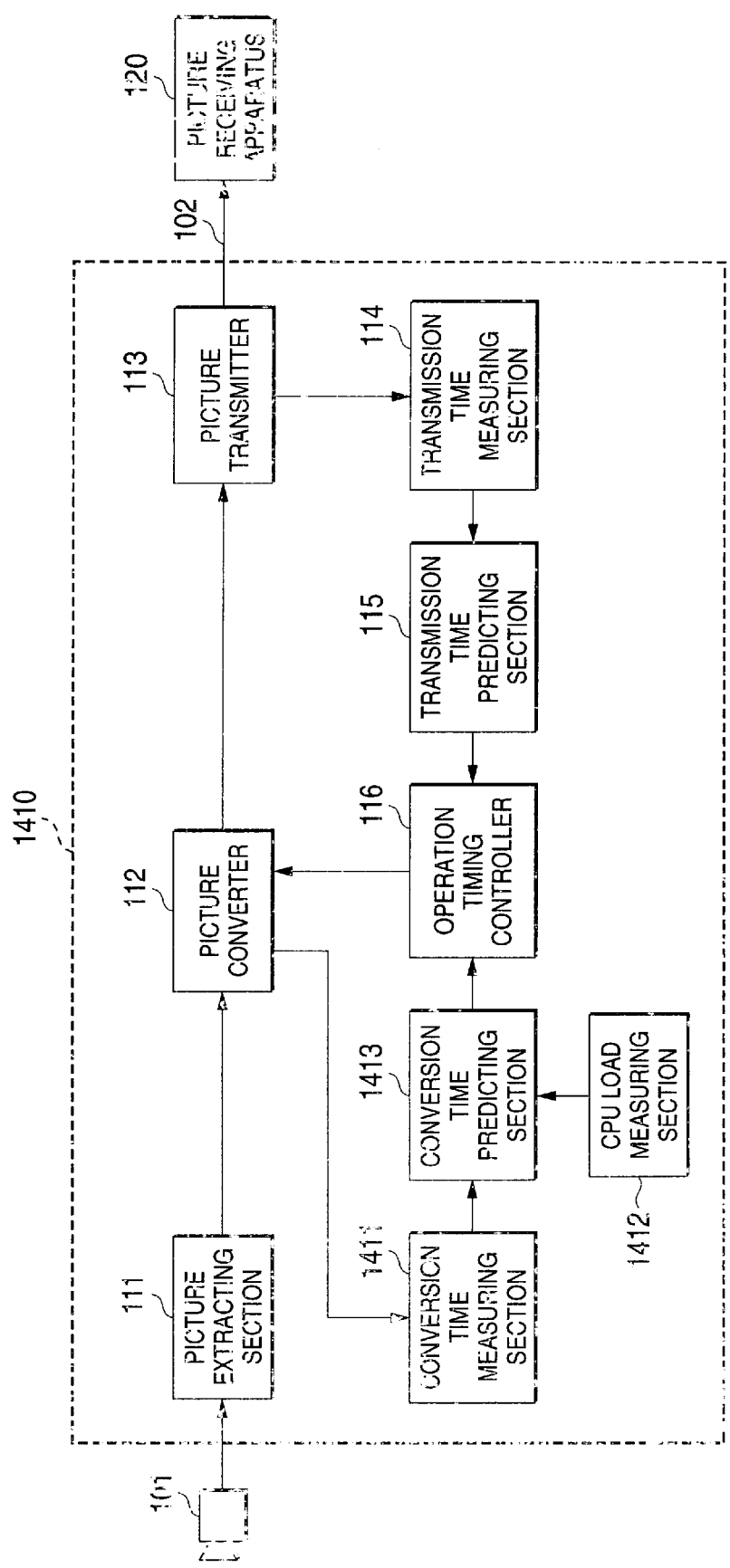
FIG. 14 is a block diagram that shows a network picture transmission system that includes picture transmission apparatus according to the fourth embodiment.

While picture transmission apparatus 110 according to the first embodiment predicts the time required for picture transmission from the measurement result by the transmission time measuring section 114 to control the start timing of picture conversion, the picture transmission apparatus according to this fourth embodiment considers the time required for picture conversion as well as the time required for picture transmission to control the start timing of picture conversion. A block diagram showing a network picture transmission system that includes picture transmission apparatus according to this embodiment is shown in FIG. 14. In FIG. 14, similar portions as in FIG. 1 (first embodiment) are given the same signs and corresponding description is omitted.

In FIG. 14, the network picture transmission system according to this embodiment comprises a video camera 101, picture transmission apparatus 1410 according to this embodiment of the invention, a network 102, and picture receiving apparatus 120. The picture transmission apparatus 1410 of this embodiment comprises a conversion time measuring section 1411 corresponding to conversion time measuring means according to the invention, a CPU load measuring section 1412 corresponding to CPU load measuring means, and a conversion time predicting section 1413 corresponding to conversion time predicting means, on top of the components of the picture transmission apparatus 110 of the first embodiment.

The conversion time measuring section 1411 measures the time required by the picture converter 112 to perform picture conversion and saves the measurement result. The CPU load measuring section 1412 measures the load of the central processing unit (CPU) that is not shown in the picture transmission apparatus 1410. This load is hereinafter referred to as CPU usage rate. The CPU performs processing concerning picture transmission and picture conversion or controls the components of the picture transmission apparatus 1410. The conversion time predicting section 1413 predicts the time required by picture converter 112 for picture conversion from the time required for picture conversion measured by the conversion time measuring section 1411 and the CPU usage rate measured by the CPU load measuring section 1412.

While transmission time predicting section 115 predicts the time required for picture transmission based on the transmission time of past frames measured by the transmission time measuring section 114 in the first embodiment, in this embodiment, when the time required for picture conversion in the picture converter 112 fluctuates depending on a change in the CPU load, the start timing of picture conversion is controlled so that the time required from the start of picture conversion to the end of picture transmission may be minimized. For this control to be effective, it is necessary to grasp in advance the time required for picture transmission and the time required for picture conversion.

A picture transmission method performed by picture transmission apparatus 1410 according to this embodiment will be described. First, the picture extracting section 111 extracts pictures on a per frame unit from the video camera 101. Next, the picture converter 112 converts pictures with the timing determined by the operation timing controller 116. The picture transmitter 113 transmits pictures converted to the network 102 toward a predetermined picture receiving apparatus 120. The transmission time measuring section 114 measures the time required by the picture transmitter 113 for picture transmission and saves the result. The conversion time measuring section 1411 measures the time required by the picture converter 112 for picture conversion and saves the measurement result.

In order for the operation timing controller 116 to control the start timing of picture conversion in the picture converter 112, the transmission time predicting section 115 has to predict the transmission time first. Then the conversion time predicting section 1413 has to predict the conversion time. Thus, the transmission time predicting section 115 calculates the predicted time (predicted transmission time) required for picture transmission in accordance with the method of the first embodiment. Then the conversion time predicting section 1413 calculates the predicted time (predicted conversion time) required for picture conversion in accordance with the method mentioned later. After such calculation is made, the operation timing controller 116 determines the start timing of picture conversion of pictures to be converted anew in accordance with the method mentioned later utilizing the predicted transmission time and the predicted conversion time.

Figure 15:
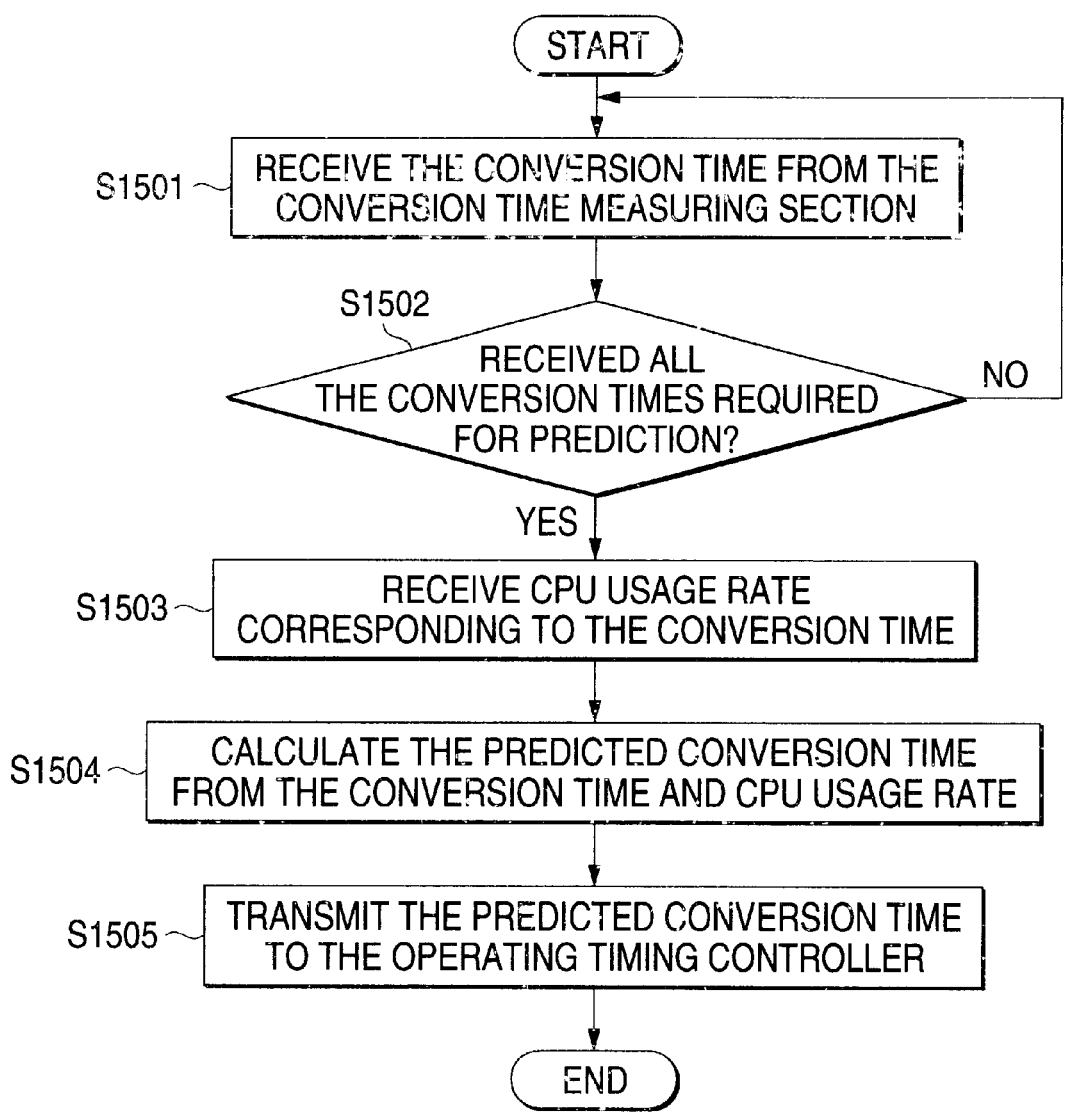
FIG. 15 is a flowchart that explains the method for predicting the time required for picture conversion (conversion time) in the fourth embodiment.
Figure 16:
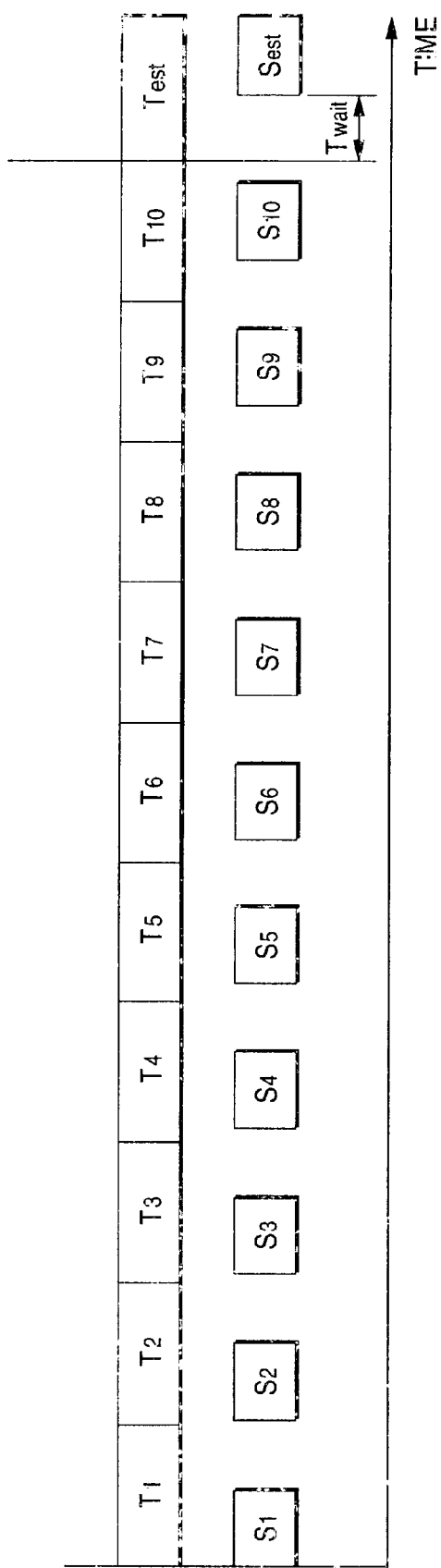
FIG. 16 is an explanatory drawing that shows the start timing of picture conversion determined in the fourth embodiment.

The method for predicting the conversion time used by the conversion time predicting section 1413 will be detailed referring to the flowchart of FIG. 15.

In step S1501, the conversion time predicting section 1413 receives the measured conversion time as a sample value from the conversion time measuring section 1411. In step S1502, the conversion time predicting section 1413 checks whether all conversion times required for prediction of the conversion time have been received, and in case not received, execution returns to step S1501. In case all conversion times required for prediction of the conversion time have been received, execution proceeds to step S1503.

In step S1503, the conversion time predicting section 1413 receives CPU usage rate data corresponding to each conversion time from the CPU load measuring section 1412. Next, in step S1504, the conversion time predicting section calculates the predicted conversion time from the conversion time and the CPU usage rate corresponding to each conversion time. For example, as shown in the expression below (11), values obtained by dividing the conversion times of N frames $S_1$ to $S_n$ that were previously converted, by respective corresponding CPU usage rate $C_n$ are summed up and the resulting value is divided by the number of conversion times N. The value is multiplied by the CPU usage rate $C_{est}$ at the time of prediction, and the resulting value is used as the prediction conversion time $S_{est}$ required for converting a single frame. In the expression (11), it is assumed that the CPU usage rate C is proportional to the time required for conversion $S_n$.

$$S_{est} = \left(\left(\sum_{n=1}^{N} S_n / C_n\right)\right) / N \times C_{est} \qquad (11)$$

In step S1505, the conversion time predicting section 1413 transmits the calculated prediction conversion time $S_{est}$ to the operation timing controller 116 to terminate processing concerning prediction of the conversion time. The method for calculating the predicted conversion time shown in the expression (11) is an example and the predicted conversion time may be obtained via another calculation method.

Next, the operation timing controller 116 determines the timing to start picture conversion in the picture converter 112 based on the predicted conversion time $S_{est}$ and the predicted transmission time $T_{est}$ calculated by the transmission time predicting section 115. Here, assuming the wait time from the start of transmission to the start of picture conversion as $T_{wait}$, the wait time $T_{wait}$ is obtained via the following expression (12):

$$T_{wait} = T_{est} - S_{est} \quad (12)$$

The operation timing controller 116 controls the start timing of picture conversion in the picture converter 112 based on the wait time $T_{wait}$ thus obtained so that picture conversion may start when the wait time $T_{wait}$ has elapsed after the start of picture transmission. Accordingly, the picture converter 112 starts picture conversion when the wait time $T_{wait}$ has elapsed after the start of picture transmission.

An example is shown below. Assume that the conversion time predicting section 1413 calculates the predicted conversion time from the conversion times of the past 10 frames and that the conversion times $S_1$ to $S_{10}$ are $S_1=40[\%]$, $S_2=30[\%]$, $S_3=30[\%]$, $S_4=30[\%]$, $S_5=60[\%]$, $S_6=70[\%]$, $S_7=80[\%]$, $S_8=70[\%]$, $S_9=40[\%]$, and $S_{10}=40[\%]$. Assume that the CPU usage rates $C_1$ to $C_{10}$ are $C_1=10[\%]$, $C_2=10[\%]$, $C_3=10[\%]$, $C_4=10[\%]$, $C_5=20[\%]$, $C_6=20[\%]$, $C_7=20[\%]$, $C_8=20[\%]$, $C_9=10[\%]$, and $C_{10}=10[\%]$ and that $C_{est}=10[\%]$. In this case, the predicted conversion time that $S_{est}$ is obtained via the following expression (13):

$$S_{est}=(40/10+30/10+30/10+30/10+60/20+70/20+80/20+70/20+40/10+40/10)/10\times10=35 \text{ [ms]} \quad (13)$$

Here, assuming that the time $T_{est}$ required for picture transmission as $T_{est}=103$ [ms], same as the first embodiment, the wait time up to the start of picture conversion $T_{wait}$ is obtained via the following expression (14):

$$T_{wait}=103-35=68 \text{ [ms]} \quad (14)$$

Thus, the picture converter 112 starts picture transmission of the candidate frame when 68 [ms] has elapsed after the end of picture transmission of the preceding frame.

As mentioned earlier, in the picture transmission apparatus 1410 and a picture transmission method according to this embodiment, the start timing of picture conversion is controlled so that picture transmission may start simultaneously with the end of picture conversion, considering the time required for picture transmission as well as the time required for picture conversion. Thus it is possible to minimize the time required from the start of picture conversion to the end of picture transmission even when the time required for picture conversion in the picture converter 112 fluctuates depending on a change in the CPU load. As a result, the time from reception of a picture transmission request from picture receiving apparatus as a client to completion of picture transmission can be minimized. In this way, a delay in the picture playback in picture receiving apparatus 120 is minimized. That is, the latest pictures are transmitted from the picture transmission apparatus 1410 in real time so that the picture receiving apparatus 120 can play back the latest pictures.

It is possible to reduce the network usage time to enable efficient use of the network as well as to raise the frame rate of the pictures received by the picture receiving apparatus 120.

Figure 17:
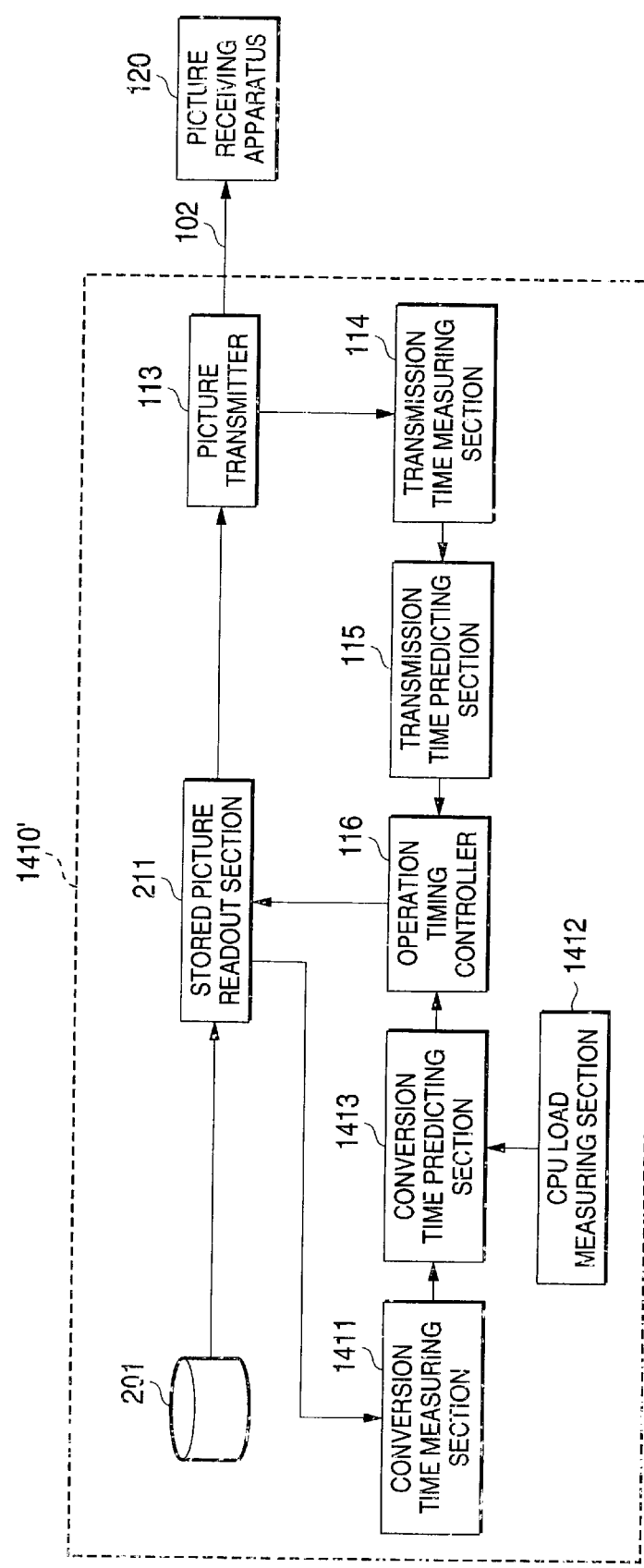
FIG. 17 is a block diagram that shows another configuration of a network picture transmission system that includes picture transmission apparatus according to the fourth embodiment.

As shown in FIG. 17, the picture transmission apparatus 1410 according to this embodiment may be replaced with the picture transmission apparatus 1410' comprising a recording medium 201 for storing converted picture data such as a hard disk and a video tape, a stored picture readout section 211 for reading picture from the recording medium 201, a picture transmitter 113, a transmission time measuring section 114, a transmission time predicting section 115, an operation timing controller 116, a conversion time measuring section 1411, a CPU load measuring section 1412, and a conversion time predicting section 1413 wherein the operation timing controller 116 controls the timing to read picture data from the stored picture readout section 211.

Figure 18:
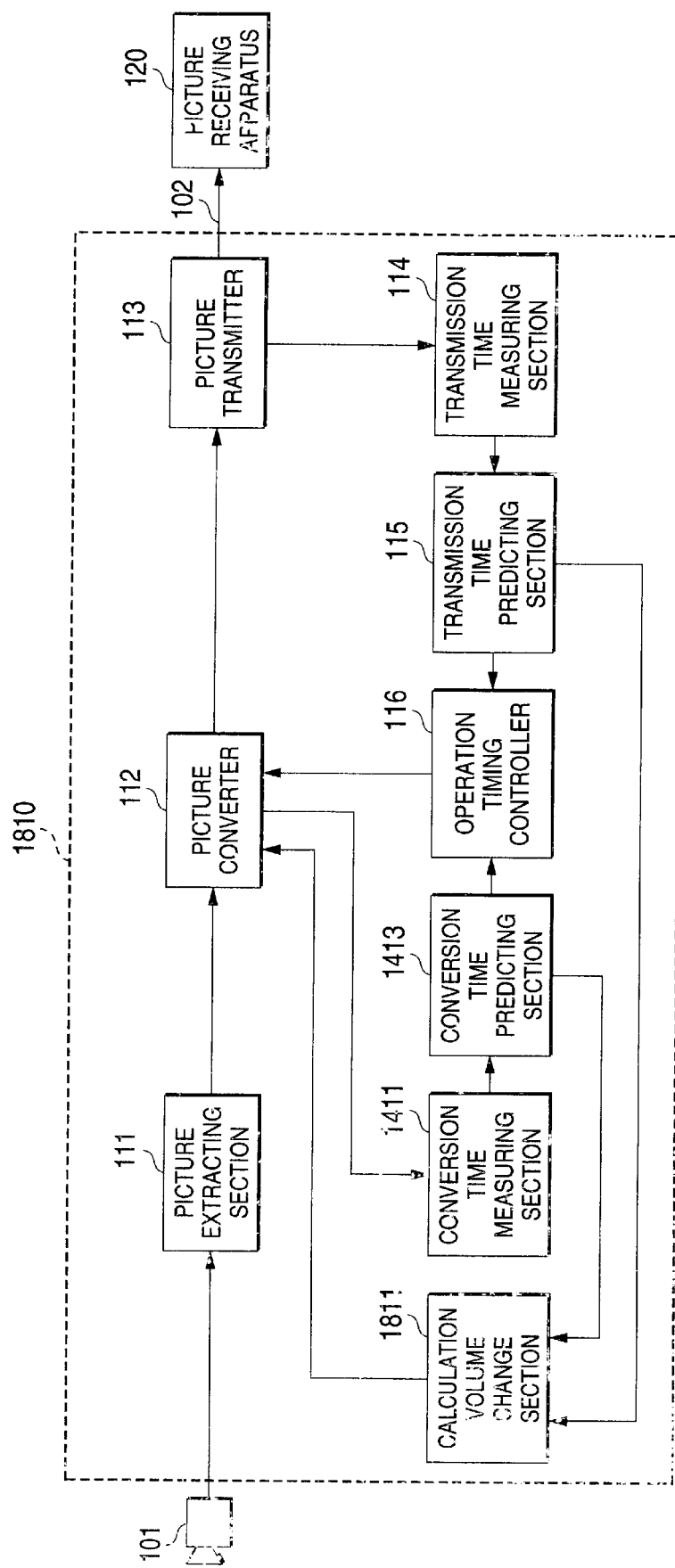
FIG. 18 is a block diagram that shows a network picture transmission system that includes picture transmission apparatus according to the second embodiment.

While picture transmission apparatus 1410 according to the fourth embodiment predicts the time required for picture transmission from the measurement result by the transmission time measuring section 114 and predicts the time required for picture conversion from the measurement result by the conversion time measuring section 1411 to control the start timing of picture conversion, in the picture transmission apparatus according to this fifth embodiment, the operation volume of the picture conversion is controlled so that picture conversion may start simultaneously with picture transmission and that picture conversion may terminate simultaneously with picture transmission. A block diagram showing a network picture transmission system that includes picture transmission apparatus according to this embodiment is shown in FIG. 18. In FIG. 18, similar portions as in FIG. 14 (fourth embodiment) are given the same signs and corresponding description is omitted.

In FIG. 18, the network picture transmission system according to this embodiment comprises a video camera 101, picture transmission apparatus 1810 according to this embodiment of the invention, a network 102, and picture receiving apparatus 120. The picture transmission apparatus 1810 of this embodiment comprises a conversion calculation volume change section 1811 corresponding to conversion calculation volume change means according to the invention instead of a CPU load measuring section 1412 in the picture transmission apparatus according to the fourth embodiment. The picture transmission apparatus 1810 may also comprise a CPU load measuring section 1412.

The conversion calculation volume change section 1811 instructs the picture converter 112 to change the calculation volume required for picture conversion by a certain volume based on the predicted transmission time calculated by the transmission time predicting section 115 and the predicted conversion time calculated by the conversion time measuring section 1411. Via at least a single instruction from the conversion calculation volume change section 1811, the time 1901 required for picture conversion becomes equal to the time 1902 required for picture transmission.

Figure 19:
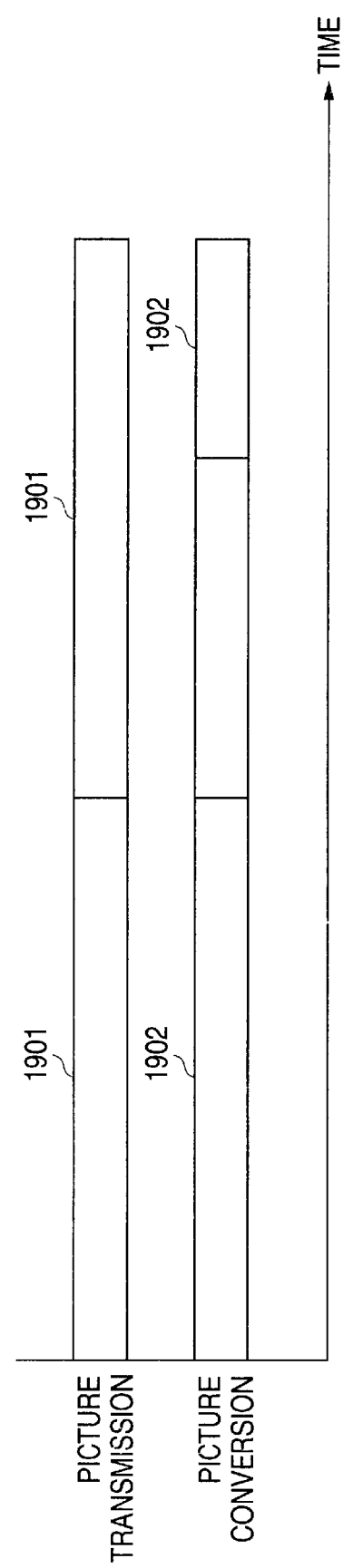
FIG. 19 is an explanatory drawing that shows the start timing of picture conversion determined in the fifth embodiment.

When the picture conversion (1902) shown in FIG. 19 is compared with the picture conversion (302) shown in FIG. 2, it is understood that the picture conversion (1902) shown in FIG. 19 according to this embodiment takes longer time, and since the time required for picture conversion is longer, the picture conversion (1902) can transmit a higher-quality pictures to the picture transmission apparatus 113. For example, in case pictures extracted by the picture extracting section 111 undergoes MPEG encoding in the picture converter 112, the calculation amount can be increased by increasing the volume of motion vectors to generate higher-quality P frames.

Figure 20:
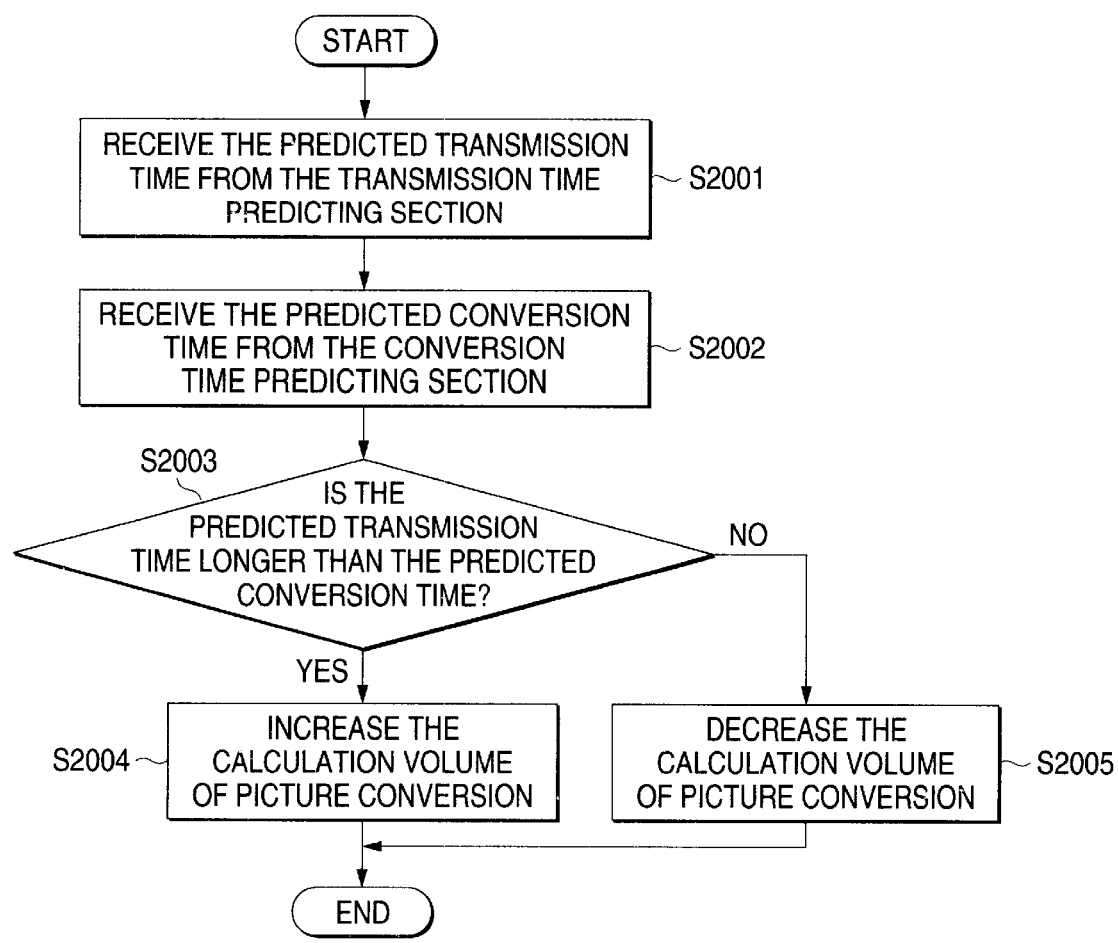
FIG. 20 is a flowchart that explains the method for changing the calculation volume of picture conversion.

The method for changing the calculation amount in the picture conversion made by the conversion calculation volume change section 1811 will be detailed referring to the flowchart of FIG. 20.

First, in step S2001, the conversion calculation volume change section 1811 receives a predicted transmission time from the transmission time predicting section 115. Next, in step S2002, the conversion calculation volume change section 1811 receives a predicted conversion time from the conversion time predicting section 1413.

In step S2003, the conversion calculation volume change section 1811 compares the predicted transmission time with the predicted conversion time. In case the predicted transmission time is longer than the predicted conversion time, execution proceeds to step S2004. In case the predicted transmission time is shorter than the predicted conversion time, execution proceeds to step S2005. In step S2004, the conversion calculation volume change section 1811 instructs the picture converter 112 to increase the calculation volume required for picture conversion to terminate the processing. In step S2005, the conversion calculation volume change section 1811 instructs the picture converter 112 to decrease the calculation volume required for picture conversion to terminate the processing.

Figure 21:
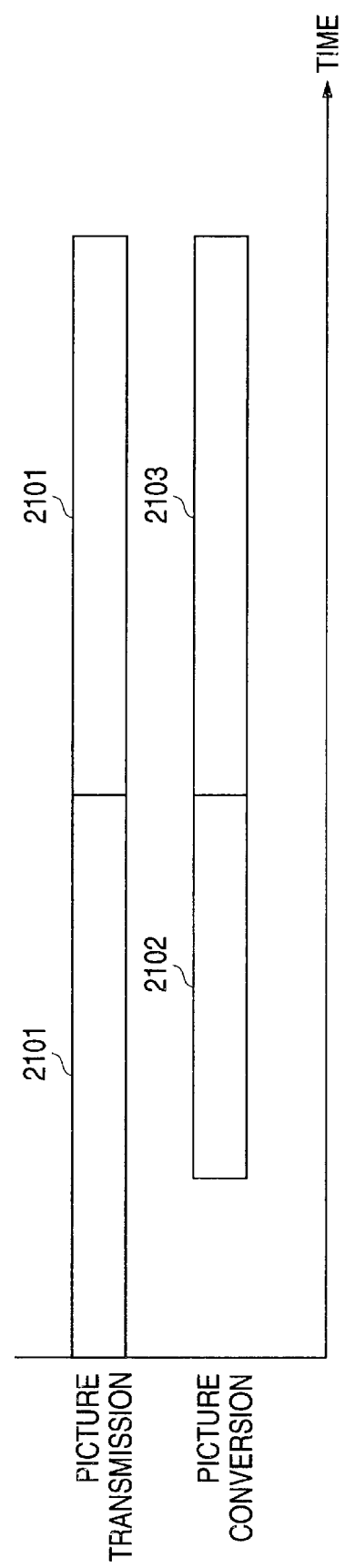
FIG. 21 is an explanatory drawing that shows the predicted time before and after the calculation volume of picture compression is changed.

For example, FIG. 21 is an explanatory drawing that shows the predicted times before and after the calculation volume of picture compression is changed. Assume that the predicted transmission time 2101 is 150 [ms] and the predicted conversion time 2102 before the calculation volume of picture compression is changed is 100 [ms]. In this case, the conversion calculation volume change section 1811 instructs the picture converter 112 to change the calculation volume required for picture conversion by a certain volume to generate high-quality compressed pictures. In case the predicted conversion time is not equal to the predicted transmission time 2101 (150 [ms]) as a result of this instruction, the conversion calculation volume change section 1811 instructs the picture converter 112 to change the calculation volume again in the next picture conversion and picture transmission. By repeating this instruction, the predicted conversion time 2103 assumed after the calculation volume of picture compression is changed becomes 150 [ms].

As mentioned earlier, in the picture transmission apparatus 1810 and a picture transmission method according to this embodiment, the operation volume of the picture conversion is controlled so that picture conversion may start simultaneously with picture transmission and that picture conversion may terminate simultaneously with picture transmission. Especially, in case the operation volume of picture conversion is increased, the picture conversion may take longer time thus generating high-quality compressed pictures. As a result, it is possible to transmit compressed pictures whose picture quality is suitable for the picture transmission time while maintaining the frame rate.

It is also possible to reduce usage time of the network 102 to enable efficient use of the network 102 as well as to raise the frame rate of the pictures received by the picture receiving apparatus 120.

While in this embodiment the instruction of changing the calculation volume of picture compression via the conversion calculation volume change section 1811 is "change by a certain volume" and instruction of changing the calculation volume is repeated until the picture transmission time 2101 becomes equal to the picture compression time 2103 after change in the calculation volume, another configuration is possible where a table of correspondence between the picture conversion time and the calculation volume required for picture conversion is provided in the conversion calculation volume change section 1811 and the conversion calculation volume change section 1811 references this table and instructs the picture converter 112 to change the calculation volume obtained from the difference between the time required for picture transmission and the time required for picture conversion.

Figure 22:
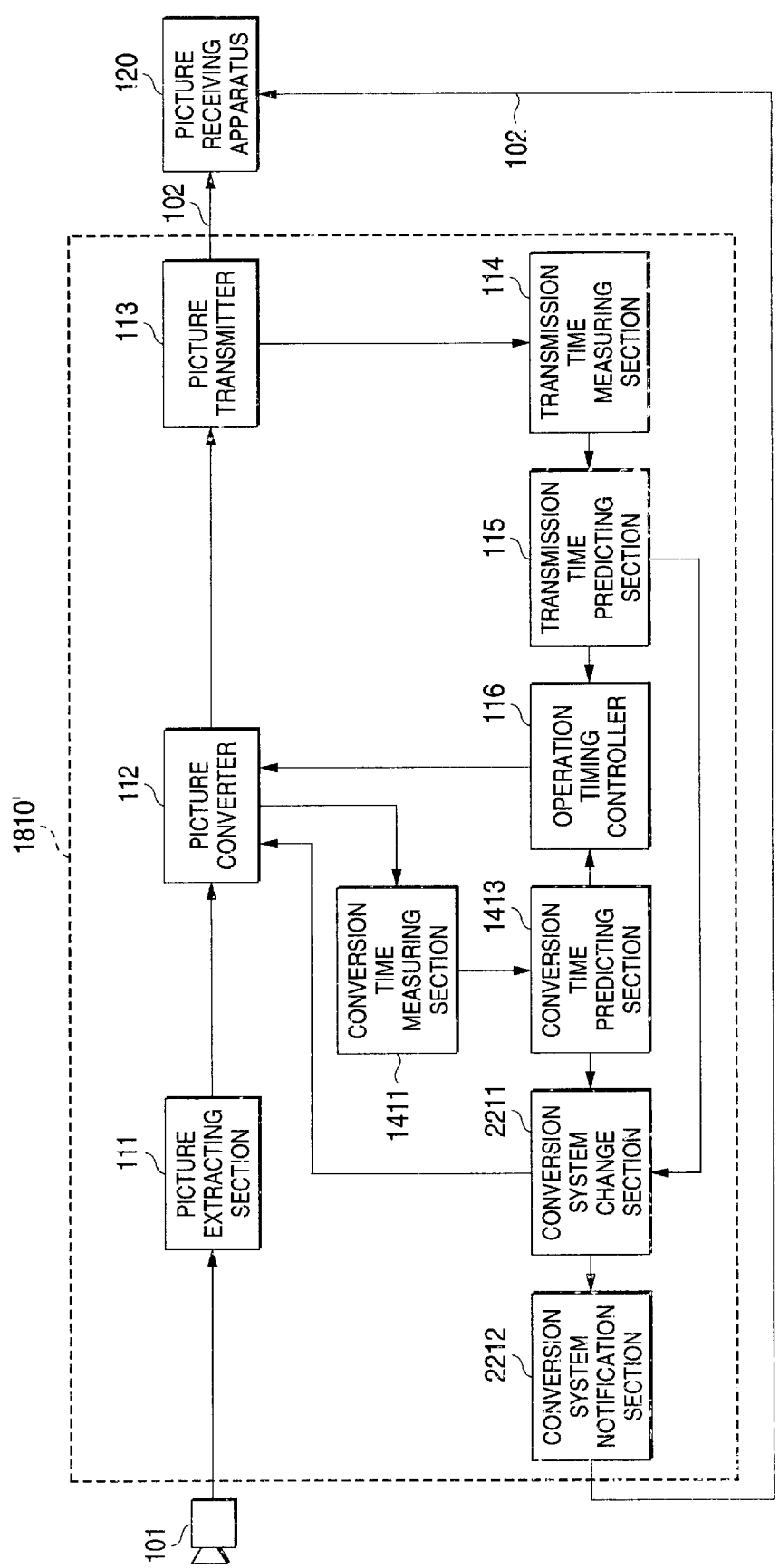
FIG. 22 is a block diagram that shows another configuration of a network picture transmission system that includes picture transmission apparatus according to the fifth embodiment.

It is possible to change the picture conversion system such as from MPEG1 to MPEG4, depending on the predicted transmission time calculated by the transmission time predicting section 115 and the predicted conversion time calculated by the conversion time predicting section. In this case, as shown in FIG. 22, it is possible to provide, instead of a conversion calculation volume change section 1811, a conversion system change section 2211 corresponding to conversion system change means according to the invention for instructing the picture converter 112 to change the picture conversion system, and a conversion system notification section 2212 corresponding to conversion system notification means for notifying the picture receiving apparatus of the change in the picture conversion system. According to picture transmission apparatus 1810' of such a configuration, it is possible to change the time required for picture conversion, same as picture transmission apparatus 1810 according to this embodiment.

Figure 23:
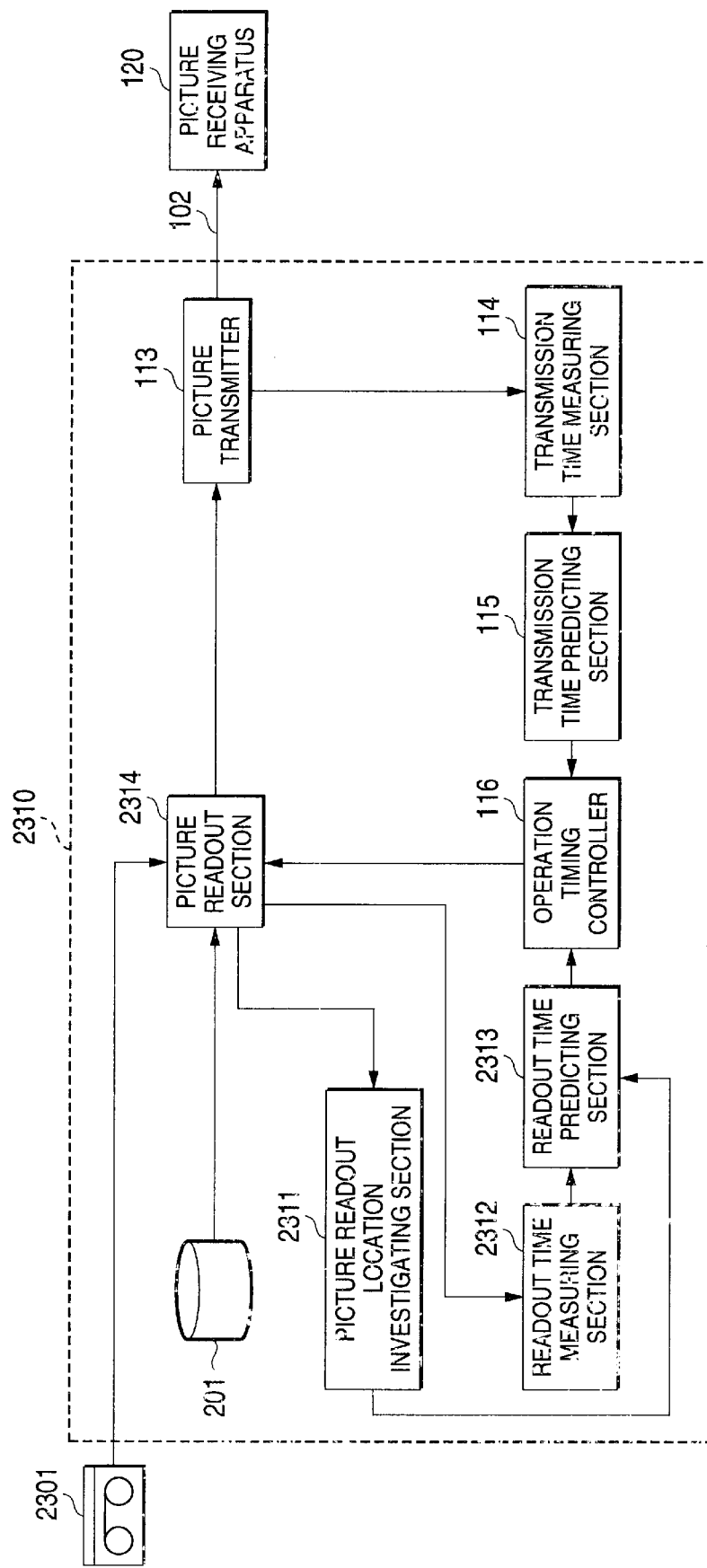
FIG. 23 is a block diagram that shows a network picture transmission system that includes picture transmission apparatus according to the sixth embodiment.

While picture transmission apparatus 110 according to the first embodiment predicts the time required for picture transmission from the measurement result by the transmission time measuring section 114 to control the start timing of picture conversion, in the picture transmission apparatus according to this sixth embodiment, the start timing of picture conversion is controlled by investigating the location where pictures are read as well as the time required for picture transmission thus predicting the time required for picture readout. A block diagram showing a network picture transmission system that includes picture transmission apparatus according to this embodiment is shown in FIG. 23. In FIG. 23, similar portions as in FIG. 1 (first embodiment) are given the same signs and corresponding description is omitted.

In FIG. 23, the network picture transmission system according to this embodiment comprises a video tape 2301 where picture data that has undergone picture conversion is recorded, picture transmission apparatus 2310 according to this embodiment of the invention, a network 102, and picture receiving apparatus 120. The picture transmission apparatus 2310 of this embodiment comprises a recording medium 201 such as a hard disk and a video tape, a picture readout section 2314 corresponding to picture readout means according to the invention, a picture transmitter 113, a transmission time measuring section 114, a transmission time predicting section 115, an operation timing controller 116, a picture readout location investigating section 2311 corresponding to picture readout location investigating means, a readout time measuring section 2312 corresponding to readout time measuring means, and a readout time predicting section 2313 corresponding to readout time predicting means.

The picture readout section 2314 reads picture data from the video tape 2301 or a recording medium 201. The picture readout location investigating section 2311 investigates the location where picture data read by the picture readout section 2314 was stored (such as a video camera, hard disk, or video tape). The readout time measuring section 2312 measures the time required for picture readout and saves the measurement result. The readout time predicting section 2313 uses a predetermined number of measurement results in the measurement result saved in the readout time measuring section 2312 to predict the time required for picture readout. Other components of the picture transmission apparatus 2310 are same as those in the picture transmission apparatus 110 of the first embodiment.

While in the first embodiment the transmission time predicting section 115 predicts time required for picture transmission from the transmission time of the past frames measured by the transmission time measuring section 114, in this embodiment, the start timing of picture readout is controlled so that the time required from the start of picture readout to the end of picture transmission may be minimized when the location where the picture readout section 2314 reads picture data has changed for example from a video tape 2301 to a recording medium 201. For this control to be effective, it is necessary to grasp in advance the time required for picture transmission and the time required for picture readout.

The method for picture transmission used by picture transmission apparatus according to this embodiment will be described. First, the picture readout section 2314 reads picture data that has undergone picture conversion from the video tape 2301. In this practice, the readout time measuring section 2312 measures the time required for picture readout in the picture readout section 2314 and saves the measurement result. The picture readout location investigating section 2311 notifies the readout time predicting section 2313 that the location of picture data read by the picture readout section 2314 has changed in case such an event has taken place. The readout time predicting section 2313 calculates the predicted time (predicted transmission time) required for picture readout in accordance with the method mentioned later.

The picture transmitter 113 transmits picture data read by the picture readout section 2314 to the network 102 toward predetermined picture receiving apparatus 120. In this practice, the transmission time measuring section 114 measures the time required for picture transmission and saves the measurement result. The transmission time predicting section 115 calculates the predicted time (predicted transmission time) required for picture transmission in accordance with the method of the first embodiment. After such calculation is made, the operation timing controller 116 determines the start timing of picture readout of pictures to be read anew in accordance with the method mentioned later utilizing the predicted readout time and the predicted transmission time.

Figure 24:
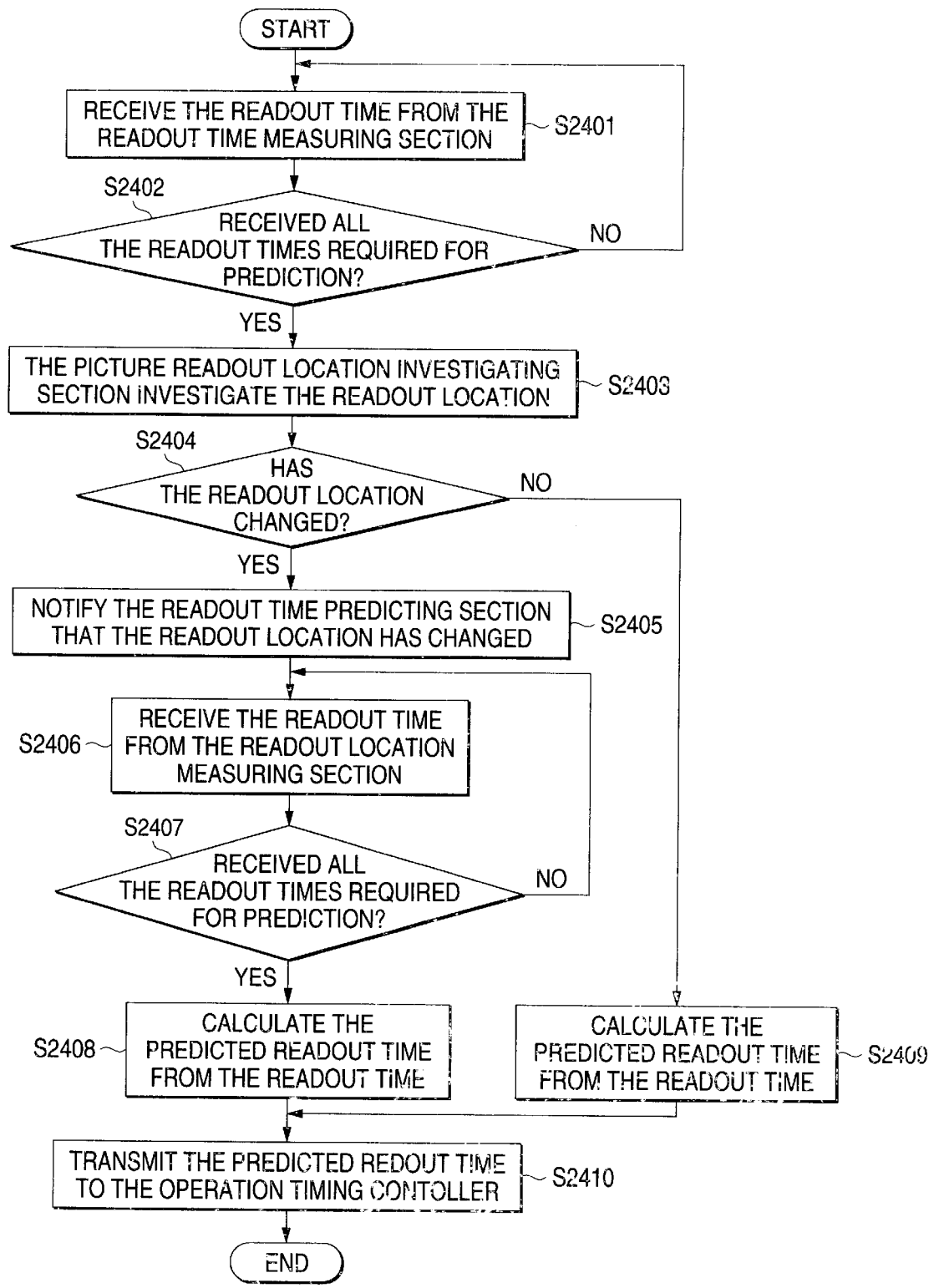
FIG. 24 is a flowchart that explains the method for predicting the transmission time required for picture readout (readout time) in the sixth embodiment.
Figure 25:
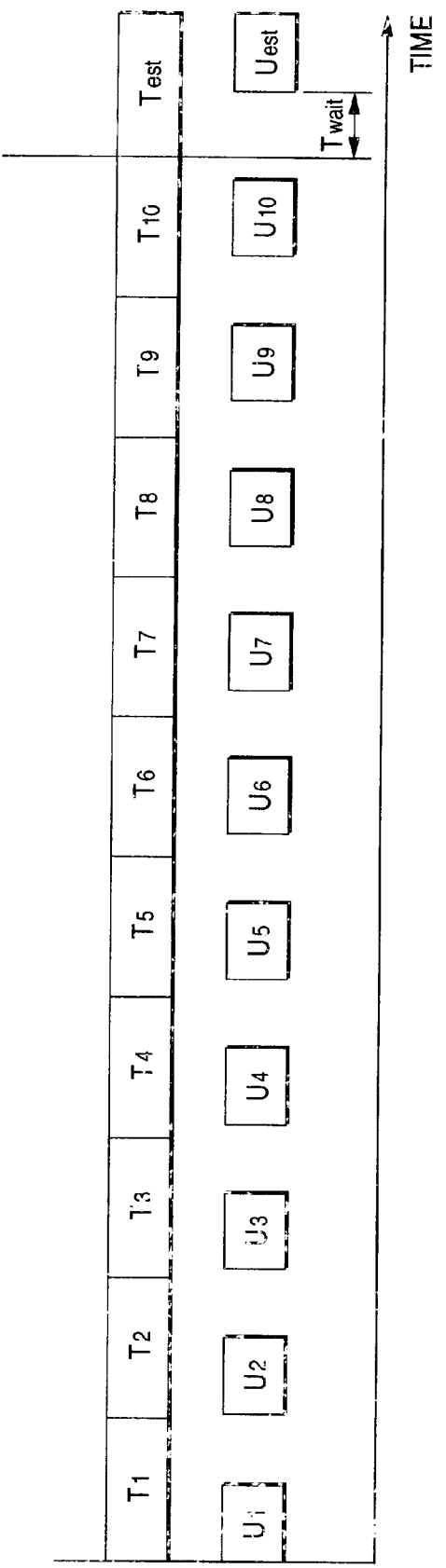
FIG. 25 is an explanatory drawing that shows the start timing of picture readout determined in the first embodiment.

The method for predicting the read time used by the readout time predicting section 2313 will be detailed referring to the flowchart of FIG. 24.

In step S2401, the readout time predicting section 2313 receives the readout time measured by the readout time measuring section 2312 as a sample value. In step S2402, the readout time predicting section 2313 checks whether all of a predetermined number of readout times required for prediction of the readout time have been received, and in case not received, execution returns to step S2401. In case all readout times required for prediction of the readout time have been received, execution proceeds to step S2403.

In step S2403, the picture readout location investigating section 2311 investigates the location where picture data is stored. In step S2404, the picture readout location investigating section 2311 investigates whether the readout location for picture data read by the picture readout section 2314 has changed. In case the location has not changed, execution proceeds to step S2409. In case the location has changed, execution proceeds to step S2405. In step S2409, the picture readout location investigating section 2311 calculates the time (predicted time) required for picture readout based on the readout time then execution proceeds to step S2410. The method for calculating the predicted readout time is, as shown in the expression below (15), such that an average of the readout times $U_1$ to $U_N$ of the past frames that were read is obtained and the value is used as the predicted readout time $U_{est}$ required for reading a single frame. The method for calculating the predicted readout time as shown in expression (15) is an example and the predicted readout time may be obtained via another calculation method.

$$U_{est} = \sum_{n=1}^{N} U_n / N \tag{15}$$

In step S2405, the picture readout location investigating section 2311 notifies the readout time predicting section 2313 that the location of data readout has changed. In step S2406, the measurement result of the time (readout time) required for picture readout measured by the readout time measuring section 2312 is received as a sample value. In step S2407, it is checked whether all of a predetermined number of readout times required for prediction of the readout time have been received, and in case not received, execution returns to step S2406. In case all readout times required for prediction of the readout time have been received, execution proceeds to step S2408.

In step S2408, same as step S2409, the sample value is used to calculate the predicted time (predicted readout time) required for picture readout. In step S2410, the predicted readout time $U_{est}$ thus calculated is transmitted to the operation timing controller 116 and processing concerning prediction of the readout time is terminated.

Next, the operation timing controller 116 determines the timing to start picture readout in the picture readout section 2314 based on the predicted readout time $U_{est}$ calculated by the readout time predicting section 2313 and the predicted transmission time $T_{est}$ calculated by the transmission time predicting section 115. Here, assuming the wait time from the start of transmission to the start of picture readout as $T_{wait}$, the wait time $T_{wait}$ is obtained via the following expression (16):

$$T_{wait} = T_{est} - U_{est} \tag{16}$$

The operation timing controller 116 controls the start timing of picture readout in the picture readout section 2314 based on the wait time $T_{wait}$ thus obtained so that picture readout may start when the wait time $T_{wait}$ has elapsed after the start of picture transmission. Accordingly, picture readout section 2314 starts picture readout when the wait time $T_{wait}$ has elapsed after the start of picture transmission.

An example is shown below. Assume that the readout time predicting section 2313 calculates the predicted readout time from the readout times of the past 10 frames and that the readout times $U_1$ to $U_{10}$ are $U_2$=30 [ms], $U_2$=20 [ms], $U_3$=30 [ms], $U_4$=30 [ms], $U_5$=80 [ms], $U_6$=70 [ms], $U_7$=80 [ms], $U_8$=70 [ms], $U_9$=90 [ms], and $U_{10}$=80 [ms]. Assume that the readout location from which picture data is transmitted to the picture readout section 2314 has changed from the video camera 2313 to the recording medium 201. In this case, the predicted readout time $U_{est}$ calculated by the readout time predicting section 2313 is obtained via the following expression (17):

$$U_{est} = (80+70+80+70+90+80)/6 \approx 78 \text{ [ms]} \tag{17}$$

wherein the calculation result of the expression (17) is rounded off to the first decimal place.

Here, assuming that the predicted transmission time $T_{est}$ as $T_{est}$=103 [ms], the wait time up to the start of picture readout $T_{wait}$ is obtained via the following expression (18):

$$T_{wait} = 103 - 78 = 25 \text{ [ms]} \tag{18}$$

Thus, picture readout section 2314 starts picture conversion when 25 [ms] has elapsed after the picture transmission started.

As mentioned earlier, in the picture transmission apparatus 2310 and a picture transmission method according to this embodiment, the start timing of picture readout is controlled so that picture transmission may start simultaneously with the end of picture readout, even when the time required for picture readout has changed because the readout location to supply picture data to the picture readout section 2314.

Thus it is possible to reduce the usage time of the network 102 to enable efficient use of the network 102 as well as to raise the frame rate (number of frames that can be transmitted per second). As a result, it is possible to minimize the time from reception of a picture transmission request from picture receiving apparatus 120 as a client to completion of picture transmission. In this way, it is possible to minimize a delay in the picture playback in picture receiving apparatus 120. That is, the latest pictures are transmitted from the picture transmission apparatus 2310 in real time so that the picture receiving apparatus 120 can play back the latest pictures.

While picture transmission apparatus 110 according to the first embodiment predicts the time required for picture transmission from the measurement result by the transmission time measuring section 114 to control the start timing of picture conversion, in the picture transmission apparatus according to this seventh embodiment, the start timings of picture conversion and picture reception or picture transmission and picture conversion are controlled by predicting the time required for picture reception and picture transmission, when a picture extracting section 111 receives pictures via a network, a picture transmitter 113 uses the same network as that used by the picture extracting section 111, and picture reception and picture conversion and picture transmission operate in parallel.

Figure 26:
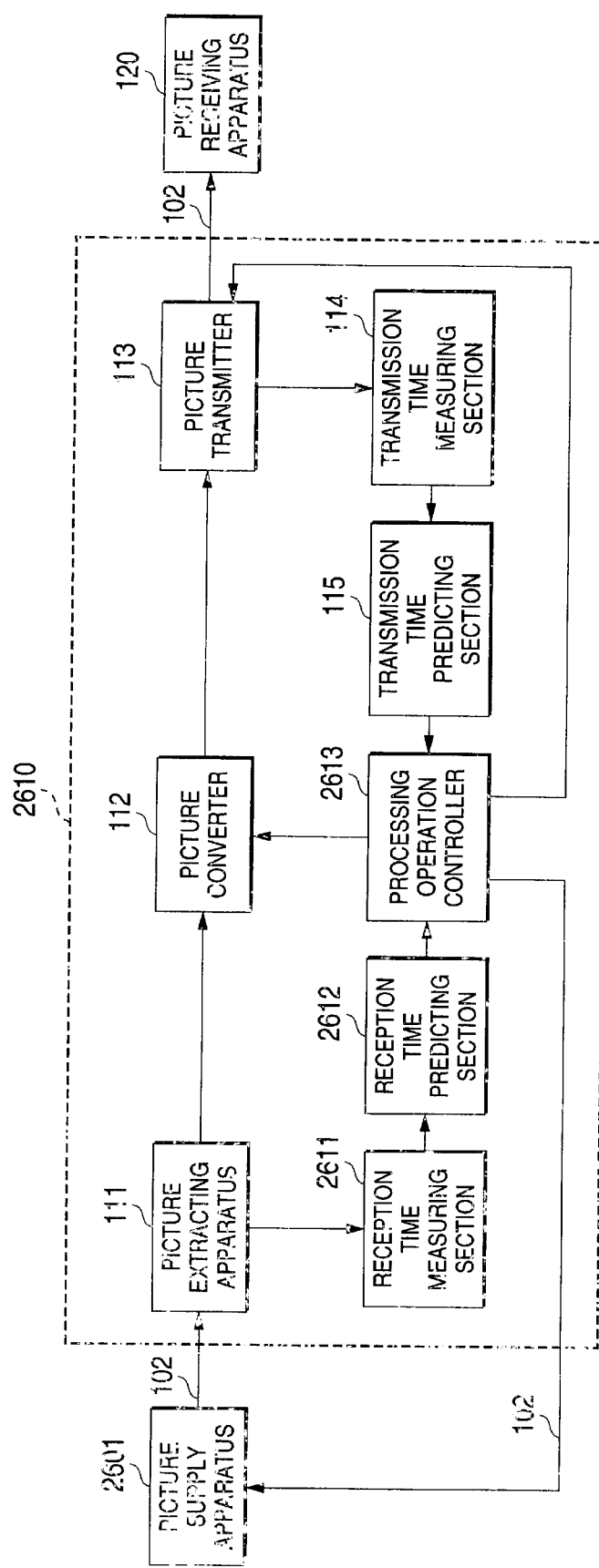
FIG. 26 is a block diagram that shows a network picture transmission system that includes picture transmission apparatus according to the seventh embodiment.

A block diagram showing a network picture transmission system that includes picture transmission apparatus according to this embodiment is shown in FIG. 26. In FIG. 26, similar portions as in FIG. 1 (first embodiment) are given the same signs and corresponding description is omitted. In FIG. 26, a network picture transmission system according to this embodiment comprises a network 102, at least one piece of picture supply apparatus 2601, picture transmission apparatus 2610 according to this embodiment, and picture receiving apparatus. The picture supply apparatus 2601 supplies pictures to picture transmission apparatus via the network 102.

The picture supply apparatus 2610 according to this embodiment comprises a processing operation controller 2613 corresponding to processing operation control means according to the invention instead of an operation timing controller 116. The picture supply apparatus 2601 further comprises a reception time measuring section 2611 corresponding to reception time measuring means and a reception time predicting section 2612 corresponding to reception time predicting means. The reception time measuring section 2611 measures the time required by the picture extracting section 111 to receive pictures and saves the measurement result. The reception time predicting section 2612 uses a predetermined number of measurement results in the measurement result saved in the reception time measuring section 2611 to predict the time required for picture reception.

The processing operation controller 2613 constantly operates either picture transmission or picture reception and controls the start timing to start the non-operating processing and picture conversion processing in accordance with the operating processing. Other components of the picture transmission apparatus 2610 are same as those in the picture transmission apparatus 110 of the first embodiment.

The method for picture transmission used by picture transmission apparatus 2610 according to this embodiment will be described. First, the picture extracting section 111 receives pictures from the picture supply apparatus 2601 via the network 102. In this practice, the reception time measuring section 2611 measures the time required by the picture extracting section 111 to receive pictures from the picture supply apparatus 2601. The reception time predicting section 2612 calculates the predicted time (predicted reception time) required for picture reception in accordance with the method of the first embodiment.

The picture converter 112 performs picture conversion with the timing determined by the processing operation controller 2613. The picture transmitter 113 transmits converted pictures to the network 102 toward the predetermined picture receiving apparatus 120. In this practice, the transmission time measuring section 114 measures the time required for picture transmission and saves the measurement result. The transmission time predicting section 115 calculates the predicted time (predicted transmission time) required for picture transmission in accordance with the method of the first embodiment.

After such calculation is made, the operation timing controller 116 determines the start timing of picture conversion and picture reception or picture transmission and picture conversion in accordance with the method mentioned later utilizing the predicted reception time and the predicted transmission time.

A picture transmission method used by picture transmission apparatus 2610 according to this embodiment focusing on the operation of the processing operation controller 2613 will be described referring to the flowchart of FIG. 27.

In step S2701, the processing operation controller 2613 receives the predicted reception time from the reception time predicting section 2612. In step S2702, the processing operation controller 2613 receives the predicted transmission time from the transmission time predicting section 115. In step S2703, the predicted reception time is compared with the predicted transmission time. In case the predicted transmission time is longer than the predicted reception time, execution proceeds to step S2704. In case the predicted transmission time is shorter than the predicted reception time, execution proceeds to step S2706.

In case the picture transmission apparatus 110 receives pictures from the picture supply apparatus 2601 and transmits pictures that have undergone picture conversion in the picture converter 112, the data volume received by the picture extracting section 111 is larger than the data volume transmitted by the picture transmitter 113. Thus, in general, the reception time is longer than the transmission time. In case the picture transmission apparatus 110 receives pictures from a plurality of pieces of picture supply apparatus 2601 and a picture synthesized on a single frame in the picture converter 112 is transmitted, the data volume transmitted by the picture transmitter 113 is larger than the data amount received by the picture extracting section 111, so that, in general, the reception time is longer than the transmission time.

In step S2704 (in case the predicted transmission time is longer than the predicted reception time), the start timing of picture conversion is determined. The start timing of picture conversion is determined in accordance with the expression $T_{wait}=T_{est}-T_{trans}$ (where $T_{trans}$ is the time required for picture conversion, $T_{est}$ is predicted transmission time, $T_{wait}$ is the wait time from the start of picture transmission to the start of picture conversion) as shown in the expression (2) of the first embodiment. Thus, picture conversion is started when the wait time $T_{wait}$ has elapsed after the start of picture transmission. In case picture reception is not complete when the wait time $T_{wait}$ has elapsed, execution waits until picture reception is complete.

In step S2705, the start timing of picture reception is determined. The start timing of picture reception is determined in accordance with the expression below (19) assuming that the predicted reception time is $V_{est}$. The processing operation controller 2613 notifies the picture supply apparatus 2601 of the value of the wait time $V_{wait}$ to terminate processing so that picture reception may be started when the wait time $V_{wait}$ has elapsed after the start of picture transmission. In case the wait time $V_{wait}$ goes negative, $V_{wait}=0$ is set so that picture reception may be started simultaneously with the start of picture transmission.

$$V_{wait} = T_{est} - T_{trans} - V_{est} \quad (19)$$

Figure 28:
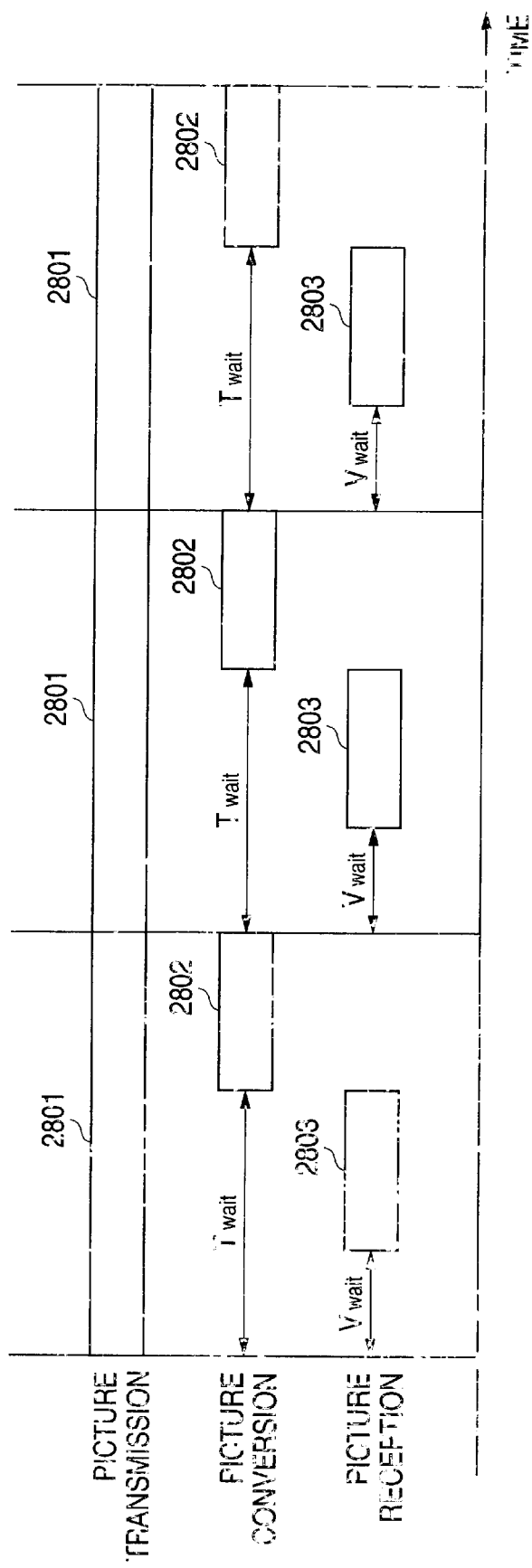
FIG. 28 is an explanatory drawing that shows the operation times of picture transmission, picture conversion and picture reception assumed when the predicted transmission time is longer than the predicted reception time.

An explanatory drawing illustrating the operation time of picture transmission, picture conversion and picture reception assumed when the predicted transmission time is longer than the predicted reception time is shown in FIG. 28. In FIG. 28, a sign 2801 represents the operation time of picture transmission (transmission time), a sign 2802 represents the operation time of picture conversion (conversion time), and a sign 2803 represents the operation time of picture reception (reception time).

In step S2706 (where the predicted transmission time is shorter than the predicted reception time), the processing operation controller 2613 compares the sum of the predicted transmission time $T_{est}$ and the time $T_{trans}$ required for picture conversion with the predicted reception time $V_{est}$. In case $V_{est}$ is larger than the sum of $T_{est}$ and $T_{trans}$, execution proceeds to step S2707. In case $V_{est}$ is equal to or smaller than the sum of $T_{est}$ and $T_{trans}$, execution proceeds to step S2710.

In step 2707 (in case $V_{est}$ is larger than the sum of $T_{est}$ and $T_{tran}$), the processing operation controller 2613 instructs the picture supply apparatus 2601 to constantly transmit pictures in order to keep active the picture reception. In step S2708, the processing operation controller 2613 instructs the picture converter 112 to start picture conversion immediately after completion of picture reception. Next, in step S2709, the processing operation controller 2613 instructs the picture transmitter 113 to start picture transmission immediately after completion of picture conversion in the picture converter 112.

Figure 29:
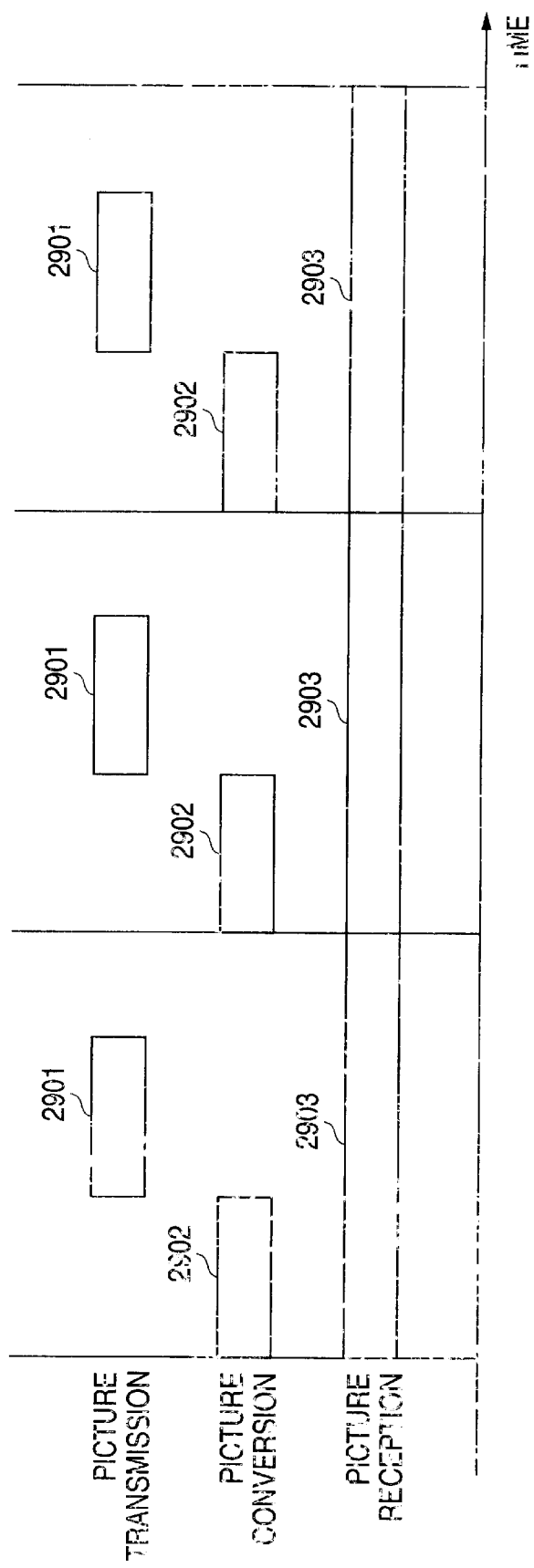
FIG. 29 is an explanatory drawing that shows the operation times of picture transmission, picture conversion and picture reception assumed when the predicted transmission time is shorter than the predicted reception time and $V_{est}$ is larger than the sum of $T_{est}$ and $T_{trans}$.

An explanatory drawing illustrating the operation time of picture transmission, picture conversion and picture reception assumed when the predicted transmission time is shorter than the predicted reception time and $V_{est}$ is larger than the sum of $T_{est}$ and $T_{trans}$ as mentioned earlier is shown in FIG. 29. In FIG. 29, reference sign 2901 indicates the operation time of picture transmission (transmission time), reference sign 2902 indicates the operation time of picture conversion (conversion time), and reference sign 2903 indicates the operation time of picture reception (reception time).

In step S2710 (in case $V_{est}$ is equal to or smaller than the sum of $T_{est}$ and $T_{trans}$), the start timing of picture reception is determined. The start timing of picture reception is determined in accordance with the expression below (20). The processing operation controller 2613 notifies the picture supply apparatus 2601 of the value of the wait time $V_{wait}$ so that picture reception may be started when the wait time $V_{wait}$ has elapsed after the start of picture conversion.

$$V_{wait} = T_{est} + T_{trans} - V_{est} \quad (20)$$

In step S2711, the processing operation controller 2613 instructs the picture converter 112 to start picture conversion immediately after completion of picture reception. Next, in step S2712, the processing operation controller 2613 instructs the picture transmitter 113 to start picture transmission immediately after completion of picture conversion in the picture converter 112 to terminate the processing.

Figure 30:
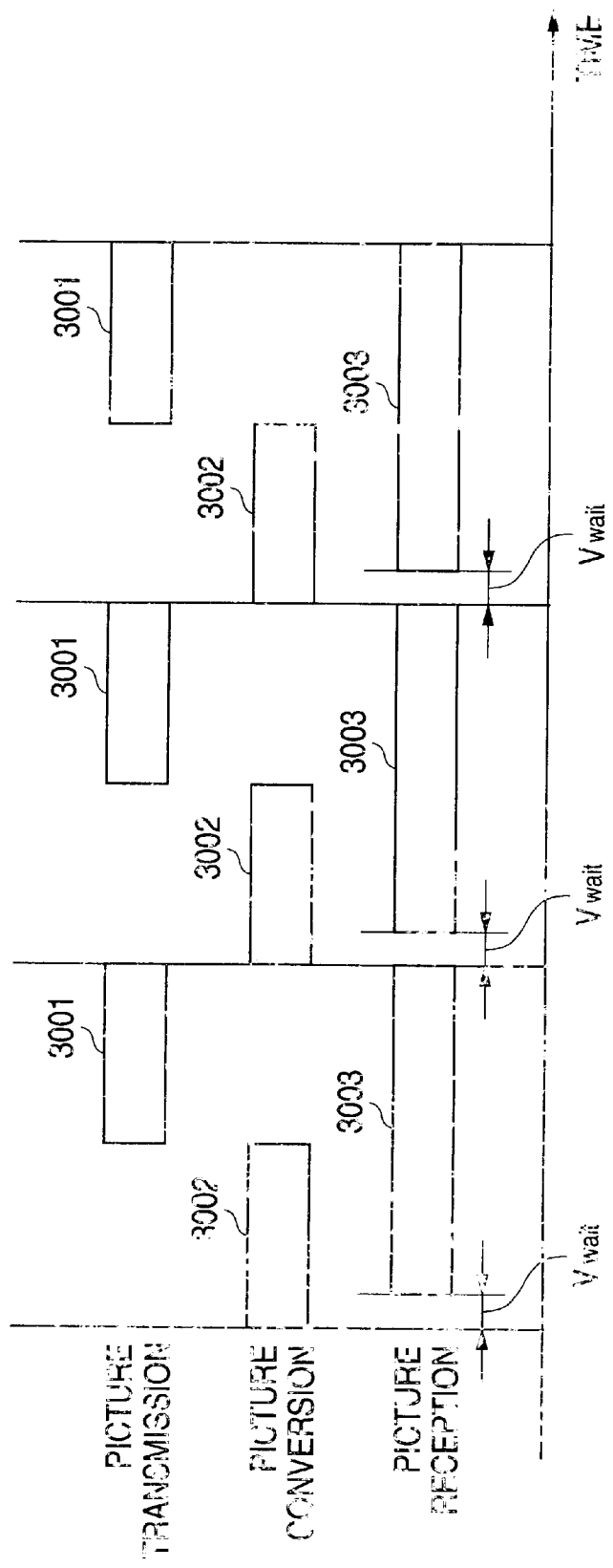
FIG. 30 is an explanatory drawing that shows the operation times of picture transmission, picture conversion and picture reception assumed when the predicted transmission time is shorter than the predicted reception time and $V_{est}$ is equal to or smaller than the sum of $T_{est}$ and $T_{trans}$.
Figure 31:
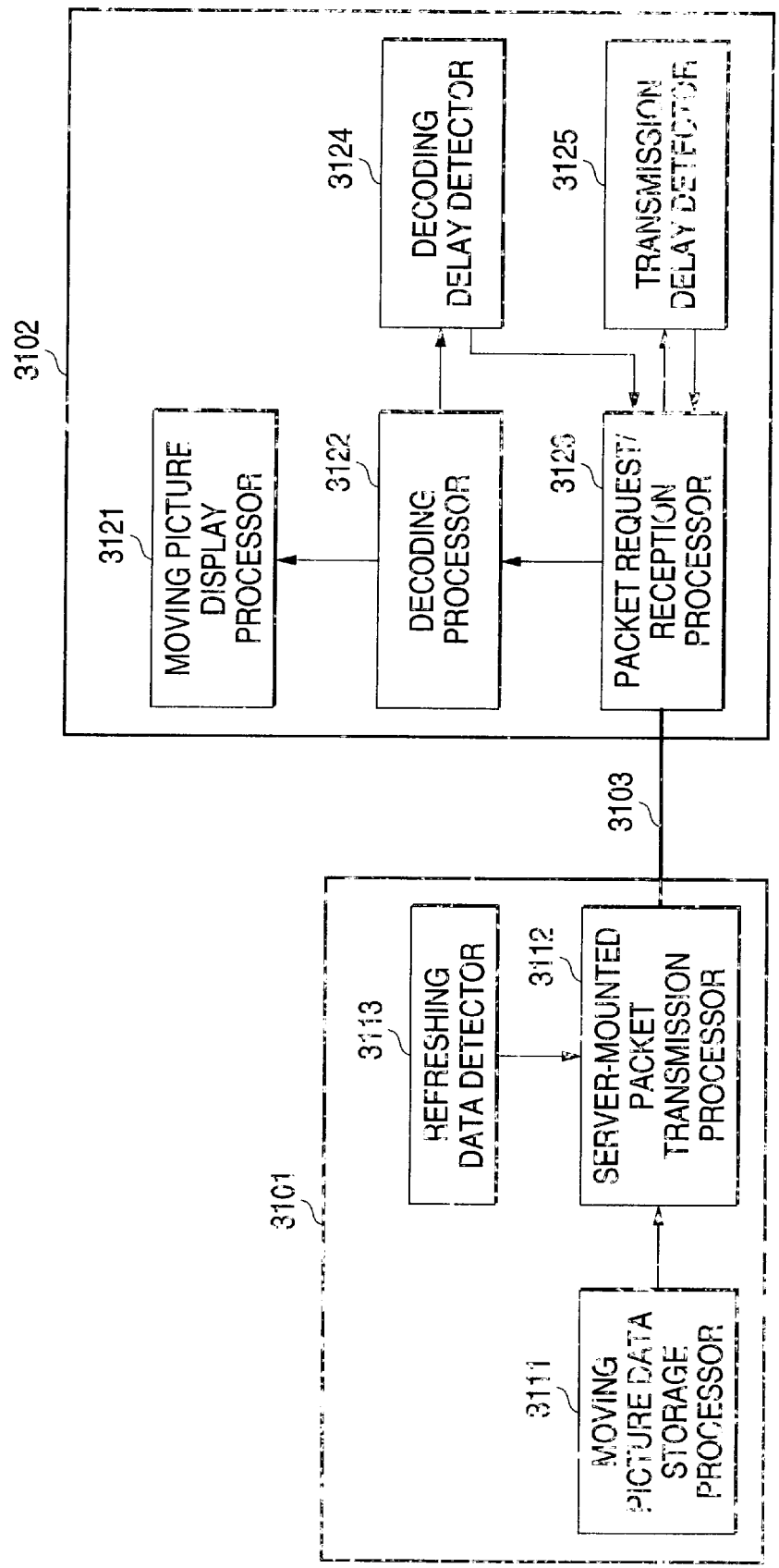
FIG. 31 is a block diagram of related art picture transmission apparatus.
Figure 34:
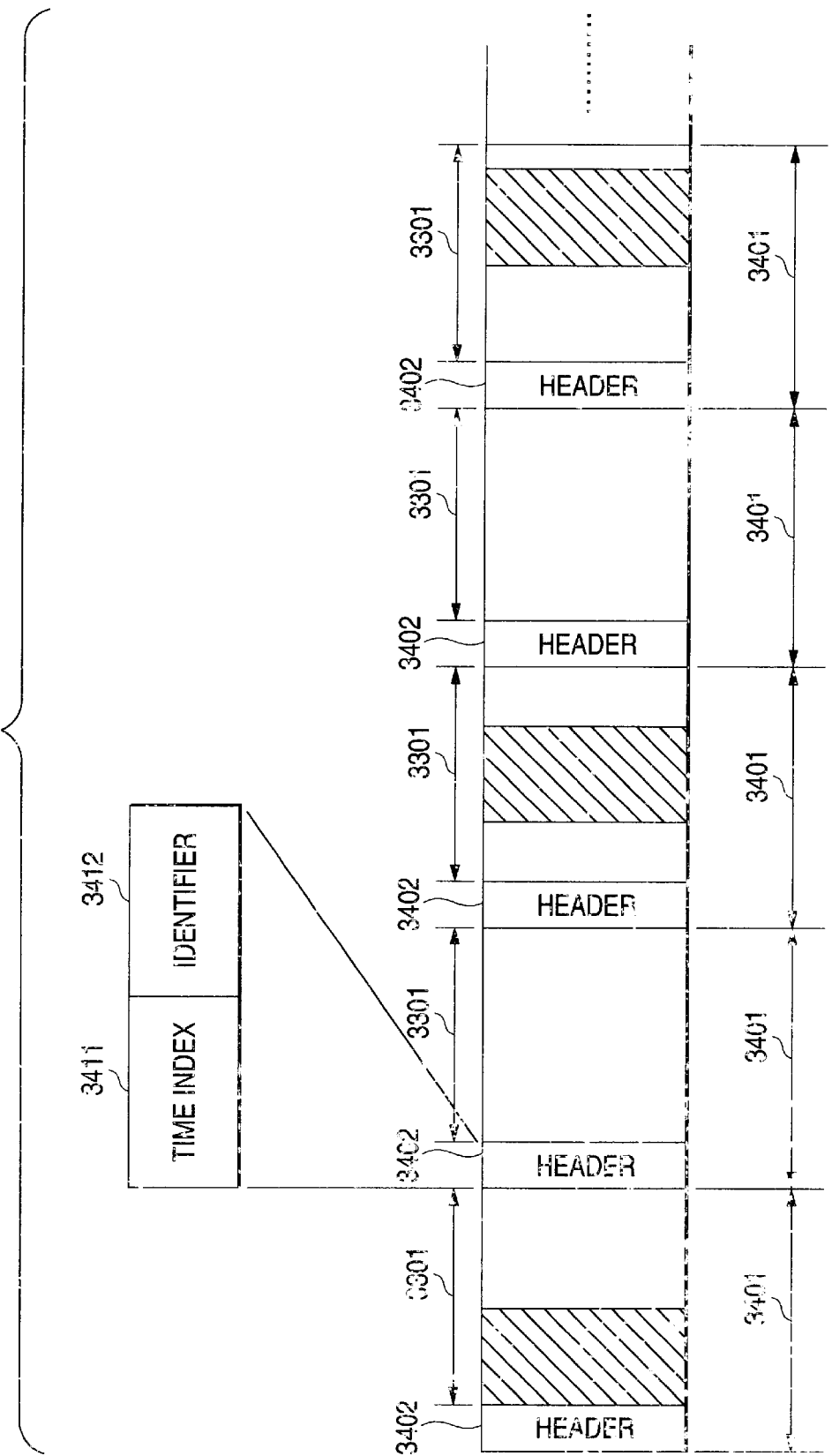
FIG. 34 is an explanatory drawing that shows the data structure of encoded data with a header added per packet.
Figure 35:
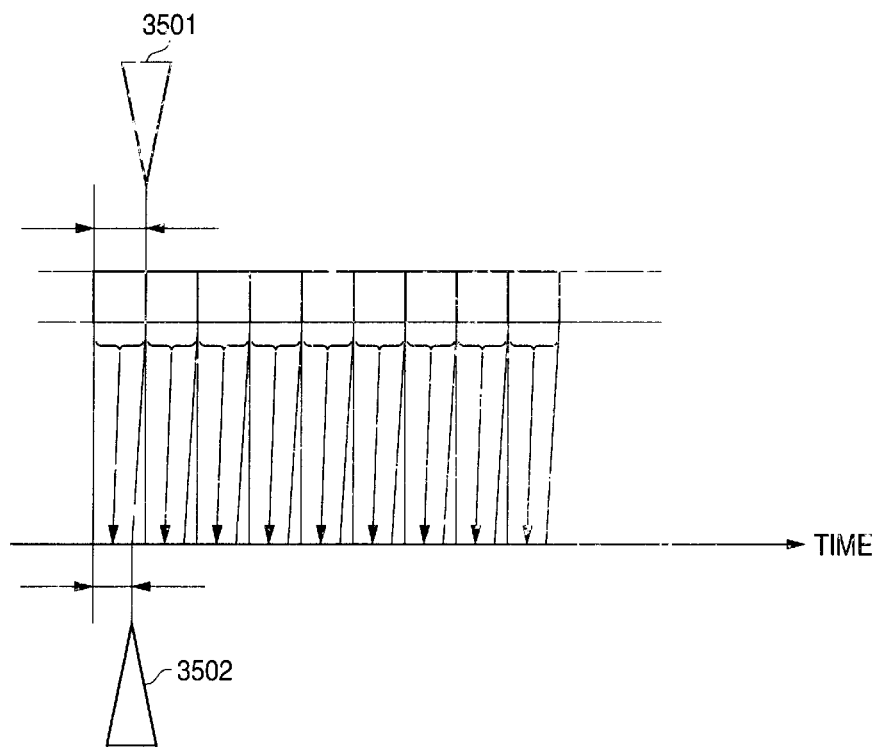
FIG. 35 is a conceptual drawing of transmission used in case the transmission time or decoding end time of a single packet is shorter than the transmission time or decoding end time indicated by the time index.
Figure 36:
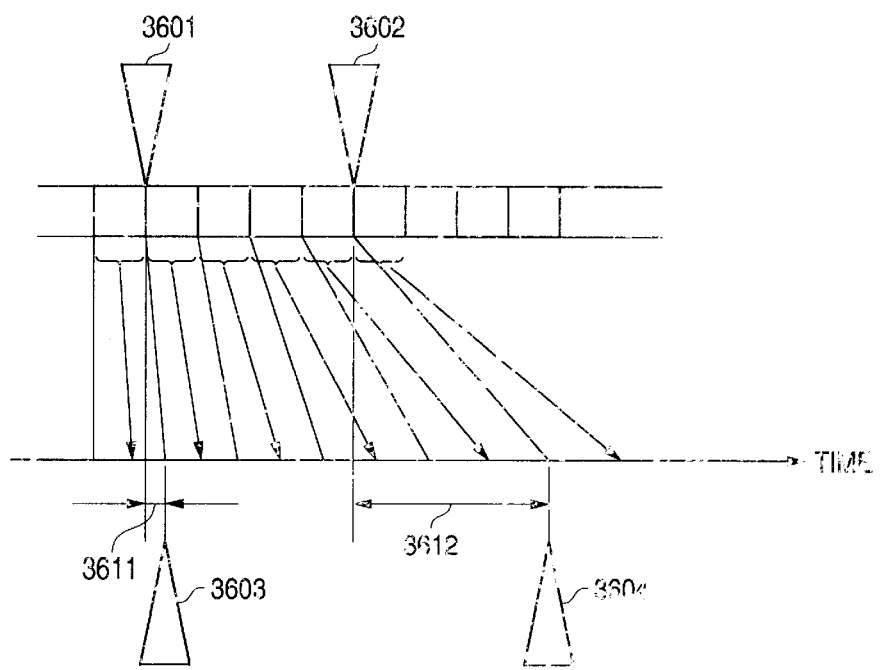
FIG. 36 is a conceptual drawing of transmission used in case the transmission time or decoding end time of a single packet is longer than the transmission time or decoding end time indicated by the time index.
Figure 37:
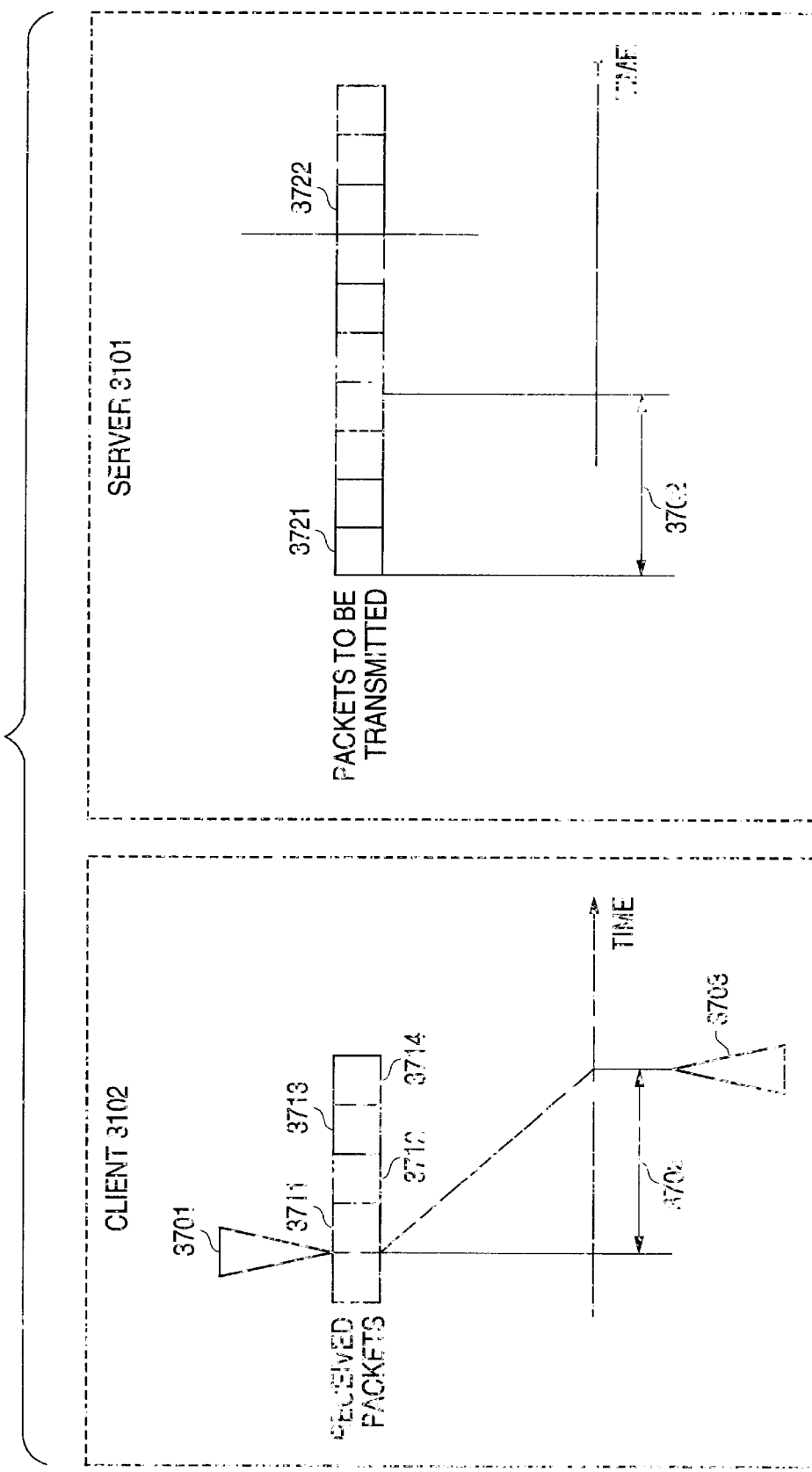
FIG. 37 is an explanatory drawing of delay reduction processing of related art picture transmission apparatus.

An explanatory drawing illustrating the operation time of picture transmission, picture conversion and picture reception assumed when the predicted transmission time is shorter than the predicted reception time and $V_{est}$ is equal to or smaller than the sum of $T_{est}$ and $T_{trans}$ as mentioned earlier is shown in FIG. 30. In FIG. 30, a sign 3001 represents the operation time of picture transmission (transmission time), a sign 3002 represents the operation time of picture conversion (conversion time), and a sign 3003 represents the operation time of picture reception (reception time).

An example will be described assuming the predicted transmission time $T_{trans}$ as $T_{est}=120$ [ms] and the time required for picture conversion $T_{trans}$ as $T_{trans}=40$ [ms], and the predicted reception time $V_{est}$ as $V_{est}=60$ [ms].

In step S2703, when the predicted transmission time $T_{est}$ is compared with the predicted reception time $V_{est}$, the predicted reception time $V_{est}$ is larger. Thus, as shown in FIG. 28, picture conversion is started when the wait time $T_{wait}$ has elapsed after the start of picture transmission so that picture transmission may be started immediately after the completion of picture conversion. In this case, the wait time $T_{wait}$ is obtained using the expression of the first embodiment, that is, $T_{wait}=120-40=80$ [ms]. In case picture reception is not complete when the wait time $T_{wait}$ has elapsed, execution waits until picture reception is complete.

Next, in step S2705, the processing operation controller 2613 notifies the picture supply apparatus 2601 of the value of the wait time $V_{wait}$ as a picture transmission timing so that picture reception may be started when the wait time $V_{wait}=120-40-60=20$ [ms] (see expression (19)) has elapsed after the start of picture transmission.

As mentioned earlier, according to picture transmission apparatus 2610 and a picture transmission method of this embodiment, the start timings of picture conversion and picture reception or picture transmission and picture conversion are controlled by predicting the time required for picture reception and picture transmission via parallel operation of picture reception and picture conversion even when a picture extracting section 111 receives pictures via a network and a picture transmitter 113 uses the same network as that used by the picture extracting section 111.

It is also possible to reduce the usage time of the network 102 to enable efficient use of the network 102 as well as to raise the frame rate. As a result, it is possible to minimize the time from reception of a picture transmission request from picture receiving apparatus 120 as a client to completion of picture transmission. In this way, it is possible to minimize a delay in the picture playback in picture receiving apparatus 120. That is, the latest pictures are transmitted from the picture transmission apparatus 2610 in real time so that the picture receiving apparatus 120 can play back the latest pictures.

While in picture transmission apparatus 110 according to the first embodiment the transmission time predicting section 115 obtains the average of transmission times of N frames transmitted previously to calculate the predicted transmission time, in picture transmission apparatus according to this eighth embodiment, the latest data is assigned a weight because it is more reliable than the past data. The configuration of picture transmission apparatus according to this embodiment is the same as picture transmission apparatus 110 in the first embodiment. The picture transmission method is also the same as that in the first embodiment. The only difference is that the transmission time predicting section 115 uses a different calculation method to obtain the predicted transmission time in step S403.

The method for calculation of the transmission time via the transmission time predicting section 115 according to this embodiment will be described. The transmission time predicting section 115 according to this embodiment, as shown in the expression (21) below, assigns a weight $W_2$ to the transmission times of the latest m frames out of a predetermined number of N frames (N>m) received by the transmission time measuring section 114, and assigns a weight $W_1$ to the transmission times of the other frames, then calculates the predicted transmission time $T_{est}$ required for transmission of a single frame.

$$T_{est} = \frac{W_1 \sum_{n=1}^{N-m} T_n + W_2 \sum_{n=N-m+1}^{N} T_n}{W_1(N-m) + mW_2} \quad (21)$$

Figure 12:
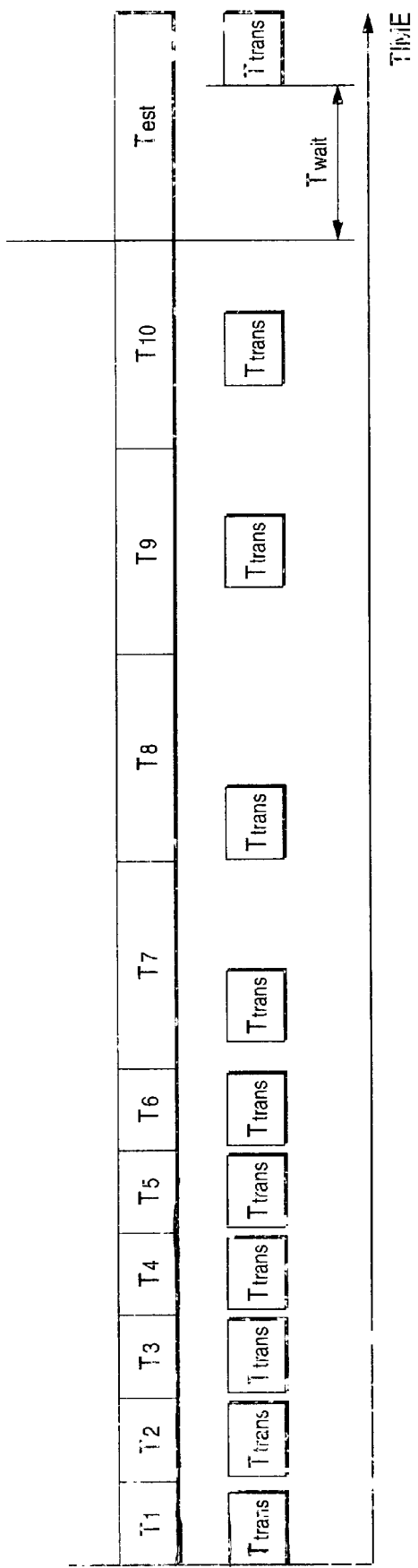
FIG. 12 is an explanatory drawing that shows the start timing of picture conversion determined in the third embodiment.

An example is shown below. Assume that the transmission time predicting section 115 calculates the predicted transmission time from the transmission times of past 10 frames and that the transmission times $T_1$–$T_{10}$ of the past 10 frames shown in FIG. 12 are $T_1$–$T_6$=40 [ms], $T_7$–$T_{10}$=100 [ms]. Also assume that a weighting factor $W_1$=1, $W_2$=2, and the sample value is 10 (N=1), and the measurement result of the latest five frames (m=5) are assigned a weight $W_2$. In this case, the predicted transmission time $T_{est}$ calculated by the transmission time predicting section 115 is obtained via the following expression (22):

$T_{est}$={1×(40+40+40+40+40+40)+2×(40+100+100+100+100)}/(1× 5+2×5)=72 [ms] (22)

The predicted transmission time $T_{est}$ thus obtained is, same as the first embodiment, used by the operation timing controller 116. The operation timing controller 116 uses the expression (2) to obtain the wait time $T_{wait}$. Up to the start of picture conversion from $T_{est}$ calculated by the transmission time predicting section 115 and the time required for picture conversion $T_{trans}$. The operation timing controller 116 that has obtained the wait time $T_{wait}$ controls the start timing of picture conversion in the picture converter 112 so that picture conversion may start when the wait time $T_{wait}$ has elapsed after the start of picture transmission. Thus, the picture converter 112 starts picture conversion when the wait time $T_{wait}$ has elapsed after the start of picture transmission.

In the foregoing example, in case the transmission time predicting section 115 does not use the expression (22) but uses the expression (1) of the first embodiment, the predicted transmission time $T_{est}$ is (40×6+100×4)/10=64 [ms]. Considering that the predicted transmission time $T_{est}$ obtained via the expression (22) of this embodiment is 72 [ms], this embodiment assures a value closer to the real one than the first embodiment in case the transmission speed has suddenly changed without returning to the initial value.

While in picture transmission apparatus 110 according to the first embodiment the transmission time predicting section 115 obtains the average of transmission times of N frames transmitted previously to calculate the predicted transmission time, in picture transmission apparatus according to this ninth embodiment, a standard deviation is used to check dispersion of measured values and predicts the transmission time by averaging the measured values based on the adjustment of the number of samples. The configuration of picture transmission apparatus according to this embodiment is the same as picture transmission apparatus 110 in the first embodiment. The picture transmission method is also the same as that in the first embodiment. The only difference is that the transmission time predicting section 115 uses a different calculation method to obtain the predicted transmission time in step S403.

The method for calculating the transmission time used by the transmission time predicting section 115 will be described. The transmission time predicting section 115 according to this embodiment calculates the predicted transmission time by averaging the transmission times of a plurality of frames while adjusting the number of samples (n) used for calculation of the predicted transmission time by using the formula of a standard deviation (s), shown as the expression (23).

$$s = \sqrt{\frac{(T_1 - T_{avg})^2 + (T_2 - T_{avg})^2 + \cdots + (T_n - T_{avg})^2}{n-1}} \quad (23)$$

where $$T_{avg} = \sum_{n=1}^{N} \frac{T_n}{N}$$

The transmission time predicting section 115 according to this embodiment repeats calculation of the standard deviation while decreasing the number of samples n until the standard deviation s lowers a certain value. In case the standard deviation has increased because the number of sample values were decreased, the sample value is reset to the previous value. The samples are removed in chronological order. The certain value is obtained in advance by dividing the average value of a predetermined number of samples by 10 and by 5.

An example is shown below. Assume that the transmission times $T_1$ to $T_{10}$ of the past 10 frames are $T_1$=10 [ms], $T_2$=30 [ms], $T_3$=50 [ms], $T_4$=70 [ms], $T_5$=75 [ms], $T_6$=80 [ms], $T_7$=85 [ms], $T_8$90 [ms], $T_9$=95 [ms], and $T_{10}$=110 [ms]. Also assume that the threshold value for the standard deviation (the aforementioned certain value) is set to 15 in the following example.

The transmission time predicting section 115 obtains the standard deviation from the transmission times of the past 10 frames (number of samples n=10). The average value of transmission times $T_{avg10}$ assumed when n=10 is obtained via the following expression (24):

$T_{avg10}$=(10+30+50+70+75+80+85+90+95+100)/10=68.5 [ms] (24)

A standard deviation $s_{10}$ assumed when n=10 is obtained via the following expression (25):

$s_{10}$=√{(58.5^2+38.5^2+18.5^2+1.5^2+6.5^2+11.5^2+16.5^2+ 21.5^2+26.5^2+31.5^2)/9}=29.54 (25)

The standard deviation $s_{10}$ assumed when n=10 is larger than the threshold value for standard deviation "15" so that this value is not employed.

A standard deviation assumed when two old samples are removed to set the sample value n=8 is obtained. The average value $T_{avg8}$ assumed when n=10 is obtained via the following expression (26):

$T_{avg8}$=(50+70+75+80+85+90+95+100)/8=80.625 [ms] (26)

A standard deviation $s_8$ assumed when n=8 is obtained via the following expression (27):

$s_8$√{(30.625^2+10.625^2+5.625^2+0.625^2+4.375^2+ 9.375^2+14.375^2+19.375)/7}=15.91 (27)

The standard deviation $s_8$ assumed when n=8 is larger than the threshold value for standard deviation "15," so that this value is not employed.

A standard deviation assumed when one sample is further removed to set the sample value n=7 is obtained. The average value $T_{ave7}$ assumed when n=7 is obtained via the following expression (28):

$$T_{ave7}=(70+75+80+85+90+95+100)/7=85 \text{ [ms]} \qquad (28)$$

The standard deviation $s_7$ assumed when n=7 is obtained via the following expression (29):

$$s_7=\sqrt{\{15^2+10^2+5^2+0^2+5^2+10^2+15^2/6\}}=10.80 \qquad (29)$$

The standard deviation $s_7$ assumed when n=7 is smaller than the threshold value for standard deviation "15" so that the average value $T_{ave7}$ (=85 [ms]) is employed as the predicted transmission time $T_{est}$.

The predicted transmission time $T_{est}$ thus obtained is, same as the first embodiment, used by the operation timing controller 116. The operation timing controller 116 uses the expression (2) to obtain the wait time $T_{wait}$ up to the start of picture conversion from $T_{est}$ calculated by the transmission time predicting section 115 and the time required for picture conversion $T_{trans}$. The operation timing controller 116 that has obtained the wait time $T_{wait}$ controls the start timing of picture conversion in the picture converter 112 so that picture conversion may start when the wait time $T_{wait}$ has elapsed after the start of picture transmission. Thus, the picture converter 112 starts picture conversion when the wait time $T_{wait}$ has elapsed after the start of picture transmission.

According to this embodiment, the transmission time is predicted by using a sample group with a small standard deviation, that is, with small dispersion. Accordingly, it is possible to obtain a value closer to the real one than the first embodiment in case the transmission speed gradually increases or gradually decreases.

In picture transmission apparatus 610 according to the second embodiment, the jitter determining section 611 determines the occurrence of jitter and the transmission time predicting section 115 avoids the influence of jitter to predict the time required for picture transmission, even in case sudden jitter has occurred in the network. The picture transmission apparatus according to this tenth embodiment, same as the ninth embodiment, uses a standard deviation to check dispersion of measured values and predicts the transmission time by averaging the measured values based on the adjustment of the number of samples. The difference from the ninth embodiment is that removal of samples is made starting with a sample whose difference between the average value and the sample value is the largest, not simply with past samples (measured value).

The configuration of picture transmission apparatus according to this embodiment is the same as picture transmission apparatus 110 in the first embodiment. The picture transmission method is also the same as that in the first embodiment. The only difference is that the transmission time predicting section 115 uses a different calculation method to obtain the predicted transmission time in step S403.

The method for calculating the transmission time used by the transmission time predicting section 115 will be described. The transmission time predicting section 115 according to this embodiment calculates the predicted transmission time by averaging the transmission times of a plurality of frames while adjusting the number of samples (n) used for calculation of the predicted transmission time by using the formula of a standard deviation (s) shown as the expression (23), same as the ninth embodiment.

The transmission time predicting section 115 according to this embodiment, same as the ninth embodiment, repeats calculation of the standard deviation while decreasing the number of samples n until the standard deviation s lowers a certain value. In case the standard deviation has increased because the sample value were decreased, the sample value is reset to the previous value. Unlike the ninth embodiment, removal of samples is made starting with a sample whose difference between the average value and the sample value is the largest). The certain value is obtained in advance by dividing the average value of a predetermined number of samples by 10 and by 5.

An example is shown below. Assume that the transmission times $T_1$ to $T_{10}$ of the past 10 frames are $T_1$=60 [ms], $T_2$=30 [ms], $T_3$=50 [ms], $T_4$=60 [ms], $T_5$=65 [ms], $T_6$=150 [ms], $T_7$=70 [ms], $T_8$=60 [ms], $T_9$=40 [ms], and $T_{10}$=50 [ms]. Also assume that the threshold value for the standard deviation (the aforementioned certain value) is set to 10 in the following example.

The transmission time predicting section 115 obtains the standard deviation from the transmission times of the past 10 frames (number of samples n=10). The average value of transmission times $T_{avg10}$ assumed when n=10 is obtained via the following expression (30):

$$T_{avg10}=(60+30+50+60+65+150+70+60+40+50)/10=63.5 \text{ [ms]} \quad (30)$$

A standard deviation $s_{10}$ assumed when n=10 is obtained via the following expression (31):

$$s_{10}=\sqrt{\{(3.5^2+33.5^2+13.5^2+3.5^2+1.5^2+86.5^2+6.5^2+3.5^2+23.5^2+13.5^2)/9)\}}\approx 32.7 \qquad (31)$$

The standard deviation $s_{10}$ assumed when n=10 is larger than the threshold value for standard deviation "10" so that this value is not employed.

A standard deviation assumed when a sample $T_{avg}$=150 [ms] whose difference from the average value $T_{avg10}$ is the largest is removed to set the sample value n=9 is obtained. The average value $T_{avg9}$ assumed when n=9 is obtained via the following expression (32):

$$T_{avg9}=(60+30+50+60+65+70+60+40+50)/9=53.89 \text{ [ms]} \qquad (32)$$

A standard deviation $s_9$ assumed when n=9 is obtained via the following expression (33):

$$s_9\sqrt{\{(6.11^2+23.89^2+3.89^2+6.11^2+11.11^2+16.11^2+6.11^2+13.89^2+3.89^2)/8\}}\approx 12.7 \qquad (33)$$

The standard deviation $s_9$ assumed when n=9 is larger than the threshold value for standard deviation "10" so that this value is not employed.

A standard deviation assumed when a sample $T_2$=30 [ms] whose difference from the average value $T_{ave7}$ is the largest as calculated in the expression (32) is removed to set the sample value n=8 is obtained. The average value $T_{avg8}$ assumed when n=8 is obtained via the following expression (34):

$$T_{avg8}=(60+50+60+65+70+60+40+50)/8=56.88 \text{ [ms]} \qquad (34)$$

The standard deviation $s_8$ assumed when n=8 is obtained via the following expression (35):

$$s_7=\sqrt{\{\ 3.12^2+6.88^2+3.12^2+8.12^2+13.12^2+3.12^2+16.88^2+6.88^2/7\}}\approx 9.6 \qquad (35)$$

The standard deviation $s_8$ assumed when n=8 is smaller than the threshold value for standard deviation "10" and lowered the threshold when n=8. In this example, the average value $T_{avg8}$ (=56.88 [ms]) is employed as the predicted transmission time $T_{est}$.

The predicted transmission time $T_{est}$ thus obtained is, same as the first embodiment, used by the operation timing controller 116. The operation timing controller 116 uses the expression (2) to obtain the wait time $T_{wait}$ up to the start of picture conversion from $T_{est}$ calculated by the transmission time predicting section 115 and the time required for picture conversion $T_{tran}$. The operation timing controller 116 that has obtained the wait time $T_{wait}$ controls the start timing of picture conversion in the picture converter 112 so that picture conversion may start when the wait time $T_{wait}$ has elapsed after the start of picture transmission. Thus, the picture converter 112 starts picture conversion when the wait time $T_{wait}$ has elapsed after the start of picture transmission.

In this embodiment, the transmission time is predicted by removing samples (measured values) obtained when jitter occurred thus using a sample group (measured values) with a small standard deviation, that is, with small dispersion. Thus, this embodiment assures a more precise transmission time than the first embodiment even when jitter has occurred. While the transmission time predicting section 115 uses the aforementioned method to calculate the predicted transmission time, the jitter determining section 611 in the picture transmission apparatus 610 according to the second embodiment may perform the same operation instead.

Figure 38:
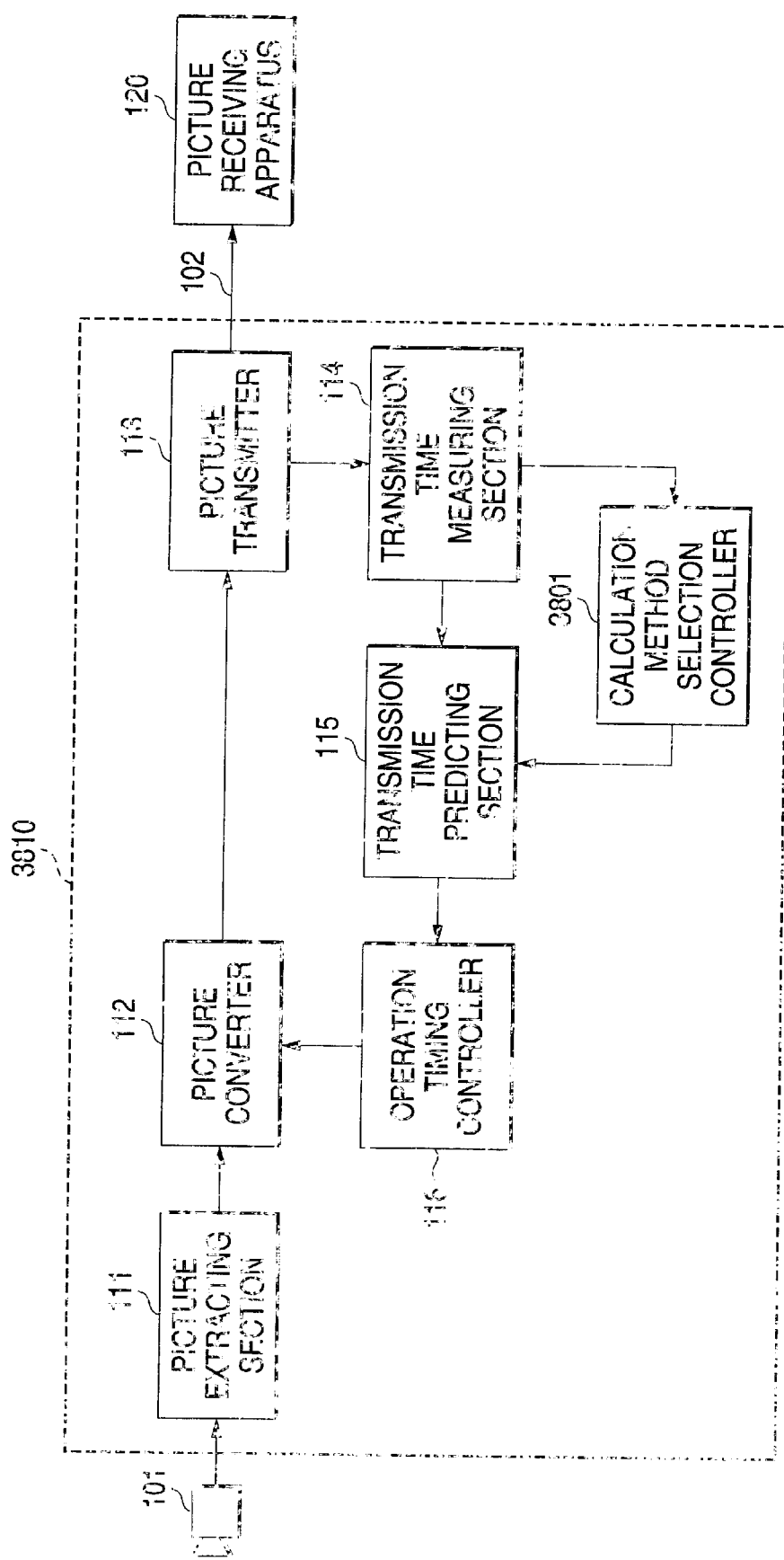
FIG. 38 is a block diagram that shows a network picture transmission system that includes picture transmission apparatus according to the second embodiment.

As shown in FIG. 38, picture transmission apparatus 3810 according to this eleventh embodiment comprises a calculation method selection controller 3801 on top of the components of the picture transmission apparatus 110 of the first embodiment. The calculation method selection controller 3801 instructs the transmission time predicting section 115 to change the calculation method for predicted transmission time depending on the variations in the transmission speed on the network 102 as determined from the measurement result of transmission time saved in the transmission time measuring section.

For example, the calculation method selection controller 3801 instructs the transmission time predicting section 115 to predict the transmission time by using the calculation method of the eighth embodiment in case the transmission speed has suddenly changed without returning to the initial value; to predict the transmission time by using the calculation method of the ninth embodiment in case the transmission speed gradually increases or gradually decreases; and to predict the transmission time by using the calculation method of the tenth embodiment in case jitter has occurred.

Thus, picture transmission apparatus 3810 according to this embodiment can predict the transmission time by using the optimum calculation method depending on the state of the network 102.

Figure 27:
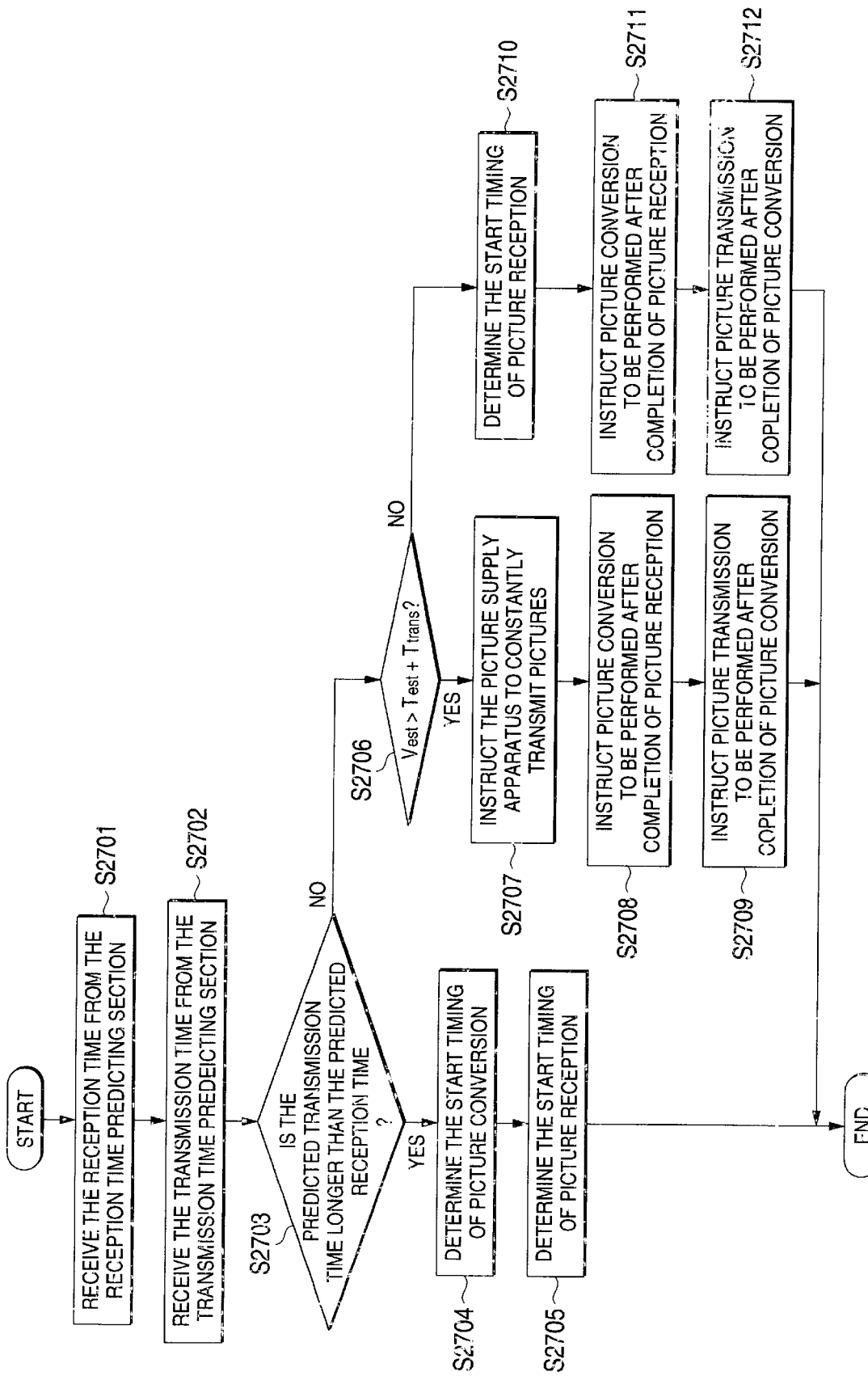
FIG. 27 is a flowchart that explains the method for picture transmission of the seventh embodiment that focuses on processing operation control.

The calculation method selection controller 3801 is not necessarily provided in the picture transmission apparatus 110 of the first embodiment but may be provided in the picture transmission apparatus 1410 of the fourth embodiment shown in FIG. 14 or picture transmission apparatus 1410' in FIG. 17, picture transmission apparatus 1810 of the fifth embodiment shown in FIG. 18 or picture transmission apparatus 1810' in FIG. 12, picture transmission apparatus 2310 of the sixth embodiment shown in FIG. 23, or picture transmission apparatus 2610 of the seventh embodiment shown in FIG. 27.

As mentioned earlier, according to picture transmission apparatus, a picture transmission method and a recording medium, and a picture transmission program from the present invention, the wait time from the end of picture conversion to the start of picture transmission is eliminated thus minimizing the time required from the start of picture conversion to the end of picture transmission. As a result, it is possible to minimize the time from reception of a picture transmission request coming from the picture receiving apparatus as a client to the completion of picture transmission. In this way, it is possible to minimize a delay in the picture playback in the picture receiving apparatus. That is, the latest pictures are transmitted in real time so that the picture receiving apparatus can play back the latest pictures. It is also possible to reduce the usage time of the network 102 to enable efficient use of the network 102 as well as to raise the frame rate (number of frames that can be transmitted per second) of the pictures received by the picture receiving apparatus.

What is claimed is:

1. Picture transmission apparatus characterized in that said picture transmission apparatus comprises picture conversion means for converting a picture composed of a plurality of frames to a format for transmission to another apparatus to generate a converted picture on a per frame basis, picture transmission means for transmitting the converted picture generated by said picture conversion means on a per frame basis to predetermined picture receiving apparatus connected via a network, transmission time measuring means for measuring the transmission time of a converted picture transmitted from said picture transmission means on a per frame basis, transmission time predicting means for predicting the transmission time required for said picture transmission means to transmit a converted picture in a transmission-candidate frame and generating a predicted transmission time based on the transmission time of past frames measured by said transmission time measuring means, and operation timing control means for controlling the start timing for said picture conversion means to convert of a conversion-candidate frame based on the predicted transmission time of said transmission-candidate frame generated by said transmission time predicting means.

2. Picture transmission apparatus according to claim 1, characterized in that said transmission time measuring means comprises jitter determining means for determining the occurrence of jitter in said network during transmission of said past frames based on the length of each measured transmission time, and that said transmission time predicting means predicts said predicted transmission time based on the transmission time other than the transmission time where occurrence of jitter is determined by said jitter determining means.

3. Picture transmission apparatus according to claim 1, characterized in that said transmission time measuring means comprises bandwidth variation determining means for determining variations in said network during transmission of said past frames based on the length of each measured transmission time, and that said transmission time predicting means predicts said predicted transmission time based on the transmission time assumed after the determination that the network bandwidth has varied by said bandwidth variation determining means.

4. Picture transmission apparatus according to claim 1, comprising conversion time measuring means for measuring the conversion time of a picture converted by said picture conversion means on a per frame basis and conversion time predicting means for predicting a conversion time required for said picture conversion means to convert a picture in a conversion-candidate frame based on the conversion time of past frames measured by said conversion time measuring means to generate a predicted conversion time, characterized in that said operation timing control means controls a start timing of said picture conversion means to convert said conversion-candidate frame based on the predicted transmission time of said transmission-candidate frame generated by said transmission time predicting means and the predicted conversion time of said conversion-candidate frames generated by said conversion time predicting means.

5. Picture transmission apparatus according to claim 4, comprising central processing unit (CPU) load measuring means for measuring the load of a CPU assumed when a picture of each frame is converted, based on the conversion time of the past frames measured by said conversion time measuring means, characterized in that said conversion time predicting means predicts the predicted conversion time of said conversion-candidate frames based on the conversion time of the past frames measured by said conversion time measuring means and the load measured by said CPU load measuring means.

6. Picture transmission apparatus according to claim 4, comprising conversion calculation volume change means for instructing said picture conversion means to change the calculation volume required for conversion of said conversion-candidate frames based on the comparison between the predicted transmission time of said transmission-candidate frame generated by said transmission time predicting means and the predicted conversion time of said conversion-candidate frame generated by said conversion time predicting means, characterized in that said conversion calculation volume change means instructs said picture conversion means to reduce the difference between the predicted transmission time of said transmission-candidate frame and the predicted conversion time of said conversion-candidate frame.

7. Picture transmission apparatus according to claim 4, comprising conversion system change means for instructing said picture conversion means to change the conversion system for said conversion-candidate frame based on the comparison between the predicted transmission time of said transmission-candidate frame generated by said transmission time predicting means and the predicted conversion time of said conversion-candidate frames generated by said conversion time predicting means and conversion system notification means for notifying said predetermined picture receiving apparatus of the conversion system instructed by said conversion system change means, characterized in that said conversion system change means instructs said picture conversion means to switch to a conversion system which minimizes the difference between the predicted transmission time of said transmission-candidate frames and the predicted conversion time of said conversion-candidate frames.

8. Picture transmission apparatus according to claim 1, characterized in that said picture transmission apparatus comprises picture extracting means for receiving pictures via a network from second picture transmission apparatus for storing said pictures connected to said picture transmission apparatus via said network, reception time measuring means for measuring reception time of a picture received by said picture extracting means on a per frame basis, reception time predicting means for predicting the reception time required for said picture extracting means to receive a reception-candidate frame and generating a predicted reception time based on the reception time of past frames measured by said reception time measuring means, and processing operation control means for controlling the timing for said picture extracting means to start reception of said reception-candidate frame, the timing for said picture conversion means to start conversion of said conversion-candidate frame and the timing for said picture transmission means to start transmission of said conversion-candidate frame based on the predicted transmission time of said transmission-candidate frame generated by said transmission time predicting means and the predicted reception time of said transmission-candidate frame generated by said reception time predicting means.

9. Picture transmission apparatus according to claim 1, characterized in that said transmission time predicting means adjusts the number of samples and generates said predicted transmission time by calculating a standard deviation of the transmission time of said past frames.

10. Picture transmission apparatus according to claim 9, characterized in that said transmission time predicting means removes samples in chronological order until said calculated standard deviation lowers a predetermined value.

11. Picture transmission apparatus according to claim 9, characterized in that said transmission time predicting means removes samples starting with a sample whose difference from the average value is the largest until said calculated standard deviation lowers a predetermined value.

12. Picture transmission apparatus, characterized in that said picture transmission apparatus comprises picture readout means for reading converted pictures on a per frame basis from converted picture storage for storing converted pictures converted to a format that can be displayed on picture receiving apparatus connected via a network, picture transmission means for transmitting a converted picture read by said picture readout means on a per frame basis toward predetermined picture receiving apparatus connected via said network, transmission time measuring means for measuring the transmission time of converted pictures transmitted from said picture transmission means on a per frame basis, transmission time predicting means for predicting the transmission time required for said picture transmission means to transmit the transmission-candidate frames and generating a predicted transmission time based on the transmission time of past frames measured by said transmission time measuring means, picture readout location investigating means for investigating the location where a converted picture read by said picture readout means is stored, readout time measuring means for measuring the readout time of converted pictures read by said converted picture storage on a per readout time frame, readout time predicting means for predicting the readout time required for said picture readout means to read a converted picture in the readout-candidate frame and generating a predicted readout time based on the readout time of past frames measured by said readout time measuring means and the investigation result by said picture readout location investigating means, and operation timing control means for controlling the timing for said readout time predicting means to start readout of said readout-candidate frame based on the predicted transmission time of said transmission-candidate frame generated by said transmission time predicting means and the predicted readout time of said readout-candidate frame generated by said readout time predicting means.

13. Picture transmission apparatus according to claim 12, characterized in that said transmission time predicting means adjusts the number of samples and generates said predicted transmission time by calculating a standard deviation of the transmission time of said past frames.

14. Picture transmission apparatus according to claim 13, characterized in that said transmission time predicting means removes samples in chronological order until said calculated standard deviation lowers a predetermined value.

15. Picture transmission apparatus according to claim 13, characterized in that said transmission time predicting means removes samples starting with a sample whose difference from the average value is the largest until said calculated standard deviation lowers a predetermined value.

16. A computer-readable recording medium that records thereon a picture transmission program for causing a computer to act as picture transmission apparatus according to any one of the claims 1 through 11 and 13 through 15.

17. A picture transmission program for causing a computer to act as picture transmission apparatus according to any one of the claims 1 through 11 and 13 through 15.

18. A picture transmission method according to the invention is characterized in that said picture transmission method comprises a picture conversion step of converting a picture composed of a plurality of frames to a format for transmission to another apparatus to generate a converted picture on a per frame basis, a picture transmission step of transmitting the converted picture generated in said picture conversion step on a per frame basis to predetermined picture receiving apparatus connected via a network, a transmission time measuring step of measuring the transmission time of a converted picture transmitted in said picture transmission step on a per frame basis, a transmission time predicting step of predicting a transmission time required for said picture transmission step to transmit a converted picture in a transmission-candidate frame and generating a predicted transmission time based on the transmission time of past frames measured by said transmission time measuring step, and an operation timing control step of controlling the timing for said picture conversion step to start conversion of a conversion-candidate frame based on the predicted transmission time of said transmission-candidate frame generated in said transmission time predicting step.

* * * * *